United States Patent [19]
Fukutani et al.

[11] Patent Number: 5,264,952
[45] Date of Patent: Nov. 23, 1993

[54] TWO CELLED COLOR LIQUID CRYSTAL DISPLAY DEVICE

[75] Inventors: Hiroshi Fukutani, Nara; Kunihiko Ito, Yamatokooriyama; Kazuhiko Akimoto; Mitsuaki Shioji, both of Nara; Hiroshi Takanashi, Souraku, all of Japan

[73] Assignee: Sharp Kabushiki Kaisha, Osaka, Japan

[21] Appl. No.: 615,695

[22] Filed: Nov. 20, 1990

[30] Foreign Application Priority Data

| Nov. 20, 1989 | [JP] | Japan | 1-301270 |
| Jun. 25, 1990 | [JP] | Japan | 2-166178 |
| Jun. 25, 1990 | [JP] | Japan | 2-166179 |
| Jun. 25, 1990 | [JP] | Japan | 2-166180 |
| Jun. 25, 1990 | [JP] | Japan | 2-166181 |
| Jun. 25, 1990 | [JP] | Japan | 2-166182 |
| Jun. 25, 1990 | [JP] | Japan | 2-166183 |
| Jun. 25, 1990 | [JP] | Japan | 2-166184 |

[51] Int. Cl.$^5$ ............... G02F 1/133; G02F 1/1335
[52] U.S. Cl. ............................................. 359/53; 359/68
[58] Field of Search ................................. 359/53, 68

[56] References Cited

U.S. PATENT DOCUMENTS

| 4,099,855 | 7/1978 | Wisbey et al. | 359/53 |
| 4,335,936 | 6/1982 | Nonomura et al. | 359/53 |
| 4,412,214 | 10/1983 | Tanaka et al. | 359/87 |
| 4,436,379 | 3/1984 | Funada et al. | 359/53 |
| 4,443,065 | 4/1984 | Funada et al. | 359/53 |
| 4,487,480 | 12/1984 | Nonomura et al. | 359/53 |
| 4,610,507 | 9/1986 | Kanamori et al. | 359/53 |
| 4,673,252 | 6/1987 | Kugo et al. | 359/87 |
| 4,773,737 | 9/1988 | Yokono et al. | 359/68 |
| 4,877,309 | 10/1989 | Takamatsu | 359/68 |
| 4,904,058 | 2/1990 | Kato et al. | 359/53 |
| 4,927,240 | 5/1990 | Stolov et al. | 359/53 |
| 4,930,877 | 6/1990 | Kano et al. | 359/68 |
| 4,941,737 | 7/1990 | Kimura | 359/53 |
| 4,950,058 | 8/1990 | Diem et al. | 359/68 |
| 4,952,029 | 8/1990 | Hayashi et al. | 359/53 |
| 5,090,794 | 2/1992 | Hataro et al. | 359/53 |
| 5,142,392 | 8/1992 | Ueki et al. | 359/67 |
| 5,162,782 | 11/1992 | Yoshioka | 359/53 |

FOREIGN PATENT DOCUMENTS

| 0319351 | 6/1989 | European Pat. Off. |
| 53-1494 | 9/1978 | Japan . |
| 0222818 | 12/1984 | Japan | 359/68 |
| 60-260921 | 12/1985 | Japan . |
| 61-143726 | 7/1986 | Japan . |
| 61-239220 | 10/1986 | Japan . |
| 62-91917 | 4/1987 | Japan . |
| 0050019 | 2/1989 | Japan | 359/68 |
| 0040614 | 2/1990 | Japan | 359/68 |

OTHER PUBLICATIONS

Article entitled: "Neutralized Supertwisted Nematic LCD: Principle and Characteristics; The Transactions of the Institute of Electronics, Information & Communication Engineers", vol. E71, No. 11, Nov. 1988 pp. 1080–1085, M. Nagata et al.

Primary Examiner—William L. Sikes
Assistant Examiner—Anita Pellman Gross

[57] ABSTRACT

In a color liquid crystal display device, the shape of a color filter cannot be seen and coloring of areas other than a display area due to leaking light is prevented. By making a first and second segment electrodes in a two layer construction, it becomes possible to display two different display image planes in different colors with only the single layer type color liquid crystal display device. Further, sufficient contrast can be obtained by using a liquid crystal element for compensation. It is also possible to display two kinds of display image planes, namely a color display image plane and a black and white display image plane. Two kinds of color display image planes can be displayed because the color liquid crystal display device is made in a two layered construction. A so-called normally black display and normally white display can be switched. Further, when the display state is switched between normally black display and normally white display, the background color changes and it is possible to maintain the same display color. Further display colors can be doubled as compared to the example of the prior art.

12 Claims, 41 Drawing Sheets

Fig.12 (1)
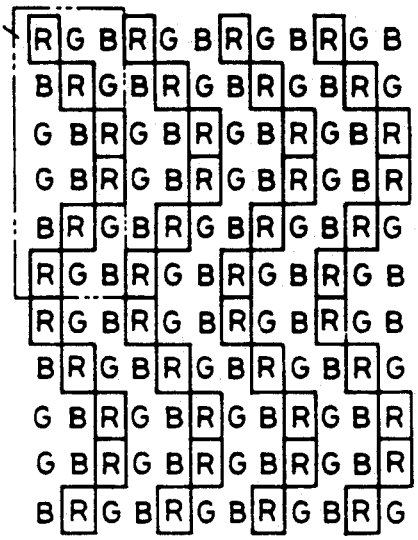
Fig.12 (2)
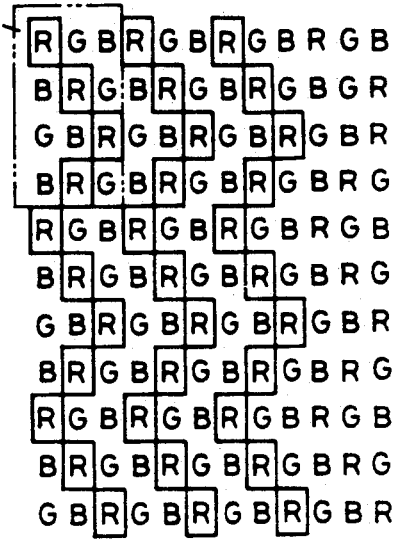
Fig.12 (3)
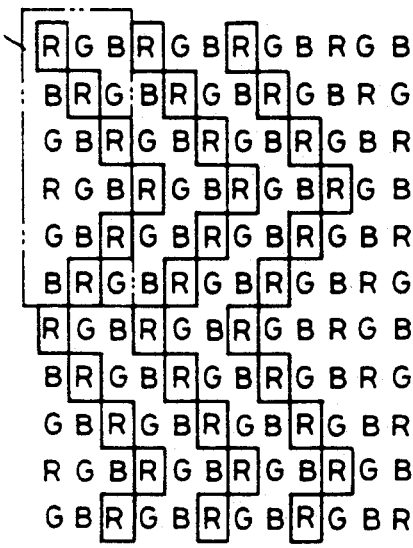
Fig.13 (1)
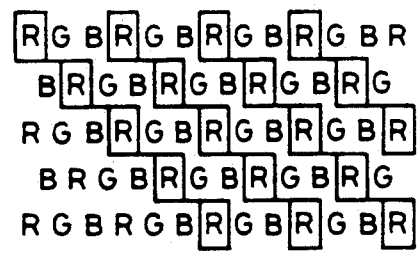
Fig.13 (2)
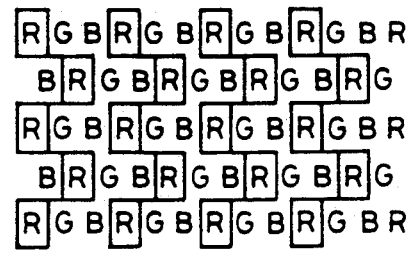

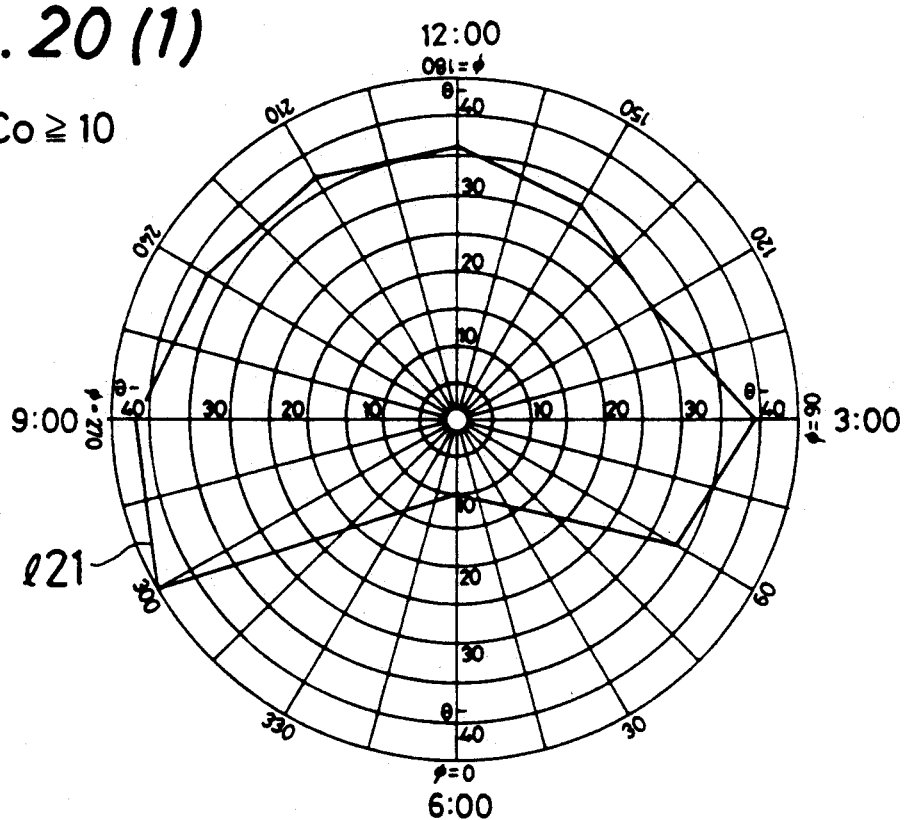
Fig. 20 (1) Co ≥ 10
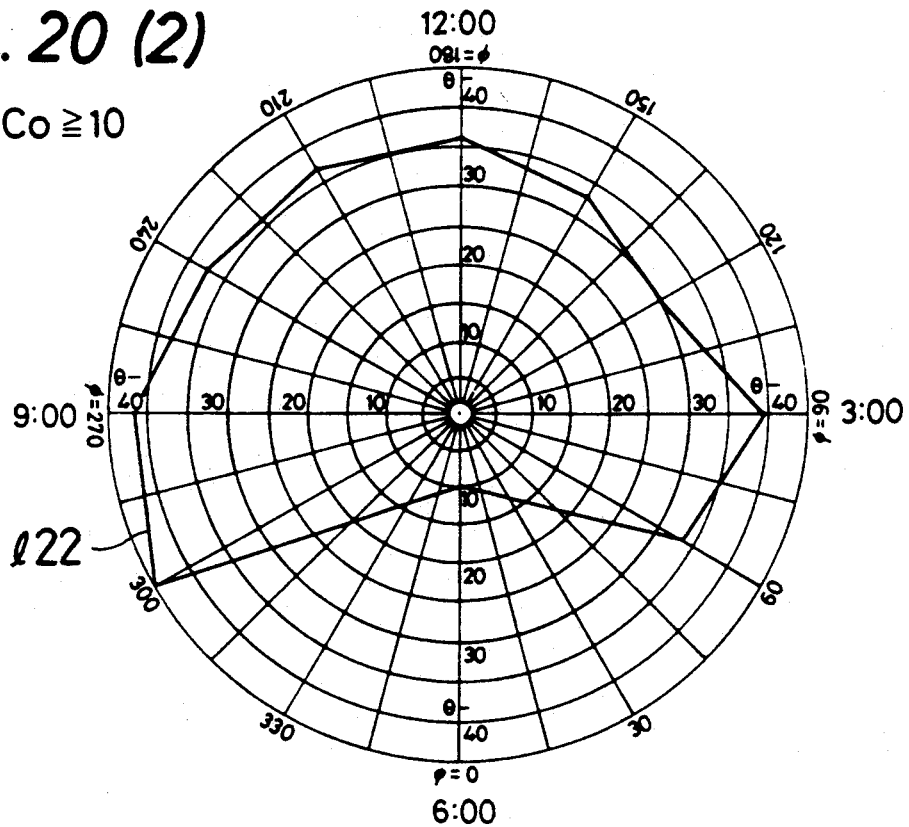
Fig. 20 (2) Co ≥ 10

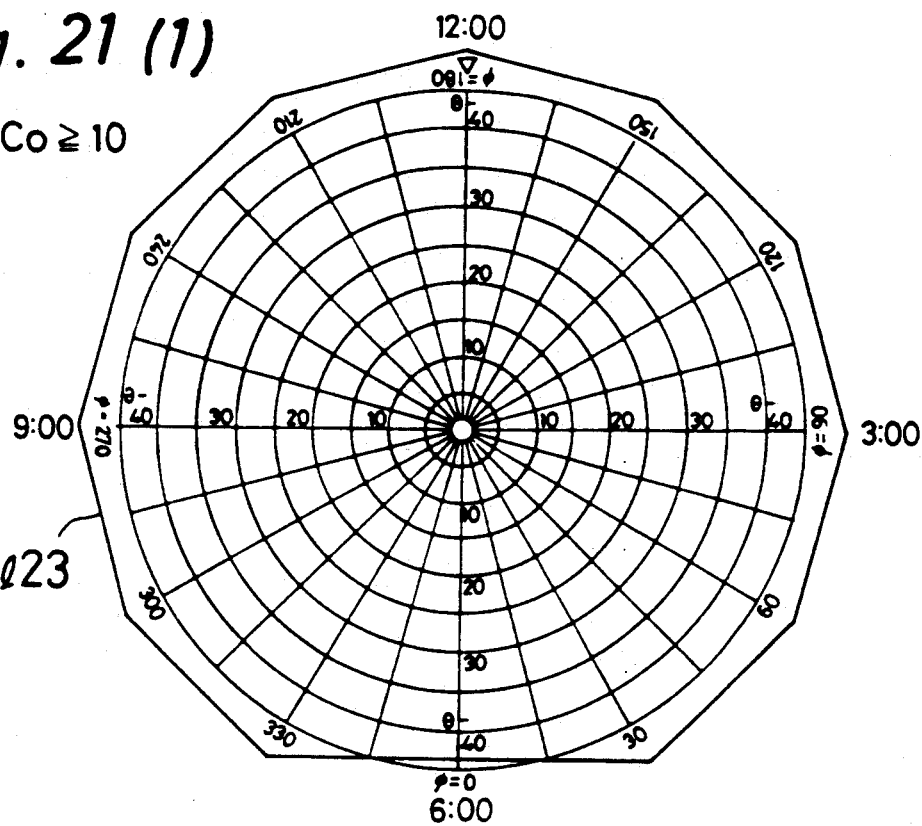
Fig. 21 (1)
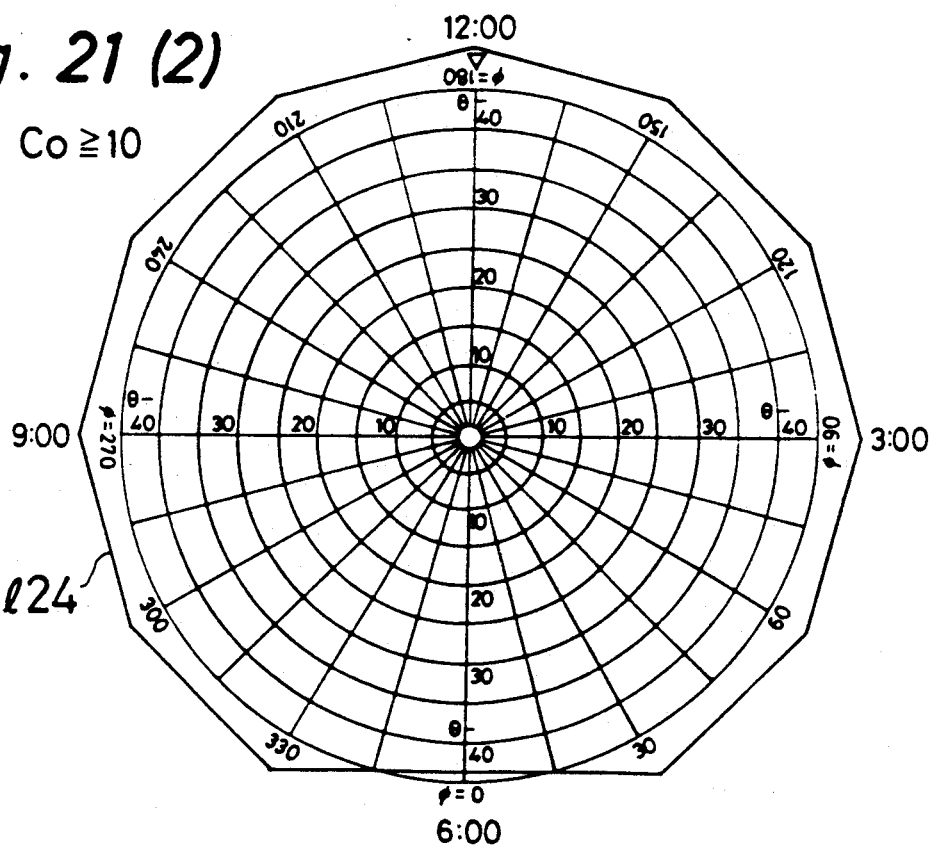
Fig. 21 (2)

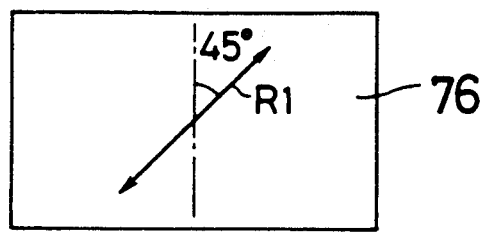
Fig. 29 (1)
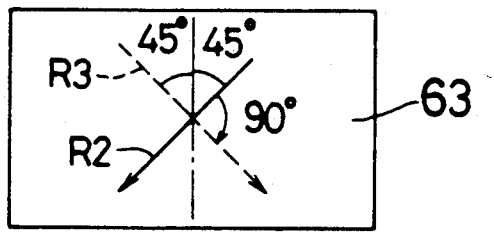
Fig. 29 (2)
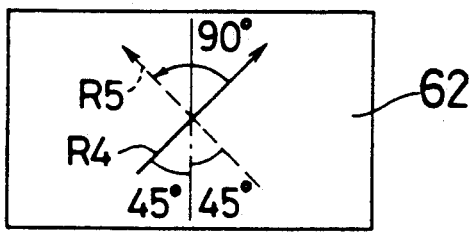
Fig. 29 (3)
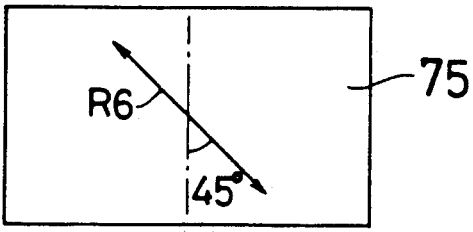
Fig. 29 (4)

Fig. 30
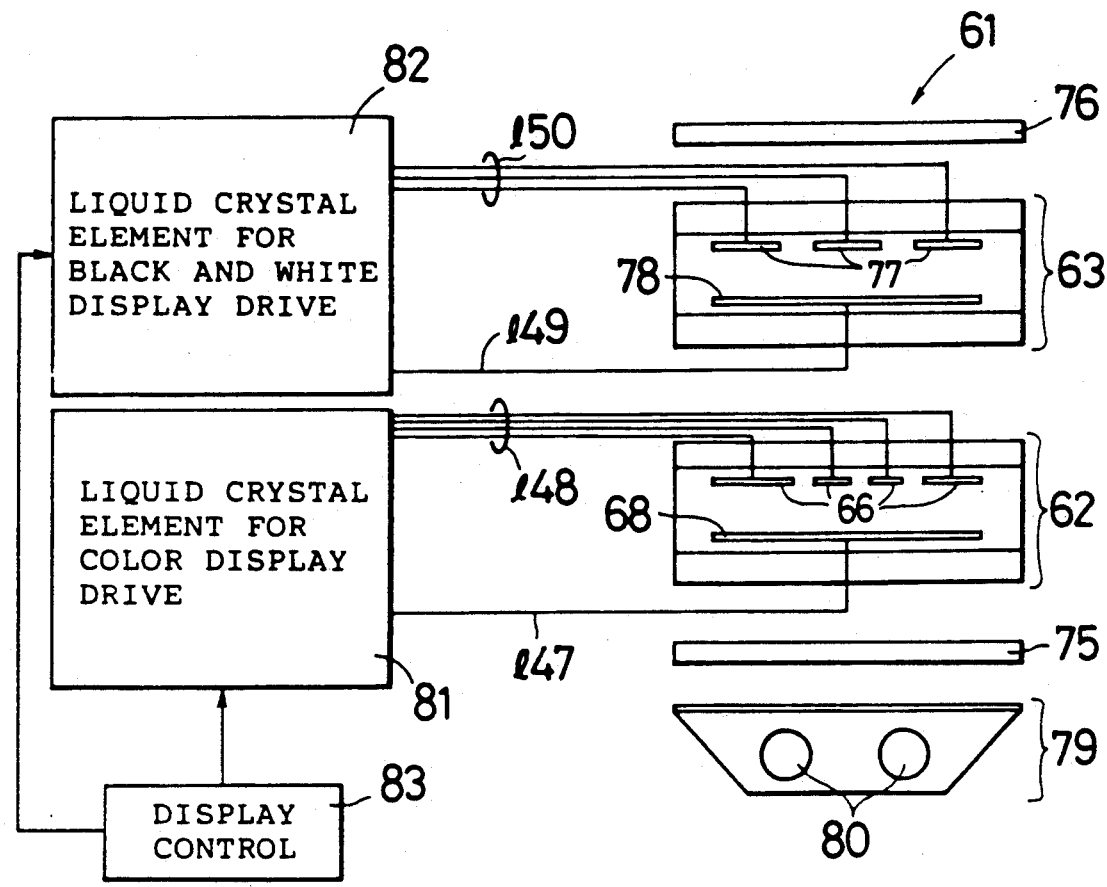
Fig. 31 (1)
Fig. 31 (2)
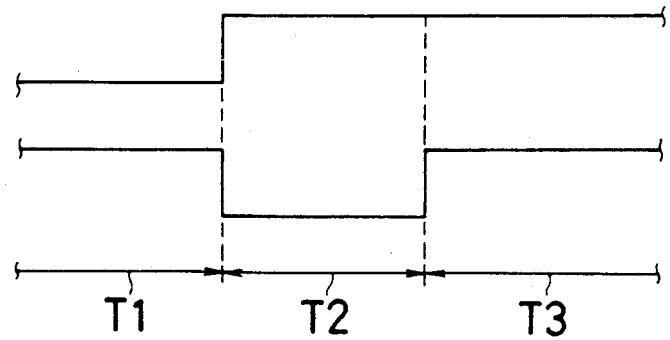
T1  T2  T3

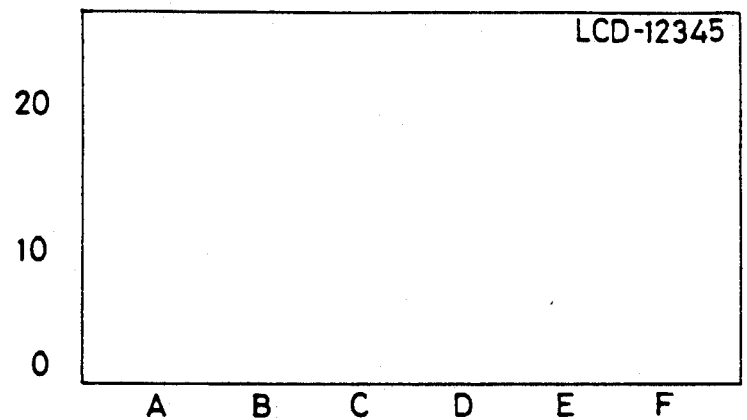
Fig. 32 (1)
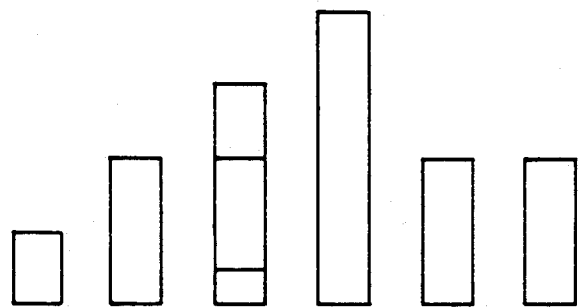
Fig. 32 (2)
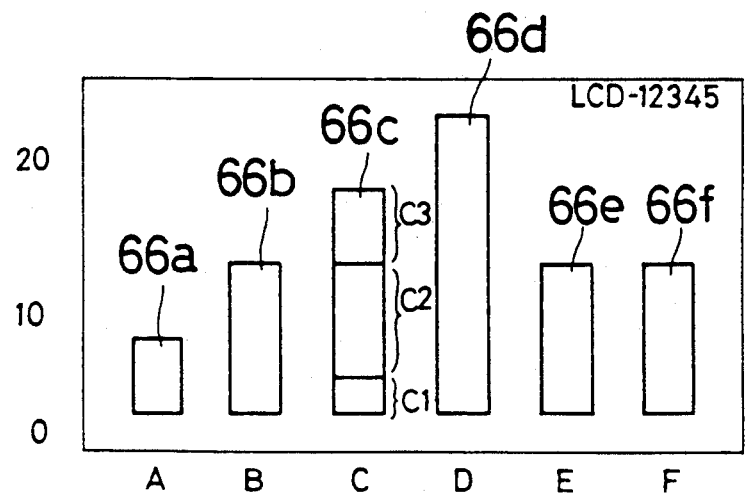
Fig. 32 (3)

Fig. 33 (1)
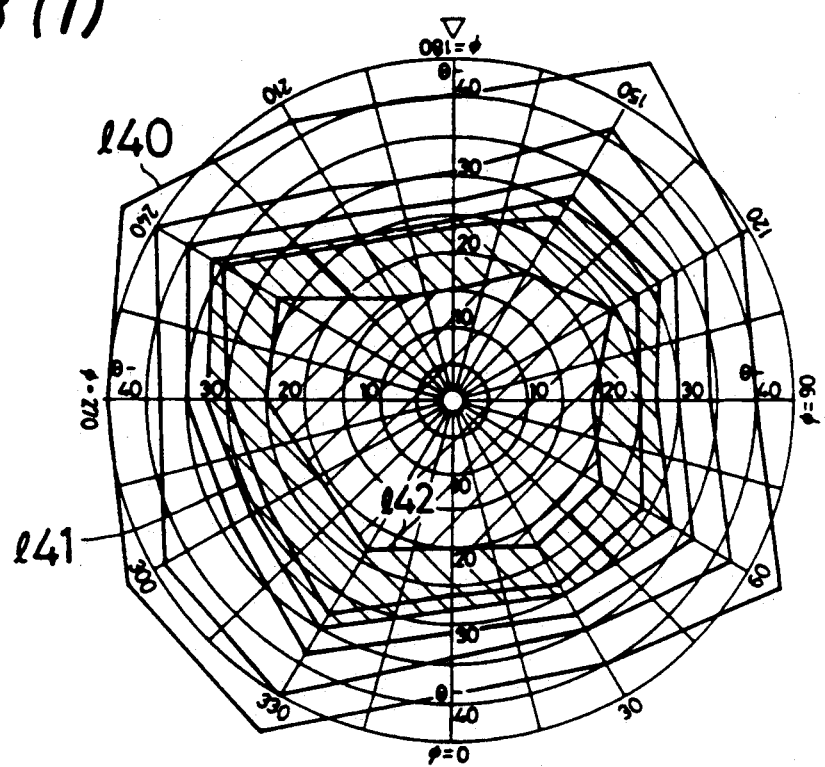
Fig. 33 (2)
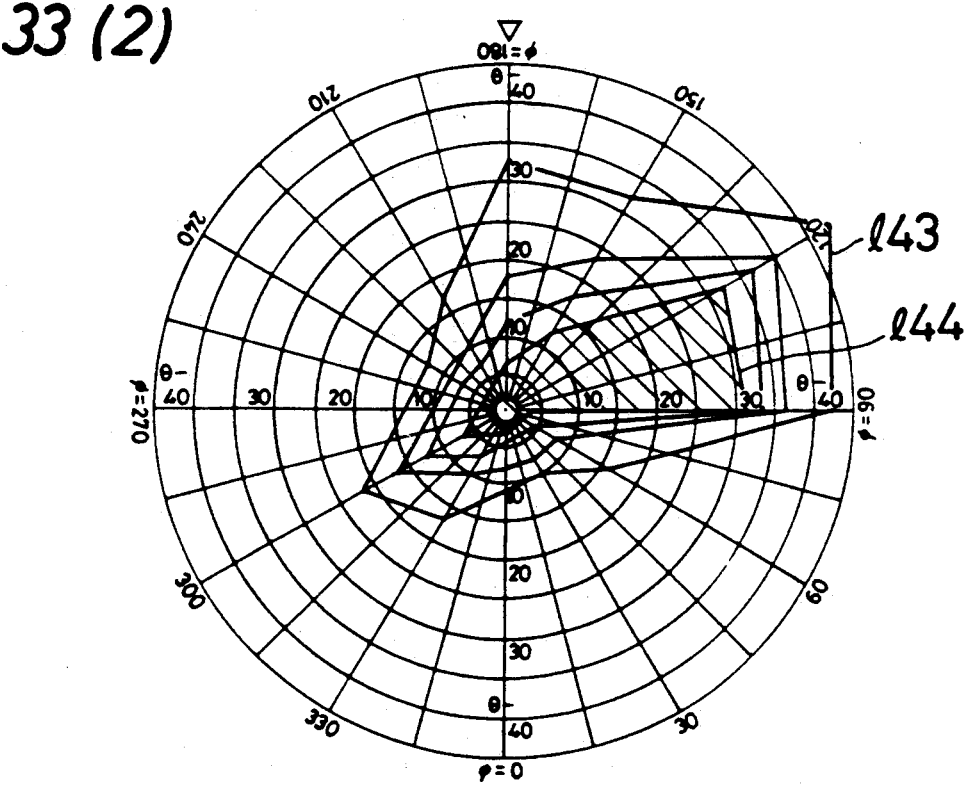

Co ≥ 10

Co ≥ 10

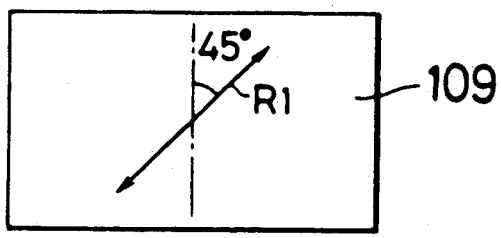
Fig. 39 (1)
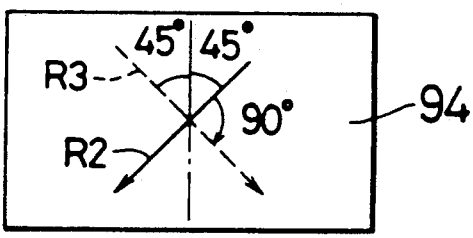
Fig. 39 (2)
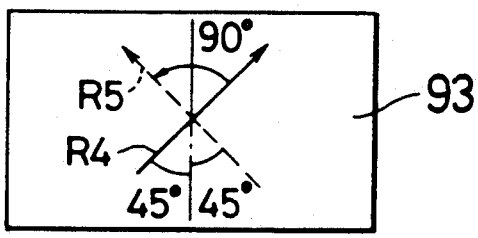
Fig. 39 (3)
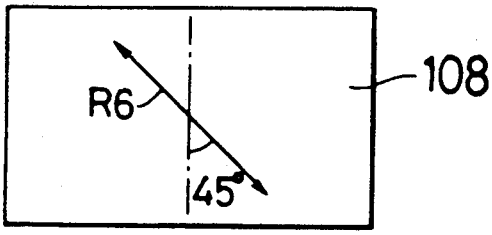
Fig. 39 (4)

Fig. 40
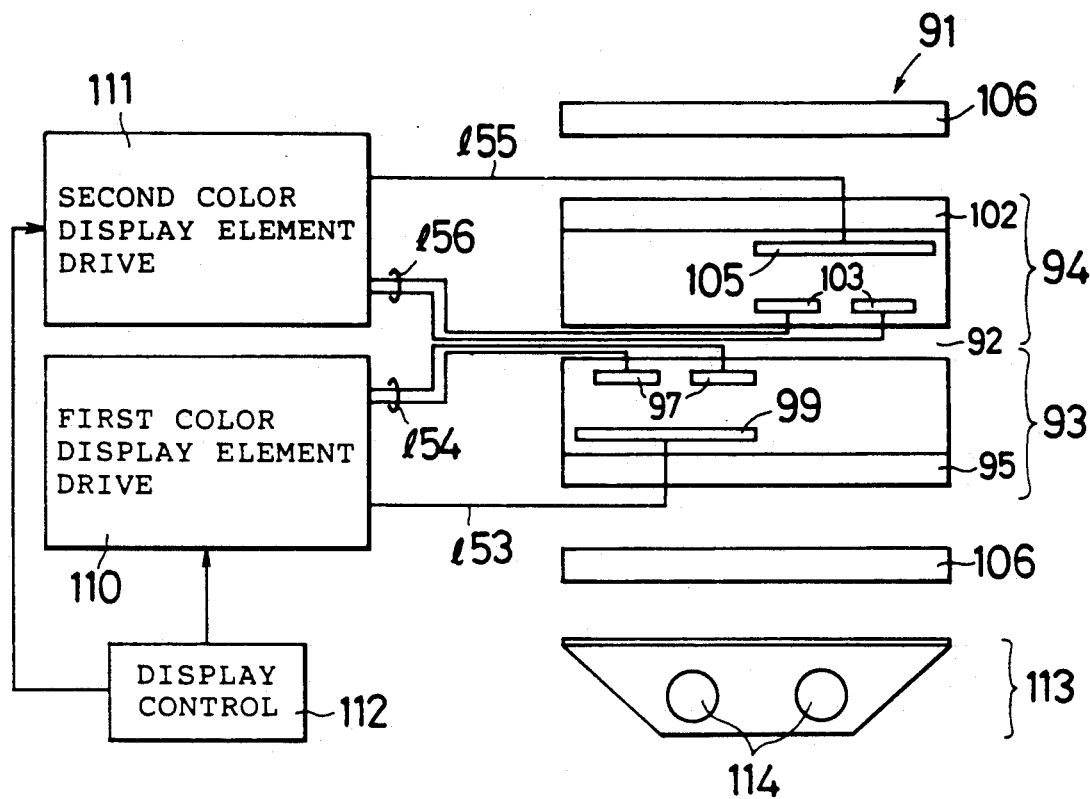
Fig. 41 (1)
Fig. 41 (2)
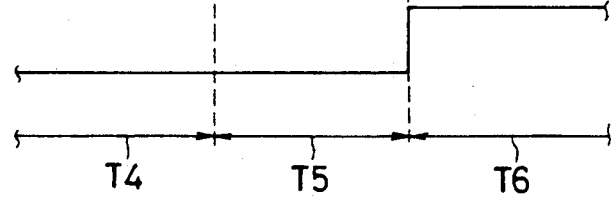

Fig. 42 (1)
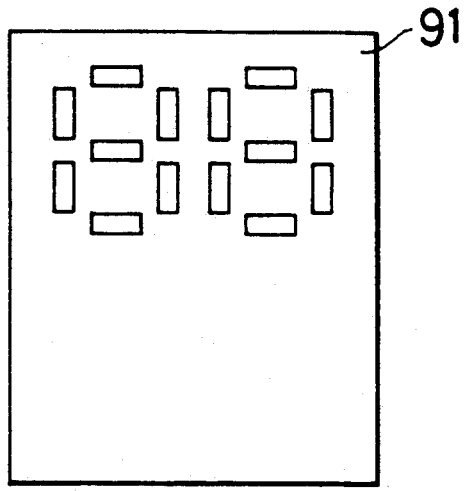
Fig. 42 (2)
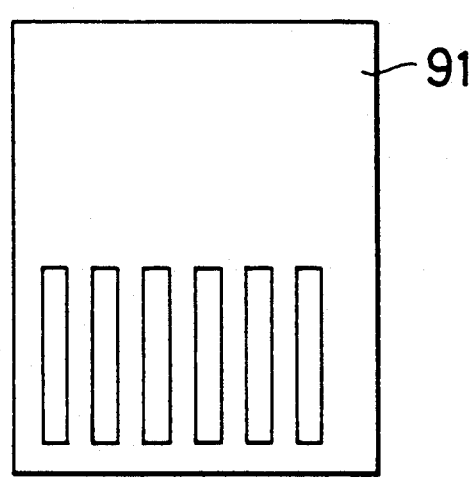
Fig. 42 (3)
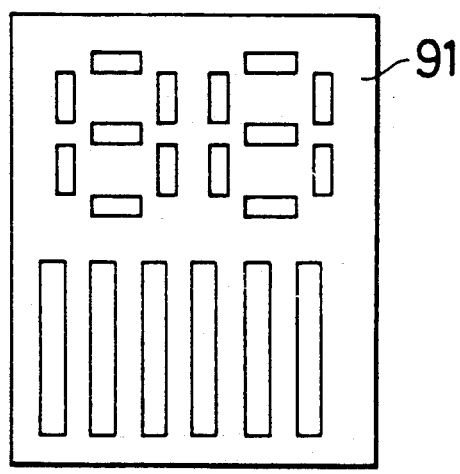

Fig. 43 (1)
Co ≥ 10
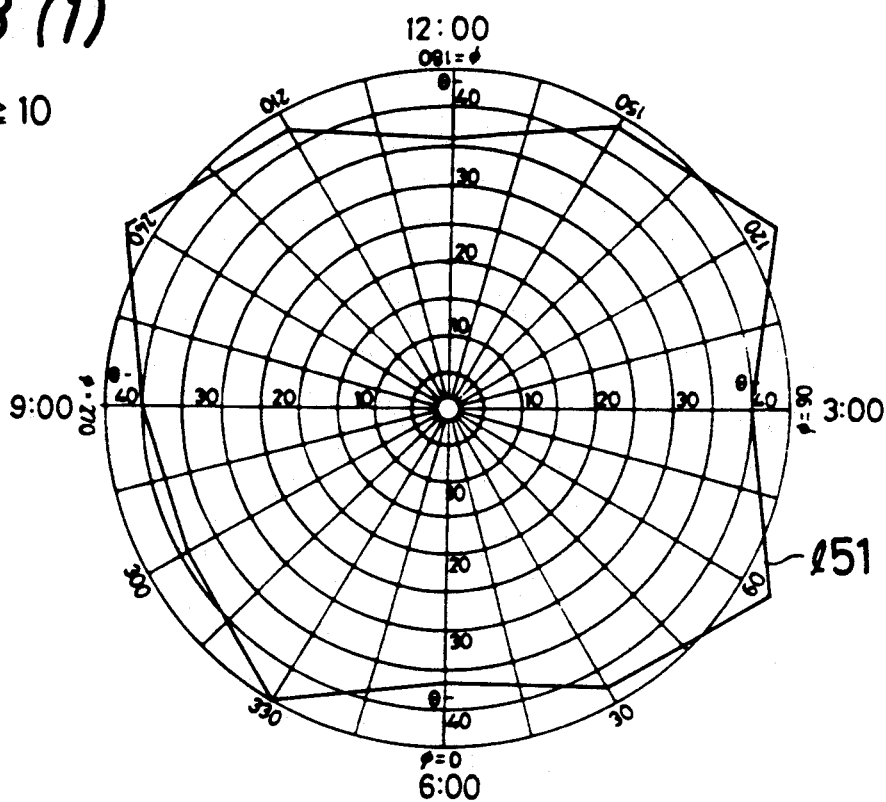
Fig. 43 (2)
Co ≥ 10
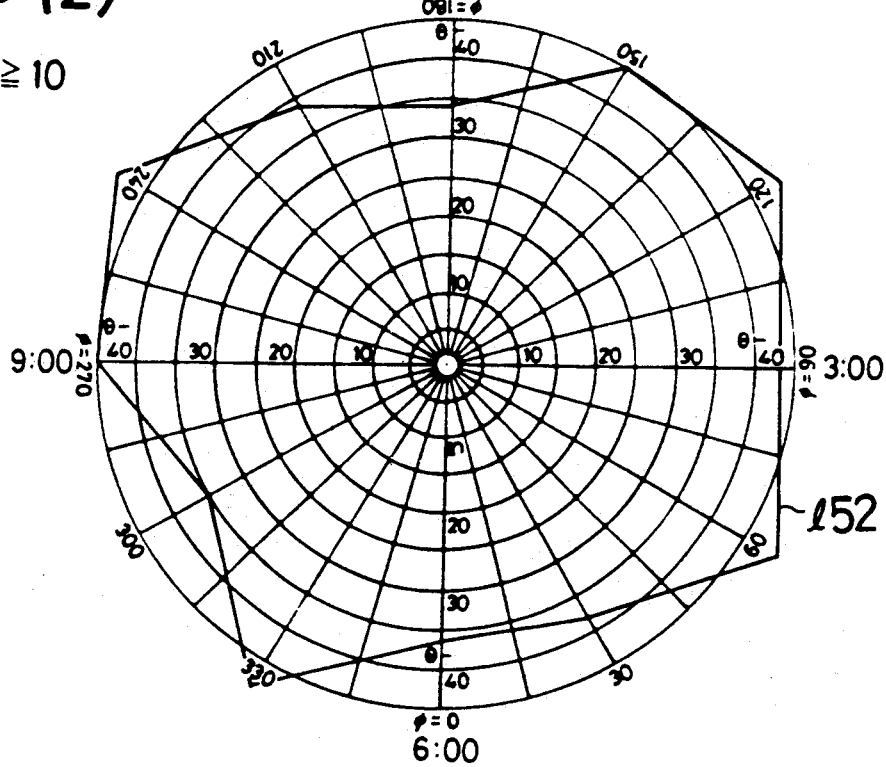

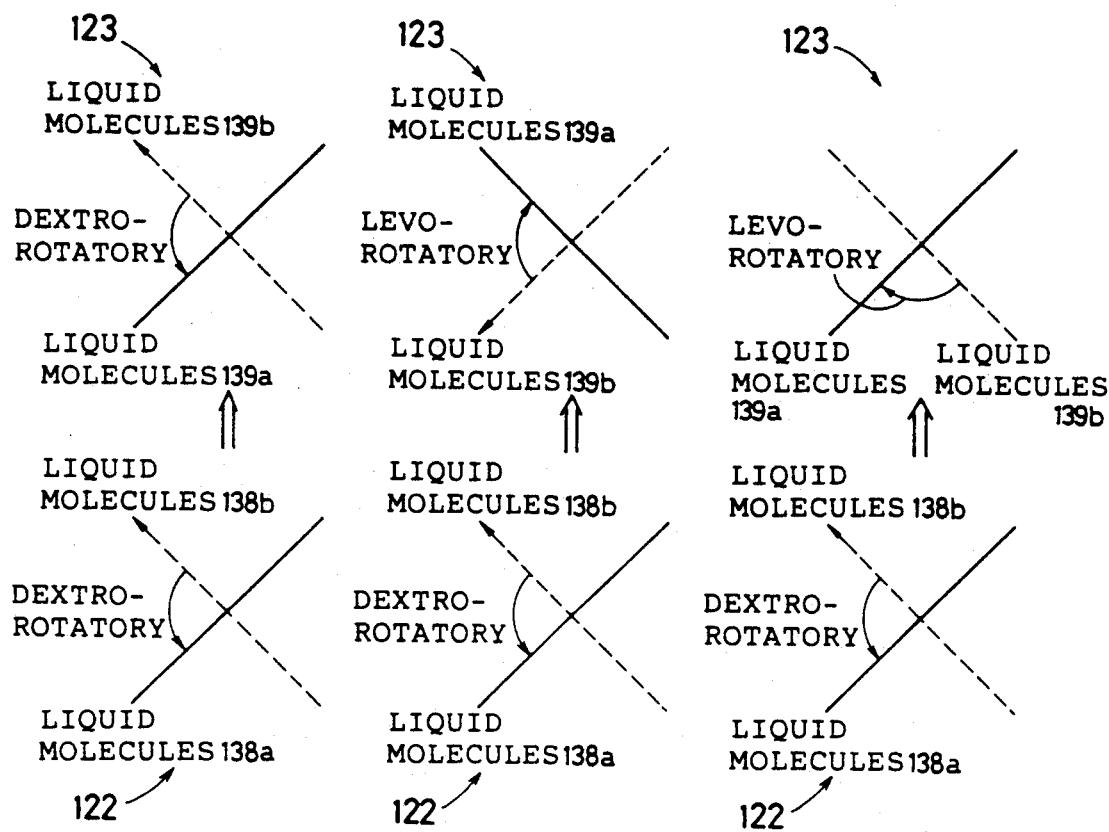
Fig.49(1)   Fig.49(2)   Fig.49(3)
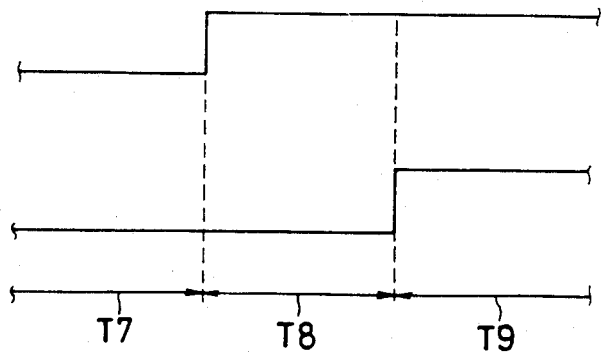
Fig.50(1)
Fig.50(2)

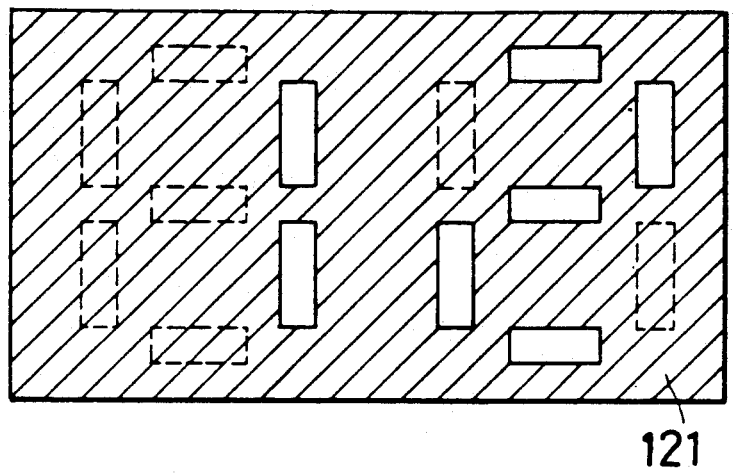
Fig. 51 (1)
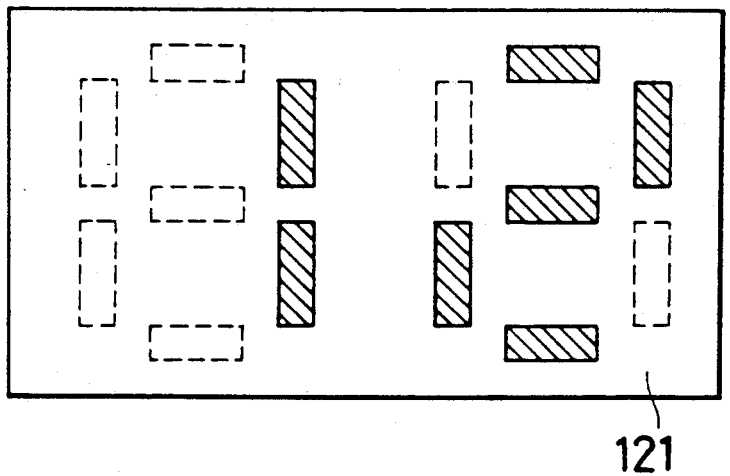
Fig. 51 (2)

Fig. 52 (1)
Co ≧ 10
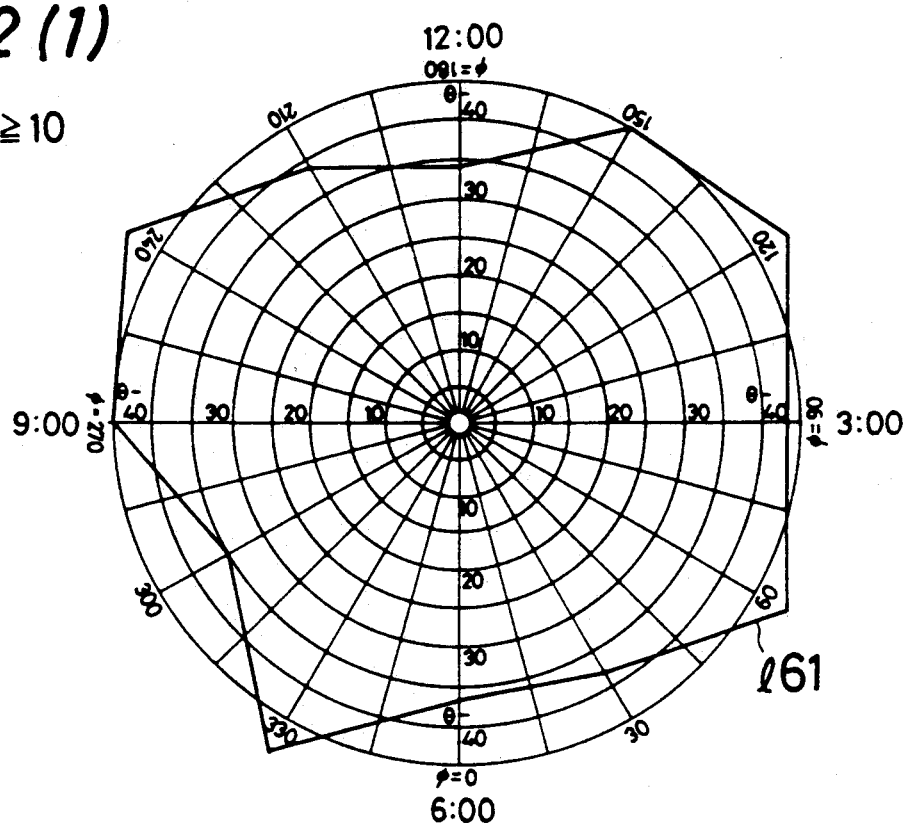
Fig. 52 (2)
Co ≧ 10
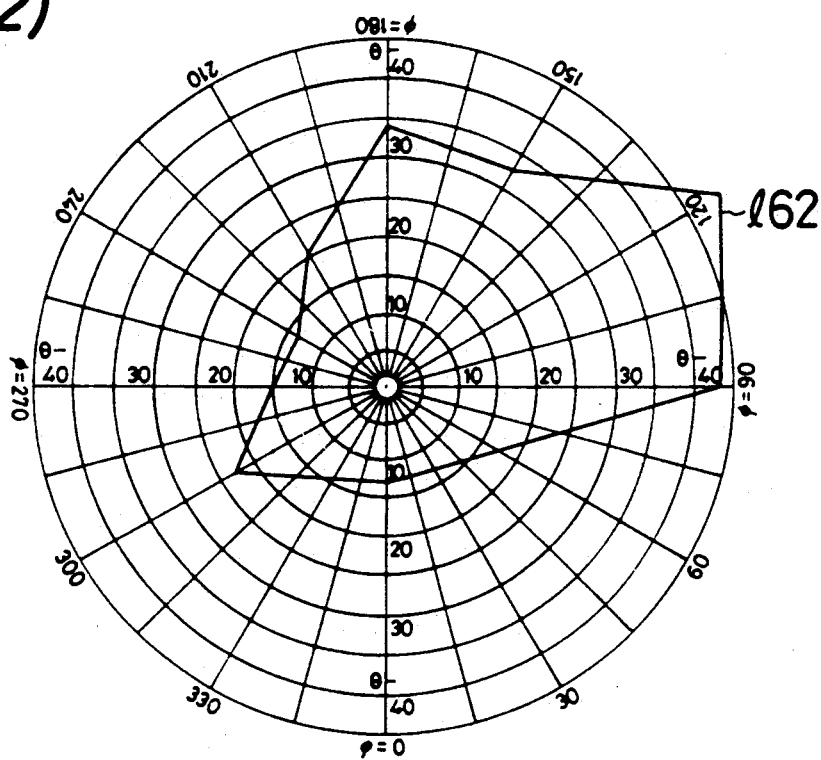

Fig.54 (1)
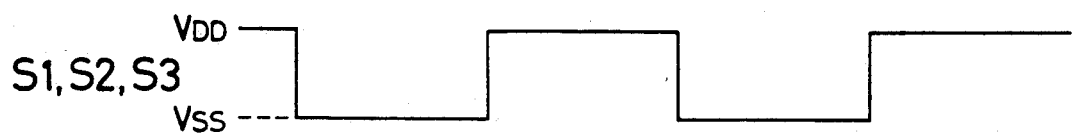
Fig.54 (2)
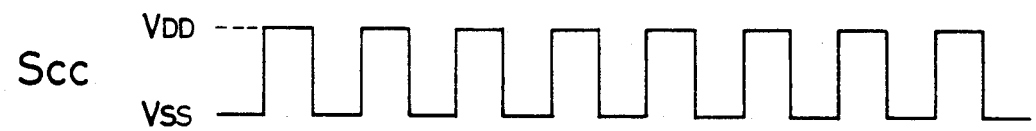
Fig.54 (3)
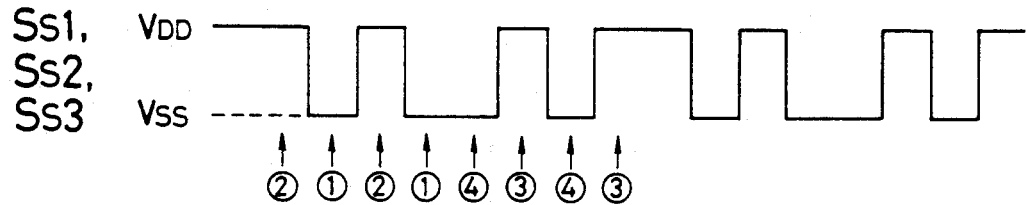
Fig.54 (4)
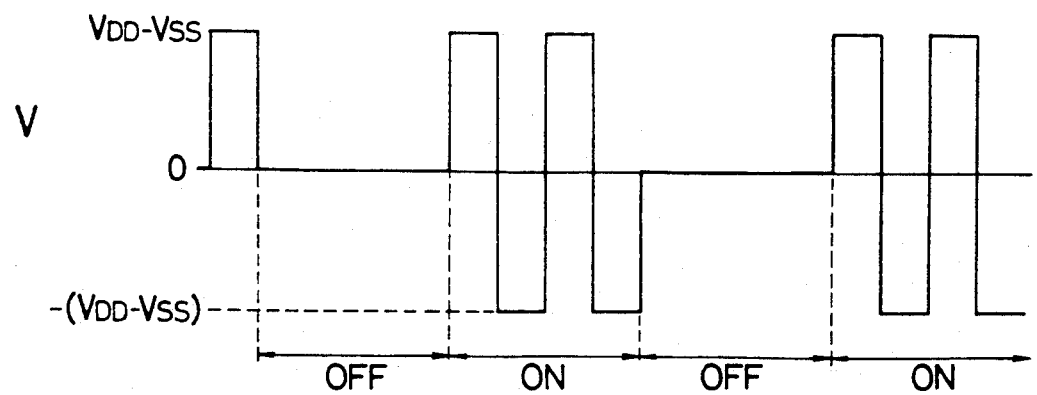

Fig.55 (1)
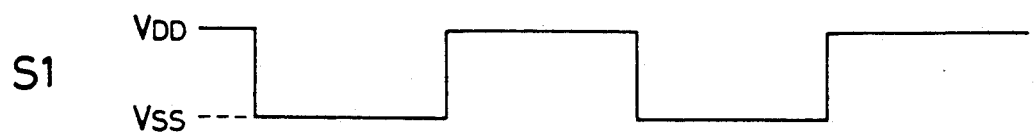
Fig.55 (2)
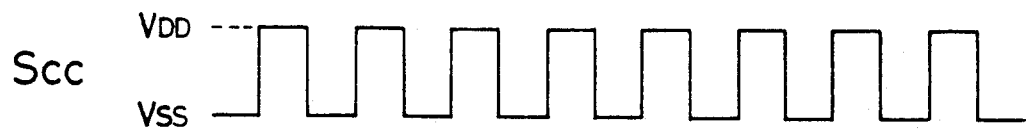
Fig.55 (3)
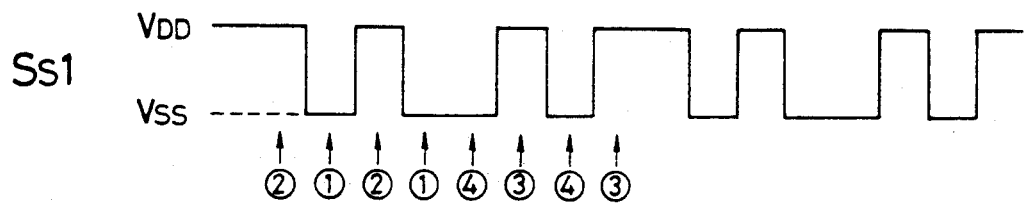
Fig.55 (4)
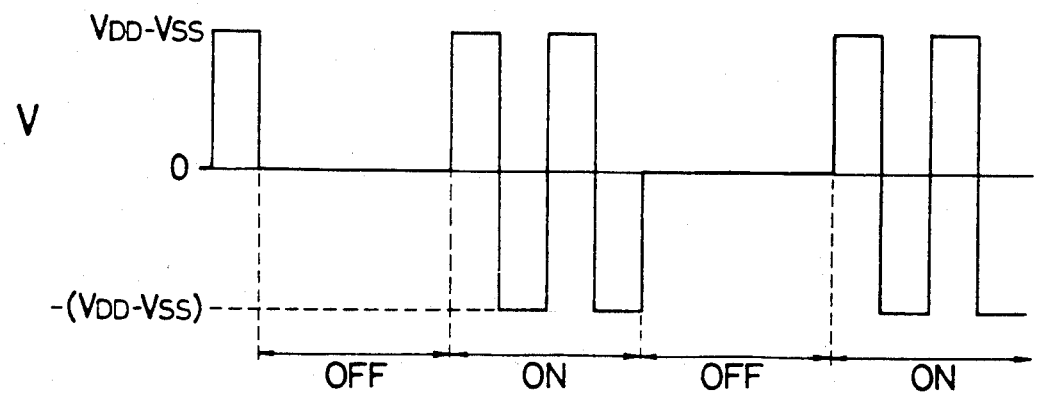

TWO CELLED COLOR LIQUID CRYSTAL DISPLAY DEVICE

BACKGROUND OF THE INVENTION

1. Field of the Invention

The present invention relates to segment type color liquid crystal display devices which display prescribed characters, graphics, etc., in color.

2. Description of the Prior Art

FIG. 1 is a plane view of a segment type liquid crystal display device 230 of the prior art. A plurality of segment electrodes 233 are arranged in the liquid crystal display device in a figure eight. Area A1 has a color filter, colored red for example, area A2 has a green color filter and areas A3 to A5 have blue color filters.

FIG. 2 is a cross section of the liquid crystal display device 230. The liquid crystal layer 237 is sandwiched between the glass substrates 231a and 231b transmissive to light and sealed by the sealant resin 238. A plurality of segment electrodes 233 are formed on the surface of the glass substrate 231a toward the liquid crystal layer 237, and also formed on this surface is an orientation film 234a. A plurality of common electrodes 232 are formed on the surface of the glass substrate 231b toward the liquid crystal layer 237, and also formed on this surface is an orientation film 234b. Polarizer plates 235a and 235b are provided on the surfaces of the glass substrates 231a and 231b opposite the liquid crystal layer 237. The red, green and blue color filters 236 mentioned above are formed on areas of the polarizer plates 235a including the segment electrodes 233 by a printing process.

FIG. 3 is a cross section of another configuration of the liquid crystal display device 230. Here, the color filters 236 are formed above the common electrodes 232 by an electrodeposition process or a printing process in order to eliminate color shifts due to parallax in the display area.

In this kind of normally black mode (negative display type) of liquid crystal display device 230, a voltage is applied between the common electrode 232 and the electrodes corresponding to the display areas to be displayed from among the segment electrodes 233 in the area A1, whereby light is allowed to pass through the liquid crystal layer corresponding to the segment electrodes on which the voltage is applied and a red color is displayed. In the other areas, as well, the same method is used to display green and blue.

In the liquid crystal display device disclosed in U.S. Pat. No. 3,840,695, color filters are disposed on the front and rear surfaces of the liquid crystal display element so only one color can be displayed in a single unit area.

Generally, liquid crystals are dependent on the light wavelength, so the blockage of light in the liquid crystal display device is not complete; i.e., light cannot be blocked over the entire visible wavelength band. Therefore, when performing positive display (black display color on a white background) in the liquid crystal display device 230, light passes through the liquid crystal layer 237 even when voltage is not applied on the liquid crystal layer 237, so the area A1 colored red in FIG. 1 can be distinguished from the other areas, thus degrading the display quality of the liquid crystal display device 230. Also, in the case of negative display (white display color on a black background), the blockage of light by the liquid crystal layer 237 is not complete, so when voltage is not being applied, the shape of the color filters 236 can be seen, thus degrading the display quality.

Further, since the display colors of the display areas are determined by the colors of the color filters at the process of production of the liquid crystal display device, the same display area cannot display different colors, thus detracting from the diversity of display and applicability.

Liquid crystal display devices utilizing a construction of arrangement, fine stripe-shaped color filters straight were disclosed in Japanese Laid-Open Patent Publications 60-260921, 61-239220 and 62-091917 to solve the above problems.

FIG. 4 is a cross section of a segment type color liquid crystal display device 301 utilizing stripe-shaped color filters. A color filter 305 is provided on nearly the entire surface of one surface of the glass substrate 304a, which is transmissive to light, by means of a printing process or an electrode position color process, and a plurality of segment electrodes 306 are formed on the color filter 305 corresponding to predetermined display areas. The color filter 305 is formed in a stripe shape parallel to the surface of the paper in FIG. 4 and a plurality of red, green and blue filters is arranged in a predetermined order in a direction perpendicular to the surface of the paper in FIG. 4. The segment electrodes 306 comprise an electrode for red, an electrode for green and an electrode for blue corresponding to the red filter, green filter and blue filter.

On one surface of the glass substrate 304b transmissive to light is formed a plurality of common electrodes 308 over the areas containing the display areas corresponding to the segment electrodes 306, and then an orientation film 307b is formed on the surface. The glass substrates 304a and 304b are disposed so that the surfaces face each other on which the orientation films 307a and 307b are formed, and a twisted nematic crystal layer 309 is sandwiched between the glass substrates 304a and 304b and sealed with a sealant resin 310. The surfaces of the glass substrates 304a and 304b opposite the liquid crystal layer 309 are each provided with polarizer plates 311 and 312.

Here, the polarizer plates 311 and 312 are disposed to achieve parallel polarization, and so-called in 90° twisted "normally black" display is performed; i.e., light is not allowed to pass through the liquid crystal display when voltage is not applied. By applying a voltage on one of the three electrodes which make up the segment electrodes 306, the desired color can be displayed at the display area corresponding to the segment electrodes 306. For example, when a voltage is applied on only the electrode for red, red is displayed in the display area, and when voltages are simultaneously applied on the electrode for red and the electrode for green, yellow can be displayed by the mixing of the red and green colors. Further, when voltages are simultaneously applied on the electrode for red, the electrode for green and the electrode for blue, white can be displayed.

The segment type color liquid crystal display device 301, which has the stripe shaped color filter 305 formed on the entire display area surface as mentioned above, can select so-called normally white display and normally black display by the arrangement of the polarizer plates. In the case of normally black display in construction of a single layer type liquid crystal display element, the incident light becomes elliptically polarized by the rotatory dispersion phenomenon in the liquid crystal, a leakage of transmitted light through the liquid crystal layer takes place even when voltage is not being applied, and a drop in the contrast of the image plane occurs.

The characteristics of the visual angle which is a measurement value by this inventor in the prior art segment type liquid crystal display device 1 are shown in FIG. 5. The solid lines 171 through 174 indicate the equal contrast curves when the contrast ratio CONT is 10, 20, 30, and 40 respectively. Therefore, the areas enclosed by each of the equal contrast curves 171 through 174 are the visual angle ranges when the contrast ratio CONT is 10, 20, 30 and 40.

As mentioned above, in the liquid crystal display device 301 wherein the color filter 305 is arranged in a stripe shape, when a color filter with a different kind of color is combined and a color different than the color of the color filter is displayed, there is a drop in the degree of mixing of the displayed color and in the clarity of the display color, and thus there was the problem of the display quality deteriorating.

Further, there was the problem of a leakage of light occurring and the contrast dropping in the normally black mode, because the liquid crystal display device 301 has a single layer structure.

In order to solve this kind of problem, a liquid crystal display device has been developed which has a two-layered construction with a liquid crystal display element for display and a liquid crystal element for compensation.

FIG. 6 is a cross section diagram of the two-layered liquid crystal display device 401. The liquid crystal display device 401 has a liquid crystal display element for display 402 and a liquid crystal display element for compensation 403, wherein the transparent common electrodes 405a, 405b, 405c and the segment electrodes 406a, 406b and 406c are formed on the pair of glass substrates 404a and 404b of the liquid crystal display element 402, and the color filter 407 is formed across the entire surface of the glass substrate 404a.

The color filter 407 is composed of minute stripe shaped filters, for example of red, green and blue, which are adjacent to one another and formed in large numbers across nearly the entire surface of the glass substrate 404a. The orientation films 408a and 408b are formed by coating nearly the entire surfaces of the glass substrates 404a and 404b, between which, for example, the twisted nematic type liquid crystal layer 409 is injected, and the periphery is sealed by the sealant 410.

On the other hand, the orientation films 412a and 412b are formed on the glass substrates 411a and 411b of the liquid crystal display element 403, between which also the twisted nematic type liquid crystal layer 413 is injected, and the periphery is sealed with the sealant 414. The polarizer plates 415a and 415b are arranged on the surfaces of the glass substrates 411a and 404b respectively which are on their mutually opposite sides.

One of the following is established for the liquid crystal display element 403: (1) a function which compensates the difference in the refractive indexes of the ordinary light and the extraordinary light in the liquid crystal display element 402, (2) a function which compensates the rotatory dispersion in the liquid crystal display element 402, or (3) a function which realizes the functions in (1) and (2) at the same time. This kind of liquid crystal display device 401 achieves normally black display when the polarizer plates 415a and 415b which are used are in the so-called cross polarization state, and the arrangement of the polarizer plates 415a and 415b is selected so that normally white display is achieved when they are in the parallel polarization state.

Here each of the areas of the color filter 407 which correspond to the segment electrodes 406a, 406b and 406c are the color filters 407R, 407G and 407B which selectively transmit red, green and blue light respectively, and a case will be assumed wherein the arrangement of the polarizer plates 415a and 415b is in the so-called normally black state. Then the display of 4 colors can be achieved corresponding to the display voltage application (ON)/non-application (OFF) state with respect to the segment electrodes 406a, 406b, and 406c, as shown in state 1, state 2, state 3 and state 4 respectively in the example 1 section of Table 1 below. Here the states 1, 2 and 3 indicate respectively the cases where the segment electrodes 406b and 406c are connected in common, or where the segment electrodes 406a and 406c are connected in common, or where the segment electrodes 406a and 406b are connected in common, and the display of 4 colors can be achieved in each example.

TABLE 1

| | | Segment Electrodes ON/OFF State | | | Negative Type (Normally Black) Light Shutter | | | Display color |
|---|---|---|---|---|---|---|---|---|
| | | R | G | B | R | G | B | |
| Example 1 | 1 | OFF | OFF | OFF | • | • | • | Black |
| | 2 | ON | OFF | OFF | ○ | • | • | Red |
| | 3 | OFF | ON | ON | • | ○ | ○ | Cyan |
| | 4 | ON | ON | ON | ○ | ○ | ○ | White |
| Example 2 | 1 | OFF | OFF | OFF | • | • | • | Black |
| | 2 | OFF | ON | OFF | • | ○ | • | Green |
| | 3 | ON | OFF | ON | ○ | • | ○ | Magenta |
| | 4 | ON | ON | ON | ○ | ○ | ○ | White |
| Example 3 | 1 | OFF | OFF | OFF | • | • | • | Black |
| | 2 | OFF | OFF | ON | • | • | ○ | Blue |
| | 3 | ON | ON | OFF | ○ | ○ | • | Yellow |
| | 4 | ON | ON | ON | ○ | ○ | ○ | White |

The display picture images of the above mentioned segment type color liquid crystal display devices 230, 301 and 401 are determined by the shapes of the segment electrodes 233, 306 and 406, and are inferior in the aspect of display diversity as they cannot be changed after the color liquid crystal display devices 230, 301 and 401 are manufactured.

In order to improve the diversity of the display, it is possible to display two kinds of display image planes in one color liquid crystal display device by stacking two of the liquid crystal devices for color display 402 shown in the above mentioned FIG. 6, forming the segment electrodes 406 to correspond respectively to different color filters, and forming each of them in different shapes. However, in this kind of liquid crystal display device, moire stripes are generated due to the stacking of two color filter. Moire stripes are the fine patterns resulting from the overlapping of two regular patterns and moire stripes seem to be wave patterns or clouing patterns corresponding to an angle of seeing.

Further, the color filter 407 is formed with stripe shaped filters of three colors (red filters, green filters and blue filters) which are of a width that cannot be distinguished by the naked eye, and it is possible to display one display image plane in different colors by forming the segment electrodes 406 to correspond to each filter. However, when a plurality of colors are combined and displayed, the degree of mixing and the clarity of color drop with respect to visual observation of the displayed color, resulting in the problem of deterioration in the display quality.

In the above mentioned liquid crystal display device 401, normally white display is realized instead of normally black display when put into a parallel polarization state by changing the arrangement of the polarizer plates 415a and 415b. In this case, selection of the transmission state for the red, green and blue transmitted light is achieved as shown in Table 2 below.

TABLE 2

|  |  | Segment Electrodes ON/OFF State | | | Positive Type (Normally White) | | | |
|---|---|---|---|---|---|---|---|---|
|  |  | R | G | B | Light Shutter | | | Display color |
|  |  |  |  |  | R | G | B |  |
| Example 1 | 1 | OFF | OFF | OFF | • | • | • | White |
|  | 2 | ON | OFF | OFF | ○ | • | • | Cyan |
|  | 3 | OFF | ON | ON | • | ○ | • | Magenta |
|  | 4 | ON | ON | ON | ○ | ○ | • | Blue |
| Example 2 | 1 | OFF | OFF | OFF | • | • | • | White |
|  | 2 | OFF | ON | OFF | ○ | • | • | Cyan |
|  | 3 | ON | OFF | ON | • | • | ○ | Yellow |
|  | 4 | ON | ON | ON | ○ | • | ○ | Green |
| Example 3 | 1 | OFF | OFF | OFF | • | • | • | White |
|  | 2 | OFF | OFF | ON | • | ○ | • | Magenta |
|  | 3 | ON | ON | OFF | • | • | ○ | Yellow |
|  | 4 | ON | ON | ON | • | ○ | ○ | Red |

In this kind of example of the prior art, only four colors are displayed with normally black display and normally white display for any of the compositions of the examples 1 through 3 in Table 1, resulting in the problem of a limitation being imposed on the display diversity as a color liquid crystal display device.

In the above mentioned liquid crystal display device 401, transparent electrodes are formed across nearly the entire surfaces of the glass substrates 411a and 411b of the liquid crystal display element 403 in order to switch the normally black display and the normally white display, and a technique for switching the application and non-application of the voltage to these transparent electrodes of the liquid crystal display element 403 is assumed. The case wherein the voltage is not apply corresponds to the above mentioned normally black state. In the case where transparent electrodes are formed on the liquid crystal display element 403 and the voltage is applied, the display state of the liquid crystal display device 401 becomes the so-called normally white state, and the transmission state of all red, green and blue transmitted light is selected as shown in Table 3 below.

TABLE 3

|  |  | Segment Electrodes ON/OFF State | | | Positive Type (Normally White) | | | |
|---|---|---|---|---|---|---|---|---|
|  |  | R | G | B | Light Shutter | | | Display color |
|  |  |  |  |  | R | G | B |  |
| Example 1 | 1 | OFF | OFF | OFF | • | • | • | White |
|  | 2 | ON | OFF | OFF | ○ | • | • | Cyan |
|  | 3 | OFF | ON | ON | • | ○ | ○ | Red |
|  | 4 | ON | ON | ON | ○ | ○ | ○ | Black |
| Example 2 | 1 | OFF | OFF | OFF | • | • | • | White |
|  | 2 | OFF | ON | OFF | • | ○ | • | Magenta |
|  | 3 | ON | OFF | ON | ○ | • | ○ | Green |
|  | 4 | ON | ON | ON | ○ | ○ | ○ | Black |
| Example 3 | 1 | OFF | OFF | OFF | • | • | • | White |
|  | 2 | OFF | OFF | ON | • | • | ○ | Yellow |
|  | 3 | ON | ON | OFF | ○ | ○ | • | Blue |

TABLE 3-continued

|  | Segment Electrodes ON/OFF State | | | Positive Type (Normally White) | | | |
|---|---|---|---|---|---|---|---|
|  | R | G | B | Light Shutter | | | Display color |
|  |  |  |  | R | G | B |  |
| 4 | ON | ON | ON | ○ | ○ | ○ | Black |

In this case, which corresponds to the switching from normally black display to normally white display, that is the background color is switched from black to white, for example as opposed to the case of state 1 in the example 1 section of Table 1, wherein display voltage is applied to only the segment electrode 406a while the display voltage to segment electrodes 406b and 406c is shut off, (R, G, B)= (ON, OFF, OFF) and the display color was red, the display color changes to cyan, which is the complementary color of red, regardless of the fact that the voltage application/non-application state of the segment electrodes 406a through 406c in the liquid crystal display element 402 does not change. The other display colors of light cyan and white in the example 1 section of Table 3 also change in the same way to red and black. The display colors of the other example sections 2 and 3 are also the same. Because of this, there is the problem of a limit being imposed on the diversity of display as a color liquid crystal display device.

SUMMARY OF THE INVENTION

The object of the invention is to solve the above technical problems and to provide a color liquid crystal display device wherein the display quality is markedly improved in display diversity and color display.

Another object of the invention is to provide a color liquid crystal display device which can prevent a drop in contrast through the display of black having no coloration in the color display of the so-called normally black display.

This invention is a color liquid crystal display device comprising a pair of light-transmissive substrates with a liquid crystal layer between them, a plurality of light selection members disposed over the entire surface of one side in the direction of thickness of the light-transmissive substrates and which select a color for the transmitted light from among a plurality of predetermined colors, and light-transmissive display electrodes disposed in the display area of the light-transmissive substrate on the side toward the liquid crystal layer and formed within a range corresponding to the plurality of color selection members selected according to the predetermined color to be displayed in the display area.

Further, the color selection members in this invention are square shaped and arranged in a mosaic, and the display electrodes corresponding to the color selection members which select the same color are connected in sequence.

According to this invention, a plurality of light selection members which select a color for the transmitted light from among a plurality of predetermined colors is provided over the entire surface of one side in the direction of thickness of a pair of light-transmissive substrates with a liquid crystal layer between them, and light-transmissive display electrodes are provided in the display area of the light-transmissive substrates on the side toward the liquid crystal layer and are formed within a range corresponding to the plurality of color selection members selected according to the predetermined color to be displayed in the display area.

Further, the color selection members are square shaped and arranged in a mosaic, and the display electrodes corresponding to the color selection members which select the same color are connected in sequence.

Therefore, the display electrodes are formed corresponding to one type of color selection member, and by applying a voltage on these display electrodes, light is able to pass through the liquid crystal layer. One predetermined color is selected for this transmitted light, and by this means, the predetermined color is displayed in the display area. A greater variety of colors can be displayed in the display area by separately forming display electrodes corresponding to the plurality of color selection members and combining a plurality of colors selected by the color selection members.

Also, since the color selection members are provided over the entire surface of the light-transmissive substrates, the entire surface of the color liquid crystal display device is the same color; that is, the color resulting from the combination of colors selected by each of the color selection members, so even though light may leak through the liquid crystal layer when a voltage is not being applied on the display electrodes, no part will appear as a different color and display quality is improved.

Further, since the color selection members are arranged in a mosaic, when multiple colors are combined, the mixing of the colors being viewed is greatly improved.

As described above, by means of this invention, a plurality of color selection members is provided over the entire surface of the light-transmissive substrate, so desired colors can be displayed in the display area by forming the display electrodes formed in the display area so they correspond to the desired color selection members. That is, by providing separate display electrodes corresponding to the plurality of color selection members, multiple colors can be combined. Further, by this means, colors different from the predetermined colors selected by the color selection members can be displayed in the display area.

Also, since the color selection members are provided over the entire surface of the light-transmissive substrate, even though there may be light leakage in areas other than the display area where voltage is applied, the area other than the display area is the color resulting from the combination of the colors selected by each of the color selection members. Thus, coloration of only specific areas as in the prior art is prevented and display quality is improved.

Further, since the color selection members are arranged in a mosaic, when multiple colors are combined, the mixing of the colors being viewed is greatly improved.

The invention is a color liquid crystal display device comprising a pair of transparent substrates with a liquid crystal layer provided between them, and a plurality of color selection members each of which select one color for the transmitted light from among a plurality of predetermined colors, and are provided across the entire surface of one side of the transparent substrates in their direction of thickness; and a plurality of transparent display electrodes provided in the display area of the transparent substrates on the side of the liquid crystal layer, and each of which are formed in the range corresponding to the plurality of color selection members which are selected corresponding to the predetermined colors that are to be displayed in the display area.

In accordance with the invention, it is possible to perform normally black display wherein the background color is black by making it so that light is not transmitted through the color liquid crystal display device when voltage is not applied. Here, one display electrode is formed corresponding to a predetermined shape and corresponding to the color selection member of the desired color, and it is possible to transmit light through the liquid crystal layer by applying voltage to this display electrode. One predetermined color is selected for this transmitted light by the color selection members, and by this means the shape and predetermined color corresponding to the display electrode is displayed on the liquid crystal display device.

Further, a shape different from the predetermined shape is displayed on the liquid crystal display device by forming one more display electrode corresponding to the desired color selection member in a shape different from the predetermined shape.

Then, it is possible to display still more different colors by individually forming display electrodes corresponding to the plurality of color selection members and combining the plurality of colors selected by the color selection members. Further, since the color selection members are provided across the entire surface of the transparent substrates, the entire surface of the color liquid crystal display device is the same color even in the case where there is leakage of light from the liquid crystal layer when voltage is not applied to the display electrodes; that is, the color resulting from the combination of colors selected by each of the color selection members is displayed so that the appearance of only one section in a different color is prevented, and thus display quality is improved.

Further, the extent of mixing with respect to visual observation of the displayed color is markedly improved by arranging the color selection members in a matrix or mosaic, and thus the display quality is improved.

In this way, it is possible to display a plurality of different display picture images (shapes) each with different colors, and thus display diversity is obtained.

By means of this invention as mentioned above, the display of two kinds of display picture images can be performed without the stacking of two liquid crystal display elements, whereby the diversity and versatility of display for the color liquid crystal display device is improved. Thus, the range of use for the color liquid crystal display device is expanded.

The invention is a color liquid crystal display device made by the stacking of a first and second liquid crystal element each having a pair of transparent substrates:

a first liquid crystal element comprising, a first liquid crystal layer wherein the liquid crystal molecules are oriented in a spiral shape in a predetermined orientation direction;

a plurality of color selection members provided across the entire surface of the display area, each of which select one color for the transmitted light from among a plurality of predetermined colors;

transparent display electrodes provided within the display area of the first liquid crystal layer side, and which are formed in the range that corresponds to the plurality of color selection members that are selected corresponding to the predetermined color that is to be displayed in the display area; and a second liquid crystal element that comprising, a second liquid crystal layer wherein the liquid crystal molecules are oriented in a reverse twist, so that they are in a direction opposite to the orientation direction of the liquid crystal molecules of the first liquid crystal layer.

In accordance with the invention, normally black display wherein the background color is black can be performed by the stacking of a first and second liquid crystal element so that light is not transmitted through the color liquid crystal display device when voltage is not applied, that is by stacking them so that the orientation directions of the liquid crystal molecules most nearly adjacent to one another are crossed. Here, the display electrodes are formed corresponding to the desired color selection members in the first liquid crystal element, and light can be transmitted through the first liquid crystal layer by applying voltage to these display electrodes. One predetermined color is selected by the color selection members for this transmitted light, and by this means the predetermined color is displayed in the display area. Then, it is possible to display still more different colors in the display area by individually forming display electrodes corresponding to the plurality of color selection members and combining the plurality of colors selected by the color selection members.

Further, the transmitted light, which has become elliptically polarized by being transmitted through the first liquid crystal layer corresponding to display electrodes to which voltage is not applied and the first liquid crystal layer corresponding to areas where display electrodes are not formed, is subjected to a rotatory polarization effect in the opposite direction when it is transmitted through the second liquid crystal layer of the second liquid crystal element. This is because the liquid crystal molecules are oriented in a direction opposite to the direction of the liquid crystal molecules in the first liquid crystal layer. Furthermore, since the most nearly adjacent liquid crystal molecules are arranged so that they are crossed, the extraordinary light component and the ordinary light component of the incident polarized light from the first liquid crystal layer to the second liquid crystal layer replace one another canceling the elliptical polarization, and they return to linearly polarized light.

Therefore, the light transmitted through the areas where display electrodes are not formed and the areas corresponding to display electrodes to which voltage is not applied are completely blocked by the second liquid crystal element, and thus the leakage of light can be prevented. By this means, it is possible to display a perfect black without any coloration, and it is possible to improve the contrast in the so-called normally black mode wherein the background color is black.

Based upon the invention as mentioned above, one predetermined color is selected by the color selection members for the transmitted light which is transmitted through the first liquid crystal layer by the formation of display electrodes in the first liquid crystal element which correspond to the desired color selection members, and by this means the predetermined color is displayed in the display area. Then, it is possible to display still more different colors in the display area by individually forming display electrodes corresponding to the plurality of color selection members and combining the plurality of colors selected by the color selection members.

Further, the light transmitted through areas in which display electrodes are not formed and areas corresponding to display electrodes to which voltage is not applied is completely blocked by the second liquid crystal element, making it possible to prevent the leakage of light. By this means, it is possible to display a perfect black without any coloration, and it is possible to realize an improvement in color display and contrast in the so-called normally black mode wherein the background color is black.

The invention is a color liquid crystal display device made by stacking a first and second liquid crystal element each of which have a liquid crystal layer provided between a pair of transparent substrates:

a first liquid crystal element comprising, a plurality of color selection members provided across the entire surface of one side of the transparent substrates in their direction of thickness, each of which selects one color for the transmitted light from among a plurality of predetermined colors;

a first display electrode provided within the display area of the liquid crystal layer sides of the transparent substrates, and which is formed in the range that corresponds to the plurality of color selection members that are selected corresponding to the predetermined color that is to be displayed in the display area; and a second liquid crystal element comprising, a second display electrode formed in the range corresponding to the predetermined shape that is to be displayed in the display area.

In accordance with the invention, normally black display wherein the background color is black can be performed by the stacking of a first and second liquid crystal element so that light is not transmitted through the color liquid crystal display device when voltage is not applied, that is by stacking them so that the orientation directions of the liquid crystal molecules most nearly adjacent to one another are crossed. Here, the first display electrode is formed corresponding to the desired color selection members in the first liquid crystal element, and light is transmitted through the liquid crystal layer by the application of voltage. One predetermined color is selected by the color selection members for this transmitted light, and by this means the predetermined color is displayed in the display area. Then, it is possible to display still more different colors in the display area by individually forming display electrodes corresponding to the plurality of color selection members and combining the plurality of colors selected by the color selection members. By this means color display can be performed in the color liquid crystal display device.

Further in the second liquid crystal element, since the second display electrode is formed in the range corresponding to the predetermined shape which is to be displayed in the display area, light is transmitted by the application of voltage to the second display electrode, and thus the predetermined shape can be displayed in white. By this means, black and white display can be performed in the color liquid crystal display device.

Therefore, in a liquid crystal display device conforming to the invention it is possible to select three kinds of display mode, namely color display, black and white display, and display based upon a combination of color display and black and white display.

Further, for example by making the twist directions for the liquid crystal molecules of the liquid crystal layers of the first and second liquid crystal elements in mutually opposite directions, and by stacking the first and second liquid crystal elements so that the orientation directions of the liquid crystal molecules that are most nearly adjacent are mutually crossed, then the transmitted light which has become elliptically polarized by being transmitted through the first liquid crystal layer of the first liquid crystal element is subjected to a rotatory polarization effect in the opposite direction when it is transmitted through the liquid crystal layer of the second liquid crystal element. This is because the liquid crystal molecules are oriented in a direction opposite to the direction of the liquid crystal molecules in the first liquid crystal element. Furthermore, since the most nearly adjacent liquid crystal molecules are arranged so that they are crossed, the extraordinary light component and the ordinary light component of the incident polarized light from the first liquid crystal element to the second liquid crystal element replace one another canceling the elliptical polarization, and they return to linearly polarized light.

Therefore, the light transmitted through the areas where the first display electrode is not formed in the first liquid crystal element and the areas corresponding to the first display electrode to which voltage is not applied are completely blocked by the second liquid crystal element, and thus the leakage of light can be prevented. By this means, it is possible to display a perfect black without any coloration, and it is possible to improve the contrast in the so-called normally black display wherein the background color is black.

Based upon the invention as mentioned above, it is possible to select three kinds of display mode in the color liquid crystal display device, namely color display, black and white display, and display based upon a combination of color display and black and white display, and thus diversity of display is obtained.

Further, the light transmitted through the areas in the first liquid crystal element where the first display electrodes are not formed and the areas corresponding to the first display electrodes to which voltage is not applied is completely blocked by the second liquid crystal element, and thus the leakage of light can be prevented. By this means, it is possible to display a perfect black without any coloration, and it is possible to improve the contrast in the so-called normally black display wherein the background color is black.

The invention is a color liquid crystal display device comprising a first transparent substrate;

a plurality of color selection members provided across the entire surface of one side of the first transparent substrate, each of which selects one color for the transmitted light from among a plurality of predetermined colors;

a second transparent substrate arranged on the surface of one side of the first transparent substrate;

a first liquid crystal layer which is interposed between the first and second transparent substrates;

a transparent first electrode formed in the range corresponding to the plurality of color selection members that are selected corresponding to the predetermined color to be displayed in the display area, and which is provided within a predetermined display area of the first liquid crystal layer side;

a third transparent substrate which is arranged on the surface of the other side of the first transparent substrate;

a second liquid crystal layer which is interposed between the first and third transparent substrates; and a transparent second display electrode formed in the range corresponding to the plurality of color selection members that are selected corresponding to the predetermined color to be displayed in the display area, and which is provided within a predetermined display area of the second liquid crystal layer side.

In accordance with the invention, normally black display, wherein the background color is black, can be performed by making it so that light is not transmitted through the color liquid crystal display device when voltage is not applied. Here, the first display electrode of the first liquid crystal element is formed corresponding to a predetermined shape and corresponding to the color selection members of the desired color, and light can be transmitted through the first liquid crystal layer by the application of voltage to this first display electrode. One predetermined color is selected for this transmitted light by the color selection members, and by this means the shape corresponding to the first display electrode and the predetermined color are displayed on the liquid crystal display device.

Further, in the same way as in the case of the first display electrode, a shape differing from the predetermined shape is displayed on the liquid crystal display device by forming the second display electrode of the second liquid crystal display element corresponding to the desired color selection members with a shape differing from the predetermined shape.

Then, it is possible to display still more different colors by individually forming the first and second display electrodes corresponding to the plurality of color selection members and combining the plurality of colors selected by the color selection members.

Further, the transmitted light, which has become elliptically polarized by being transmitted through the first liquid crystal layer corresponding to the first display electrode to which voltage is not applied and the first liquid crystal layer corresponding to areas where the first display electrode is not formed, is subjected to a rotatory polarization effect in the opposite direction when it is transmitted through the second liquid crystal layer, because the liquid crystal molecules are oriented in a direction opposite to the direction of the liquid crystal molecules in the first liquid crystal layer. Furthermore, since the most nearly adjacent liquid crystal molecules are arranged so that they are crossed, the extraordinary light component and the ordinary light component of the incident polarized light from the first liquid crystal layer to the second liquid crystal layer replace one another canceling the elliptical polarization, and they return to linearly polarized light.

Therefore, the light transmitted through the areas where the first display electrode is not formed and the areas corresponding to the first display electrode to which voltage is not applied are completely blocked by the second liquid crystal layer, and thus the leakage of light can be prevented. By this means, it is possible to display a perfect black without any coloration, and it is possible to improve the contrast in the so-called normally black mode wherein the background color is black.

In this way, a plurality of different kinds of display picture images can each be displayed with different colors, and thus diversity of display is obtained.

Based upon the invention as mentioned above, the display of two kinds of display picture images can be performed, resulting in improvement of the diversity and versatility of display for the color liquid crystal display device. Thus the range of use for the color liquid crystal display device is expanded.

The invention is a color liquid crystal display device made by stacking a first and second liquid crystal element each of which have a liquid crystal layer provided between a pair of transparent substrates:

a first liquid crystal element comprising, a plurality of color selection members provided across the entire surface of one side of the transparent substrates in their direction of thickness, each of which selects one color for the transmitted light from among a plurality of predetermined colors;

a transparent display electrode provided within the display area of the liquid crystal layer sides of the transparent substrates, and which is formed in the range that corresponds to the plurality of color selection members that are selected corresponding to the predetermined color that is to be displayed in the display area; and a second liquid crystal element comprising, a transparent electrode provided across the entire surface of one side of the transparent substrate in its direction of thickness.

In accordance with the invention, the display electrodes in the first liquid crystal element are formed corresponding to the desired color selection members, and for example by the application of voltage to these display electrodes, one predetermined color is selected for the transmitted light which is transmitted through the liquid crystal layer by the color selection members. Further by this means the predetermined color is displayed in the display area. Then, it is possible to display still more different colors in the display area by individually forming the display electrodes corresponding to the plurality of color selection members and combining the plurality of colors selected by the color selection members.

Further, so-called normally black display can be performed by stacking so that light is not transmitted when voltage is not being applied to the transparent electrode and the display electrodes of the first and second liquid crystal elements, that is by stacking so that the orientation directions of the liquid crystal molecules of the first and second liquid crystal elements which are most nearly adjacent to one another are crossed. In this stacking condition, the second liquid crystal element functions only as an optical compensator.

Therefore, the transmitted light, which has become elliptically polarized by being transmitted through the liquid crystal layer corresponding to the display electrode to which voltage is not applied in the first liquid crystal element and the liquid crystal layer corresponding to areas where the display electrode is not formed, is subjected to a rotatory polarization effect in the opposite direction when it is transmitted through the liquid crystal layer of the second liquid crystal element. Furthermore, the extraordinary light component and the ordinary light component of the incident polarized light from the liquid crystal layer of the first liquid crystal element to the liquid crystal layer of the second liquid crystal element replace one another canceling the elliptical polarization, and they return to linearly polarized light. Therefore, the light transmitted through the areas where the display electrode is not formed and the areas corresponding to the display electrode to which voltage is not applied are completely blocked by the second liquid crystal element, and thus the leakage of light can be prevented. By this means, it is possible to display a perfect black without any coloration, and it is possible to improve the contrast in the so-called normally black display wherein the background color is black.

Furthermore, with the above mentioned stacking condition, the liquid crystal molecules orient in the direction of the electric field with the application of voltage to the transparent electrode of the second liquid crystal element, and the light which was transmitted through the first liquid crystal element can be transmitted through the second liquid crystal element when voltage is not applied.

In this way, it is possible to perform two kinds of display, normally black display and normally white display, in one liquid crystal display device by merely switching the application/non-application of voltage for the second liquid crystal display element. Then, for example when using three kinds of color selection members which select red, green and blue respectively. For example, in normally black display when voltage is applied to the display electrode corresponding to the color selection members which select red, then red is displayed in the display area because the liquid crystal layer to which voltage is applied allows the transmission of light. In this state, when switched to normally white display, cyan is displayed due to the mixing of green light and blue light in the display area, because only the part of the liquid crystal layer corresponding to the red color selection members is in a state that does not transmit light.

Therefore, it is possible to perform two kinds of display, normally black display and normally white display, in one color liquid crystal display device. Furthermore, diversity of display is realized, because when the display mode is switched the display color also is changed.

Based upon the invention as mentioned above, it is possible to perform two kinds of display, normally black display and normally white display, in one color liquid crystal display device. Furthermore, diversity of display is realized, because when the display mode is switched the display color also is changed.

The invention is a color liquid crystal display device comprising a first liquid crystal display element interposed a plurality of color selection members which are formed at least in predetermined display areas and each of which select one color for transmitted light from a predetermined plurality of colors, transparent display electrodes, that are formed for each color selection member, and a liquid crystal layer between a pair of transparent substrates;

a second liquid crystal display element interposed between a transparent electrode, that spans an area at least corresponding to the display area and a liquid crystal layer between a pair of transparent substrates;

a first drive means which applies/does not apply a display signal to the second liquid crystal display element; and a second drive means which selects the color selection members that realize the same color as that of the color selection members selected when the display signal is applied/not applied, and which corresponds to the application/non-application operation of the display signal of the first drive means with respect to the color selection members selected when the display signal is applied/not applied, at the time when the display signal is not applied/applied.

A color liquid crystal display device conforming to the invention is composed including a first liquid crystal display element for color display and a second liquid crystal display element for compensation. The other drive means, which controls the first liquid crystal display element with correspondence to the operation of the one-way drive that applies/do not apply the display signal to the transparent electrode of the second liquid crystal display element, applies the display signal so as to select the color selection members which realize the same color as that of the color selection members selected when the display signal is applied/not applied with respect to the color selection members selected when the display signal to the second liquid crystal display element is applied/not applied, at the time the display signal is not applied/applied.

By this means it is possible to realize a switching operation for the background color only, without any change of the display color within the display area, by applying/not applying the display voltage to the second liquid crystal display element. This is true even in the case where the display color of the exterior areas of the display area in the first liquid crystal display element are changed to the complementary color. By this means the diversity of display can be markedly expanded.

In accordance with the invention as mentioned above, it is possible to realize a switching operation for the background color only, without any change of the display color within the display area, by applying/not applying the display signal to the second liquid crystal display element. This is true even in the case where the display color of the exterior areas of the display area in the first liquid crystal display element are changed to the complementary color. By this means the diversity of display can be markedly expanded.

The invention is a color liquid crystal display device comprising a first liquid crystal display element interposed a plurality of color selection members which are formed at least in predetermined display areas and each of which select one color for transmitted light from a predetermined plurality of colors, transparent display electrodes, that are formed for each color selection member, and a liquid crystal layer between a pair of transparent substrates;

a second liquid crystal display element interposed a transparent electrode, that spans an area at least corresponding to the display area and a liquid crystal layer between a pair of transparent substrates;

a first drive means which selects one of a plurality of colors for transmitted light by applying/not applying the first display signal to all of the transparent electrodes of the first liquid crystal display element; and a second drive means which selects one of the plurality of colors, or its complementary color, for the colored transmitted light from the first liquid crystal display element by applying/not applying the second display signal to all of the transparent electrodes of the second liquid crystal display element.

A color liquid crystal display device conforming to the invention is composed including a first liquid crystal display element for color display and a second liquid crystal display element for compensation. The first drive means selects one of a plurality of colors for the transmitted light by applying/not applying the display signal to the display electrodes of the first liquid crystal display element. The second drive means selects one of the plurality of colors or its complementary color for the colored transmitted light from the first liquid crystal display element by applying/not applying the second display signal to the second liquid crystal display element. By this means the diversity of display can be markedly expanded.

In accordance with the invention as mentioned above, the color or the complementary color of the colored transmitted light from the first liquid crystal display element is selected by applying/not applying the display signal to the second liquid crystal display element. By this means the variety of displayed colors is increased, and thus the diversity of display can be markedly expanded

BRIEF DESCRIPTION OF THE DRAWINGS

Other and further objects, features, and advantages of the invention will be more explicit from the following detailed description taken with reference to the drawings wherein:

FIGS. 12(1)-(3) are diagrams showing the order of arrangement for the color filters R, G and B and the sequence of connection for the segment electrodes;

FIGS. 13(1) and (2) are diagrams showing another order of arrangement for the color filters R, G and B and the sequence of connection for the segment electrodes;

FIGS. 20(1) and (2) and FIGS. 21(1) and (2) are diagrams showing the visual angle characteristics the color liquid crystal display device 21;

FIGS. 29(1)-(4) are diagrams showing the relationship of the orientation direction and the twist direction of the liquid crystal molecules of the color liquid crystal display device 61;

FIG. 30 is a block diagram showing the electrical construction of the color liquid crystal display device 61;

FIGS. 31(1) and (2) are timing charts for explaining the drive state of the color liquid crystal display device 61;

FIGS. 32(1)-(3) are plane view diagrams showing a display example for the color liquid crystal display device 61;

FIGS. 33(1) and (2) and FIGS. 34(1) and (2) are graphs showing the visual angle characteristics in the color liquid crystal display device 61;

FIGS. 39(1)-(4) are diagrams for explaining the direction of orientation of the liquid crystal molecules and the direction of polarization of the polarizer plates of the liquid crystal layer in the color liquid crystal display device 91;

FIG. 40 is a block diagram showing the electrical construction of the color liquid crystal display device 91;

FIGS. 41(1) and (2) are timing charts for explaining the drive state of the color liquid crystal display device 91;

FIGS. 42(1)-(3) are diagrams showing a display example for the color liquid crystal display device 91;

FIGS. 43(1) and (2) are diagrams showing the visual angle characteristics of the color liquid crystal display device 91;

FIGS. 49(1)-(3) are diagrams explaining the orientation state of the liquid crystal molecules;

FIGS. 50(1) and (2) are timing charts for explaining the drive state of the color liquid crystal display device 121;

FIGS. 51(1) and (2) are plane view diagrams for explaining a display example for the color liquid crystal display device 121;

FIGS. 52(1) and (2) are diagram showing the visual angle characteristics of the color liquid crystal display device 121;

FIGS. 54(1)-(4) are timing charts explaining the operation of this embodiment;

FIG. 55(1)-(4) are timing charts explaining other operations of the sixth embodiment; and FIG. 56 is an enlarged plane view diagram of the transparent substrate 124a.

DETAILED DESCRIPTION OF THE PREFERRED EMBODIMENTS

Figure 1:
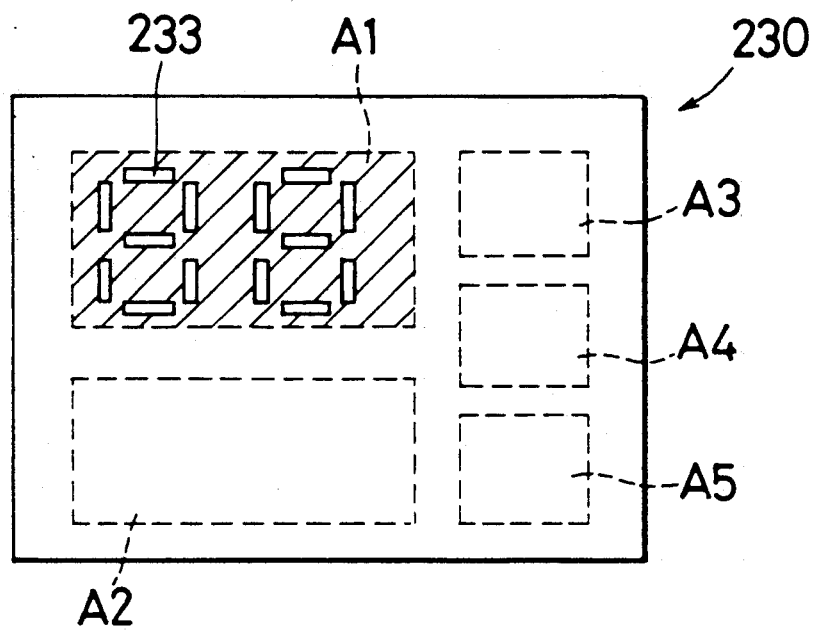
FIG. 1 is a plane view diagram of the liquid crystal display device 230 of the prior art.
Figure 2:
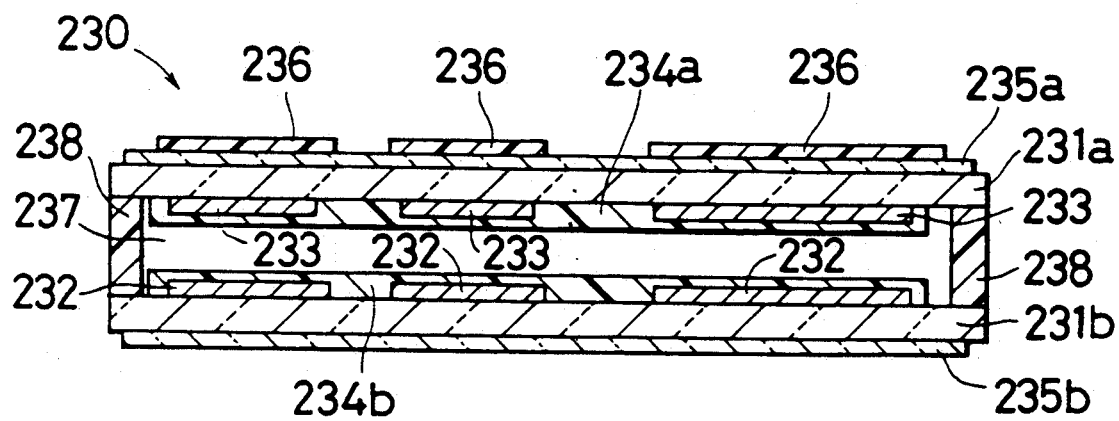
FIG. 2 and FIG. 3 are cross section diagrams of the liquid crystal display device 230 of the prior art.
Figure 3:
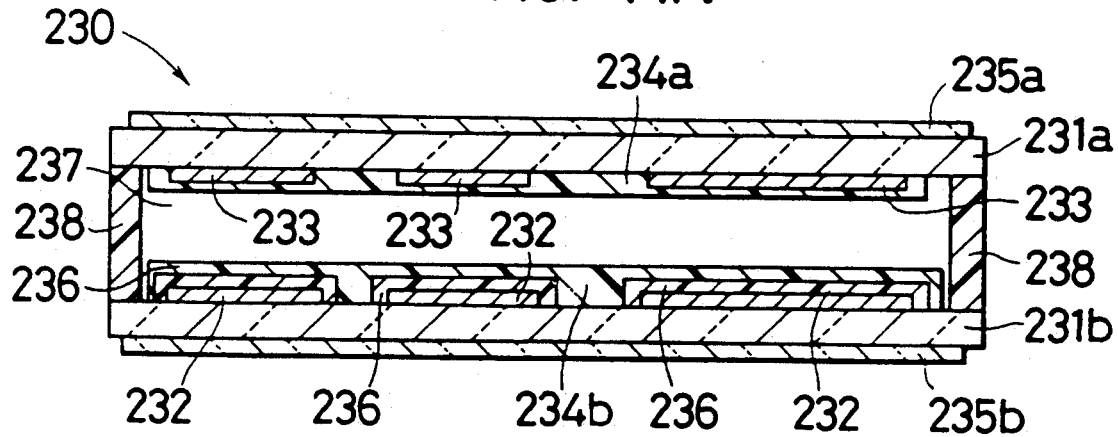
Figure 4:
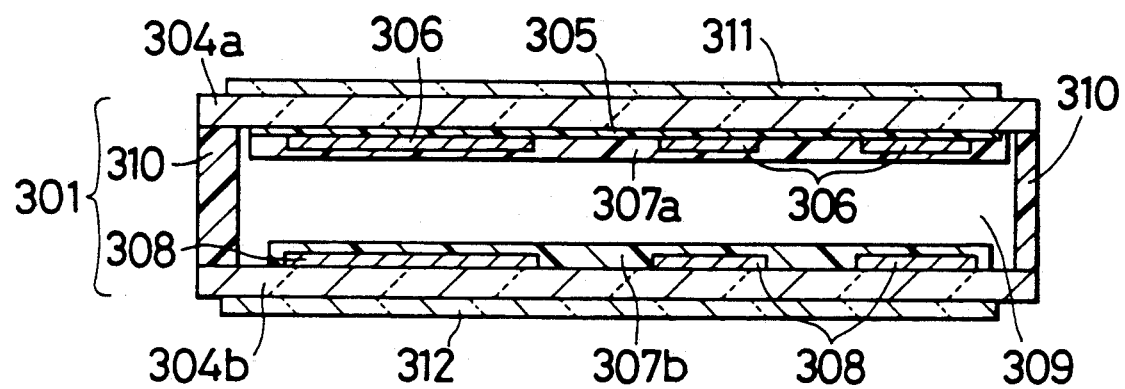
FIG. 4 is a cross section diagram of the liquid crystal display device 301 of the prior art.

Now referring to the drawings, preferred embodiments of the invention are described below.

Embodiment 1

Figure 7:
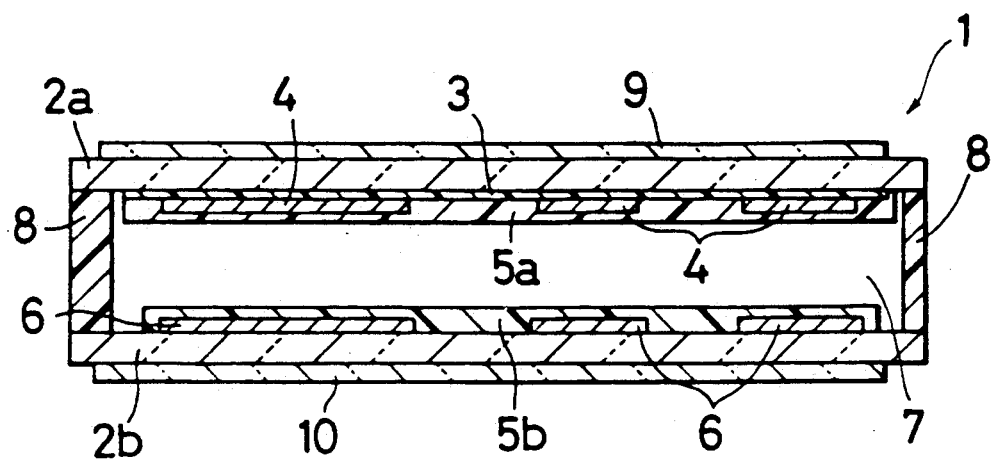
FIG. 7 is a cross section diagram of the liquid crystal display device 1 which is a first embodiment of the invention.

FIG. 7 is a cross section of a liquid crystal display device 1 which is a first embodiment of the invention. The liquid crystal layer 7 is sandwiched between the light-transmissive glass substrates 2a and 2b and sealed with the sealant resin 8. A thickness between 4 micron and 30 micron is selected for the liquid crystal layer 7, but it is normally between 5 micron and 10 micron. Twisted nematic (TN) liquid crystal or super twisted nematic (STN) liquid crystal is used as the liquid crystal.

A color filter 3 described below is formed over nearly the entire surface of the glass substrate 2a toward the liquid crystal layer 7 by a printing process or an electrodeposition process, and a plurality of segment electrodes 4 is formed on the color filter 3. The color filter 3 can be formed on either the inside or the outside (e.g., on polarizing plates 9 and lo described below) of the liquid crystal display device 1, but it is preferable to form it on the inside in order to prevent a shift in color due to parallax in the display area. Further, the orientation film 5a is formed on the segment electrodes 4.

A plurality of common electrodes 6 is formed on the side of the glass substrate 2b toward the liquid crystal layer 7 over the area containing the display area corresponding to the segment electrodes 4, and an orientation film 5b is formed on top of that. The polarizing plates 9 and 10 are formed on the respective surfaces of the glass substrates 2a and 2b opposite the liquid crystal layer 7.

In FIG. 7, the color filter 3 is positioned between the glass substrate 2a and the segment electrodes 4, but the color filter 3 can also be positioned between the glass substrate 2b and the common electrodes 6.

The color filter 3 can also be positioned between segment electrodes 4 and the orientation film 5a, or between common electrodes 6 and the orientation film 5b.

Figure 8:
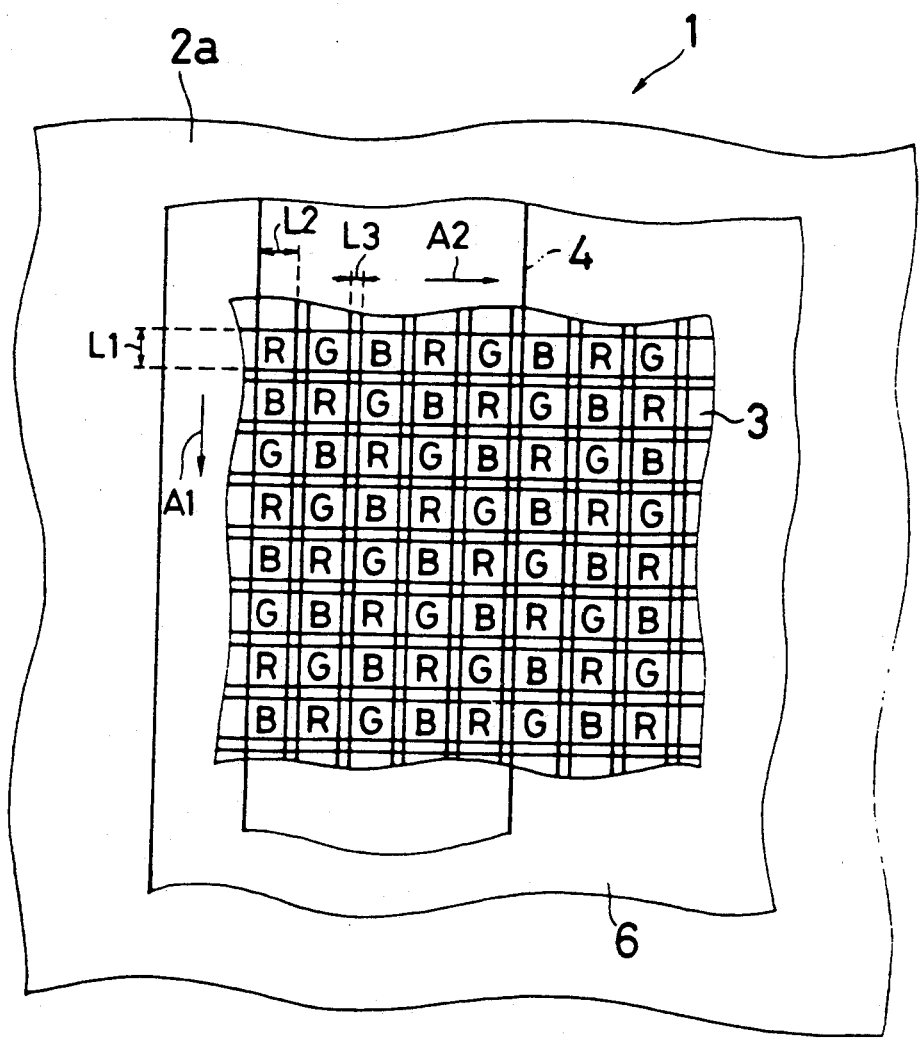
FIG. 8 is an enlarged plane view diagram of the liquid crystal display device 1.
Figure 9:
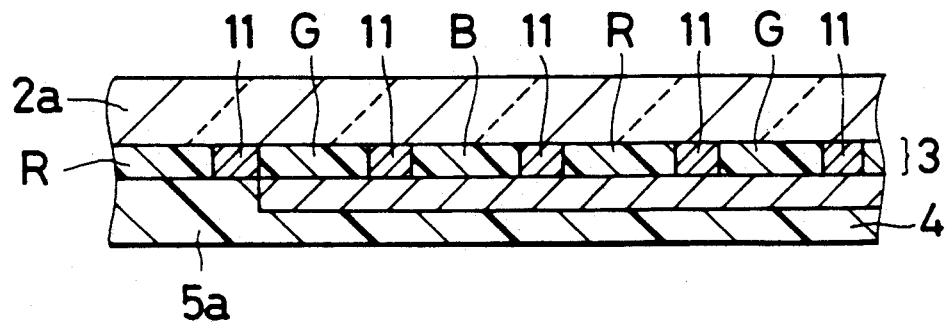
FIG. 9 is an enlarged cross section diagram of the area around the color filter 3.

FIG. 8 is a plane view of a liquid crystal display device 1 which is an embodiment of this invention, and FIG. 9 is an enlarged cross section of the area around the color filter 3. In the liquid crystal display device 1, the color filter 3, which is the color selection member, is provided over the entire surface of the glass substrate 2a. The color filter 3 is formed from red, green and blue filters arranged in a matrix or mosaic.

In FIG. 8, the red filter is indicated by the reference code R, the green filter by the reference code G, and the blue filter by the reference code B. The filters R, G, and B are small enough in size to be indistinguishable by the naked eye.

As an example, rectangular filters R, G and B are used whose length L1 is 330 micron and width L2 is 80 micron, and the interval L3 between filters is set at 30 micron. Therefore, the area formed by the three filters R, G and B lined up in the direction of the width C2 of the filter is a square 330 micron×330 micron.

The interval L3 between filters is determined by the precision of the photoprocess and other processes used to produce the color filters, but it is generally 15 micron to 40 micron.

The filters are arranged in a repeating R-G-B sequence in the direction of the width C2 and a repeating R-B-G sequence in the direction of the length Cl of the filter. The filters R, G and B can be square or other shape. Further, a black light mask 11 is formed between each of the filters R, G and B. The light mask 11 is made from chrome or a black pigment.

Figure 10:
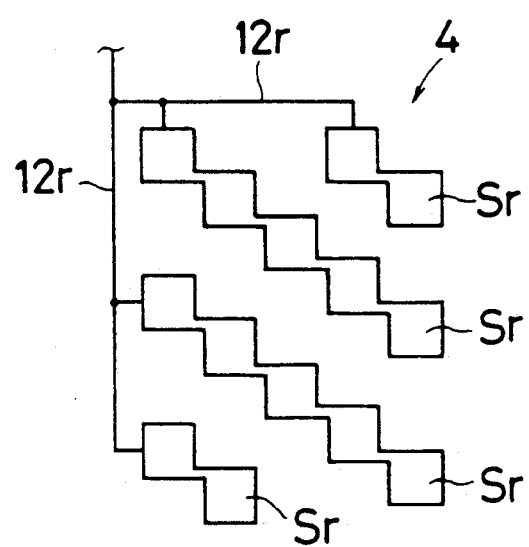
FIGS. 10(1) and (2) are plane view diagrams of the segment electrode 4.
Figure 10:
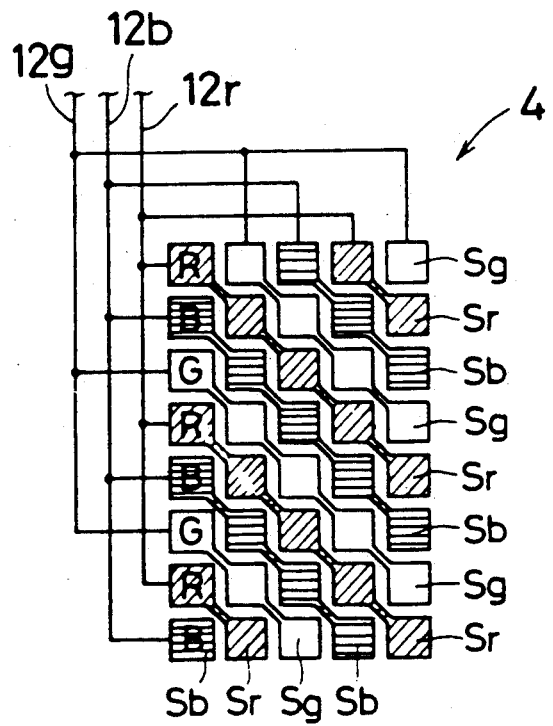

FIG. 10 is an enlarged plane view of the segment electrodes 4. In one embodiment, the segment electrodes 4 are formed only in the areas corresponding to the red filters R of the color filter 3 in the display area as shown in FIG. 10 (1), and each segment electrode Sr is connected by the transparent electrode 12r which functions as a signal line.

In FIG. 10 (1), an example is shown in which the segment electrodes Sr formed in the areas corresponding to the red filters R are electrically connected by the transparent electrode 12r, but a plurality of red, green and blue quadrilateral color filters R, G and B are arranged on the glass substrate 2a in a matrix or mosaic, and this invention is a color liquid crystal display device in which transparent electrodes are disposed so they sequentially connect segment electrodes corresponding to color filters of the same color.

This example is shown in FIG. 10(2). In FIG. 10(2), segment electrodes Sr, Sb and Sg are formed in the respective areas corresponding to the red filters r, blue filters B and green filters G of the color filter 3 in the display area, and each of the segment electrodes Sr, Sb and Sg are connected by the transparent electrodes 12r, 12b and 12g which function as signal lines. By using this connection method and selecting desired segment electrodes on which voltage is to be applied, the seven colors red, yellow, green, dark green, blue, white and purple can be displayed in the target display area.

Figure 11:
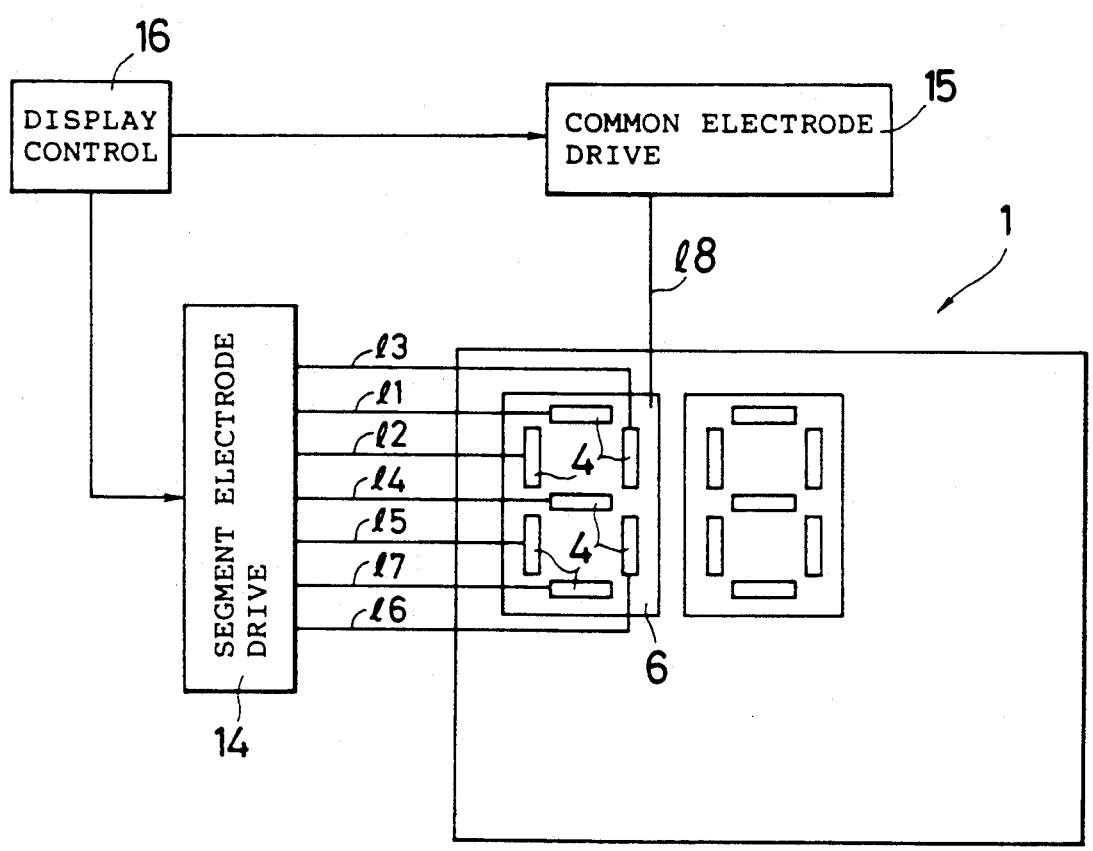
FIG. 11 is a block diagram showing the electrical construction of the liquid crystal display device 1.

FIG. 11 is a block diagram showing the electrical configuration of the liquid crystal display device 1. The segment electrodes 4, which are a plurality of display electrodes, are arranged so they form a figure eight on the liquid crystal display device 1. Here, a case is explained in which the segment electrodes 4 are formed only in areas corresponding to the red filters R as in FIG. 10 (1) above. Also, the common electrodes 6 are disposed in the area containing the display area corresponding to the segment electrodes 4. The segment electrodes 4 are connected to the segment electrode drive circuit 14 via the respective signal lines 11 to 17, and the common electrodes 6 are connected to the common electrode drive circuit 15 via the line 18. The signal lines 11 to 18 are disposed so they do not effect display. The segment electrode drive circuit 14 and the common electrode drive circuit 15 are connected to the display control circuit 16, and voltages are applied on the segment electrodes 4 and the common electrodes 6 based on the image data supplied from the display control circuit 16.

The liquid crystal layer 7 on which voltage is applied passes light in the case of normally black display, so the display areas corresponding to those segment electrodes 4 on which voltage is applied pass light. Here, as described above, the segment electrodes 4 are formed only in the areas corresponding to the red filters R of the color filter 3, so red is displayed in the display area. At this time, the blockage of light in the liquid crystal display device 1 is not complete in areas other than the display area where voltage is applied and so some light does leak, but since the color filter 3 is provided over the entire surface of the glass substrate 2a, the shape of the color filter 3 cannot be seen and parts where the color filter 3 is provided do not appear colored as in the prior art. Also, since the light passing through the liquid crystal layer 23 becomes white light due to the mixing of the three colors red, green and blue, coloring of areas other than the display area is prevented.

By means of the above configuration, the shape of the color filter 3 cannot be seen and coloring of areas other than the display area due to leaking light is prevented. This greatly improves the display quality of the liquid crystal display device 1.

In this embodiment, the segment electrodes 4 were formed in areas corresponding to the red filters R, but by forming the segment electrodes 4 in the areas corresponding to the green filters G or the blue filters B, green or blue is displayed in the display area.

Further, the segment electrodes 4 can be provided separately so they correspond to two color filters. In this case, by providing segment electrodes 4 separately in areas corresponding to the red filters R and the green filters G, for example, yellow can be displayed through a combination of red light and green light. Also, providing segment electrodes 4 for the red filters R and the blue filters B makes it possible to display cyan. Providing electrodes to all three color filters makes it possible to display white.

The resistance of the transparent electrode 12 can be varied and the voltage applied on the liquid crystal layer 7 varied by adjusting the width of the transparent electrode 12 which connects the segment electrodes 4, whereby intermediate colors can be displayed.

In this embodiment, the color filter 3 is formed from the three color filters red, green and blue, but the color filter 3 can be formed from any two of these colors. Also, the filters are not limited to these three colors red, green and blue, but rather various colors can be used for the filters such as yellow, magenta and cyan. In this case, as well, a filter with only two colors can be used. The color filter 3 can also be formed from filters of four or more colors.

FIG. 12 shows the order in which the color filters R, G and B are arranged and the order of connection of the segment electrodes. In FIG. 12, only the connection method for the segment electrodes related to the red filters R are shown for easier understanding, but of course the connection method is same for the green filters G and the blue filters B. FIG. 10 showed a case in which the red filters R were connected linearly in a diagonal direction, but in FIG. 12 (1)–(3), the segment electrodes corresponding to a common color; e.g., red color filters R, are connected in a zigzag. In the case of FIG. 12 (2), connection is diagonal, while in FIG. 12 (1)–(3), connection is generally linear and connection between electrodes is easier. Unlike FIG. 12 (1), in the case of FIG. 12 (2) and (3), the order of arrangement of the color filters R, G and B changes gradually, but connection is generally linear.

In FIG. 12 (1), the filters R, G and B are arranged in basic units comprising a 3×6 matrix M1, and the matrices M1 are arranged in rows. In FIG. 12 (2), the filters R, G and B are arranged in basic units comprising a 3×4 matrix M2, and these matrices M2 are arranged in rows. In FIG. 12 (3), the filters R, G and B are arranged in basic units comprising a 3×6 matrix M3, and these matrices M3 are arranged in rows.

FIG. 13 shows another order of arrangement for the color filters R, G and B and another order of connection for the segment electrodes where the color filters R, G and B are arranged in a delta configuration. Connection in the case of FIG. 13 (1) is diagonal, but in the case of FIG. 13 (2), connection is generally linear.

Figure 14:
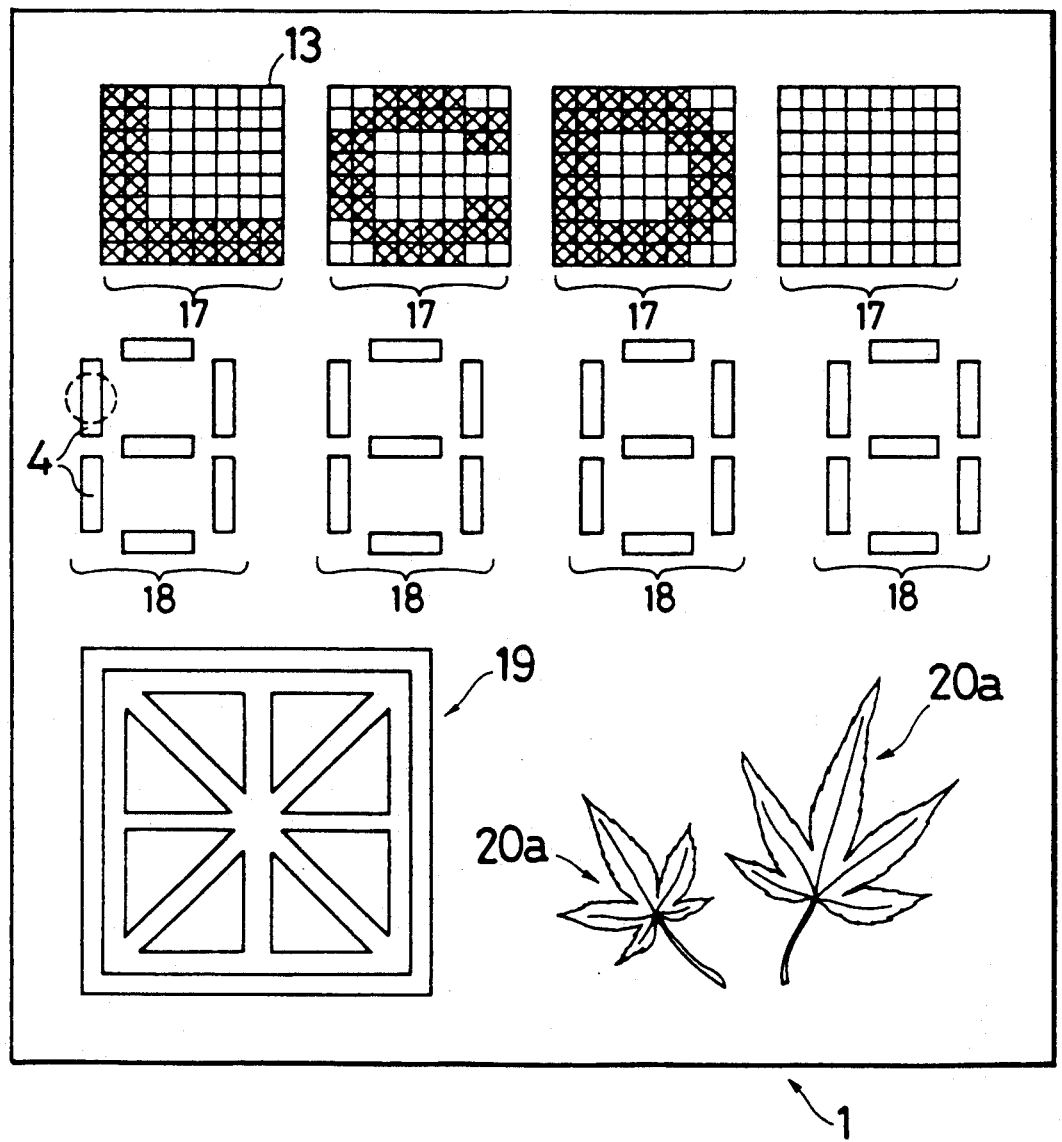
FIG. 14 is a diagram showing another example of the electrode arrangement for the liquid crystal display device 1.

FIG. 14 shows other embodiments for the electrode arrangement in the display screen of the liquid crystal display device 1. FIG. 14 shows four dot matrix arrays (e.g., LCD display), four seven-segment figure eight arrays, one geometric shape and two graphic design arrays.

At the top of the screen are four electrode arrays 17 in which square electrodes 13 are arranged in an 8×8 matrix. In the middle of the screen are four electrode arrays 18 in which rectangular segment electrodes 4 are arranged so they form a figure eight. At the bottom of the screen, the electrodes 19 are formed in a shape corresponding to a geometric design, and the electrodes 20a and 20b are formed in shapes corresponding to graphic designs representing leaves.

A plurality of square color filters R, G and B are arranged in the display area and the background area in a fine red, green and blue mosaic, and transparent electrodes are disposed so they connect the segment electrodes corresponding to a common color in sequence. The plurality of square color filters R, G and B is arranged in sequences such as those shown in FIG. 12 and FIG. 13. The drive method is explained below using one figure eight segment electrode as an example (the one segment electrode circled by a dotted line in FIG. 14).

Figure 15:
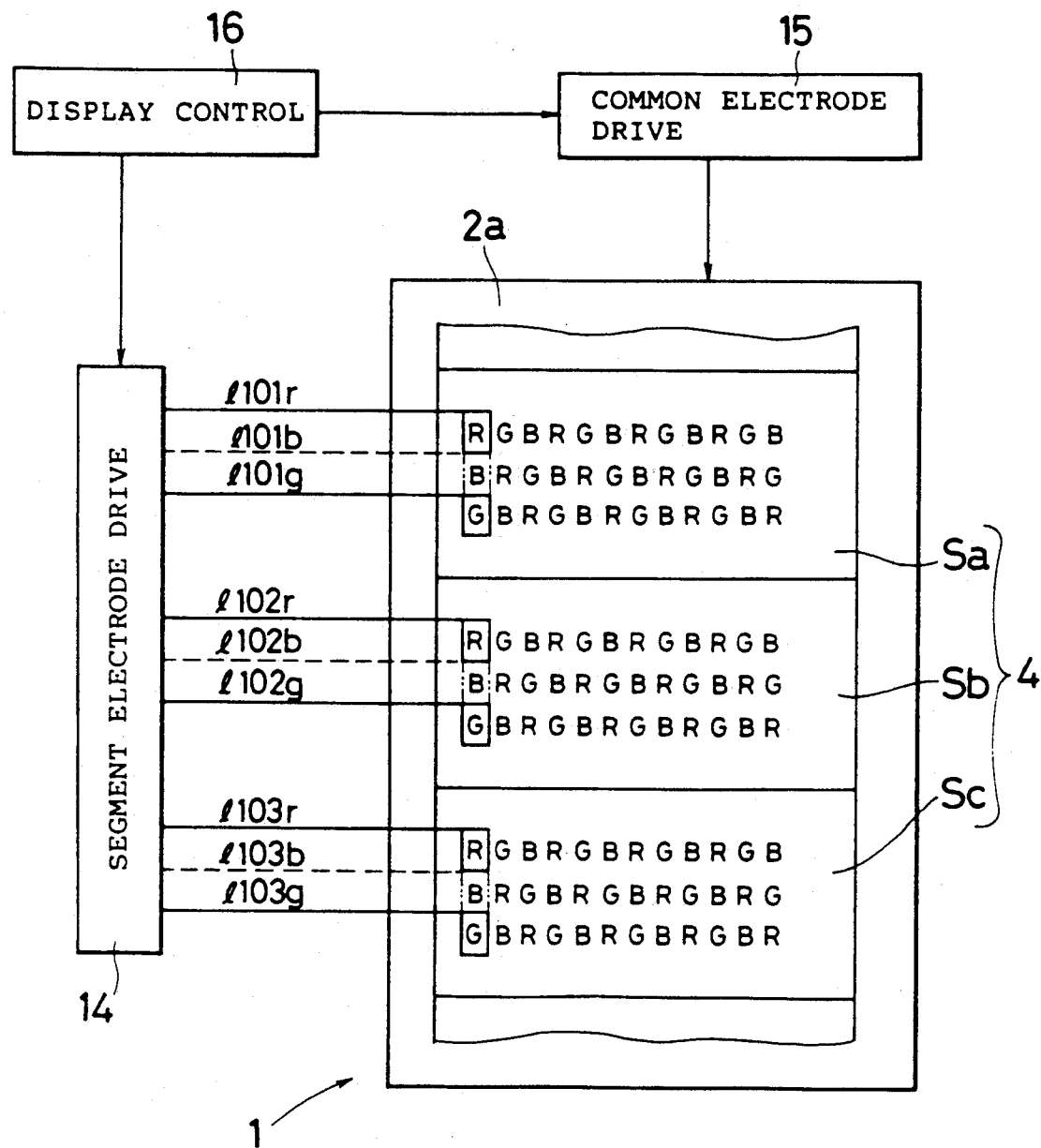
FIG. 15 is a diagram for explaining the drive method for the electrodes illustrated in FIG. 14.

FIG. 15 is a block diagram for explaining the electrode drive method. Here, the color filter arrangement in FIG. 12 (1) is used. The segment electrode 4 is divided up according to several display areas such as the segment electrode sections Sa, Sb and Sc, and in each display area are disposed the transparent electrode connection lines 1101r, 1101b and 1101g so they correspond respectively to the red filters R, the green filters G and the blue filters B. These segment electrode connection lines 1101r, 1101b and 1101g; 1102r, 1102b and 1102g; 1103r, 1103b and 1103g; ... are electrically controlled by the segment electrode drive circuit 14. These connection lines 1101r, 1102r and 103r, ... are driven by a display color corresponding to a previously set electrode arrangement. For example, the display area corresponding to the segment electrode section Sa can be displayed in red, the display area corresponding to the segment electrode section Sb can be displayed in blue and the display area corresponding to the segment electrode section Sc can be displayed in green, or they can be displayed in a color which is a combination of all three colors.

Embodiment 2

Figure 16:
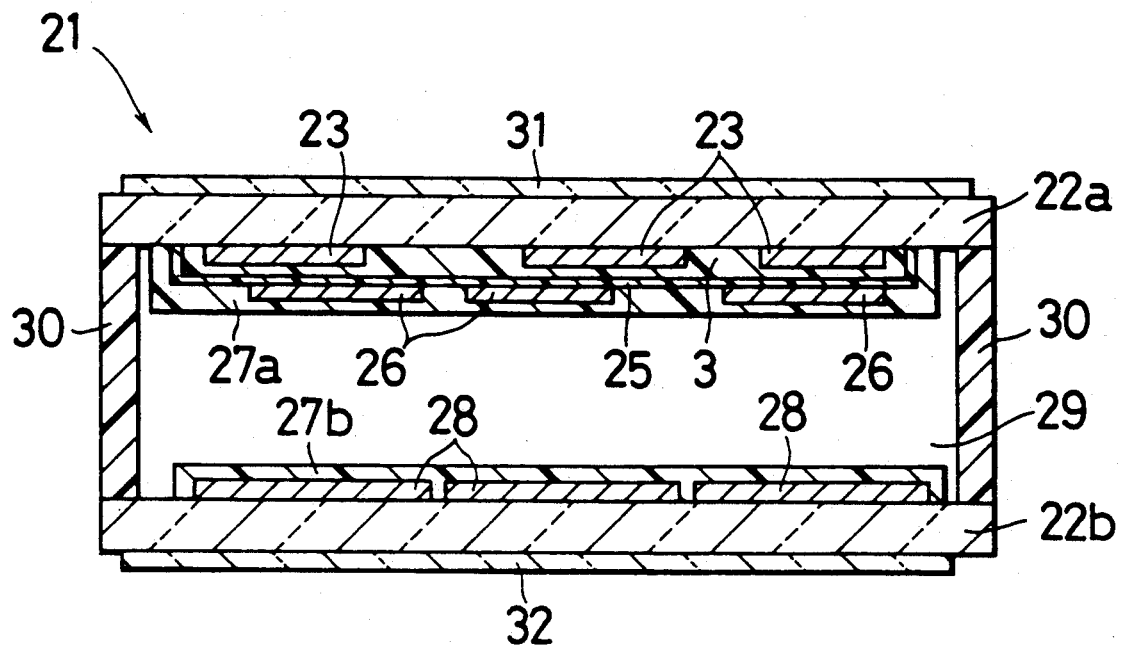
FIG. 16 is a cross section diagram of the color liquid crystal display device 21 which is a second embodiment of the invention.

FIG. 16 is a cross section diagram of the color liquid crystal display device 21 which is a second embodiment of the invention. The color liquid crystal display device 21 has the transparent substrates 22a and 22b which are made of glass or acrylic etc., and the transparent electrodes (first segment electrodes) 23 are formed on the surface of one side of the transparent substrate 22a in the area corresponding to the shape that is to be displayed. Furthermore, the color filter 3 is formed on the glass substrate 22a on which the first segment electrodes 23 are formed. The color filter 3 has the same structure as in the above mentioned first embodiment, for example being composed of color filters of three colors, red filters, green filters and blue filters, arranged in a matrix and black light-blocking layers, and being formed by a printing or other process across nearly the entire surface of one side of the glass substrate 22a.

An overcoat layer 25 is formed on the surface of the color filter 3 to moderate unevenness in the surface of the color filter 3, to prevent deterioration of the color filter 3 when forming the second segment electrodes 26, mentioned later, and in order to improve the adhesion of the second segment electrodes 26. After forming the overcoat layer 25, the transparent electrodes (second segment electrodes) 26 are formed by a sputtering or other process in the area corresponding to the shape which is to be displayed. Furthermore an orientation film 27a is formed on that surface.

The transparent electrodes (common electrodes) 28 are formed on the surface of one side of the transparent substrate 22b, at least in the areas that include the first segment electrodes 23 and the second segment electrodes 26, and furthermore an orientation film 27b is formed on that surface.

The transparent substrates 22a and 22b are arranged so that the surfaces on which the orientation films 27a and 27b respectively are formed face one another, while the liquid crystal layer 29 is interposed between the transparent substrates 22a and 22b and sealed with the sealant 30.

The polarizer plates 31 and 32 respectively are arranged on the surfaces of the transparent substrates 22a and 22b which are on the sides opposite from the liquid crystal layer 29, so as to achieve cross polarization.

Figure 17:
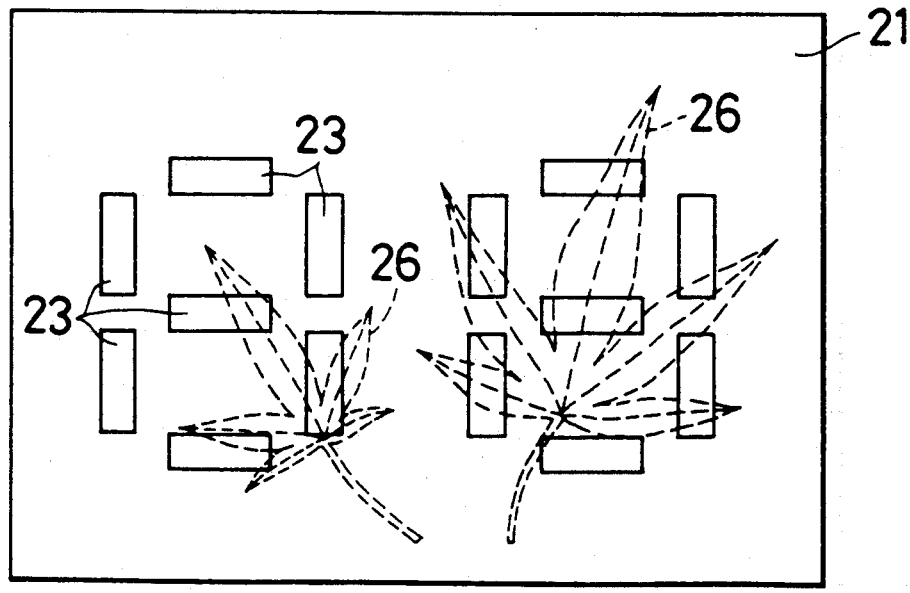
FIG. 17 is a plane view diagram of the color liquid crystal display device 21.
Figure 18:
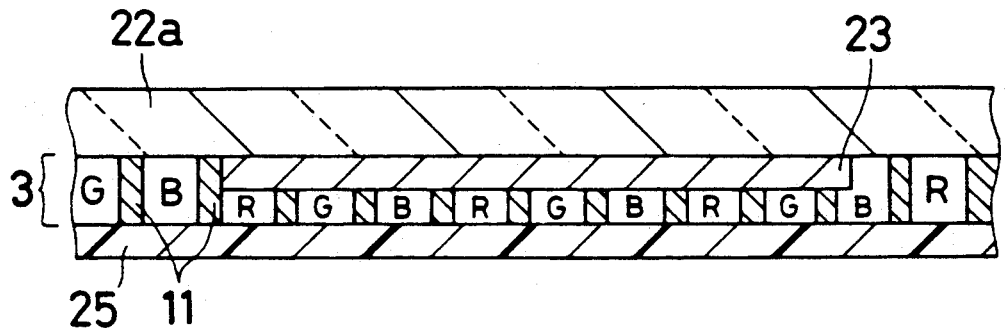
FIG. 18 is an enlarged cross section diagram of the area around the color filter 3.

FIG. 17 is a plane view diagram showing an arrangement example for the segment electrodes in the color liquid crystal display device 21. As shown in FIG. 17 for example, the first segment electrodes 23 are formed in rectangular shapes. Further, and using seven of these first segment electrodes 23 that are formed in rectangular shapes, they are arranged to form a figure eight and for example two of these figure eights are placed in a row. Still further, the second segment electrodes 26 for example are formed in shapes that represent the leaves of a plant.

The first and second segment electrodes 23 and 26 have the same structure as the segment electrodes 4 of the above mentioned first embodiment.

Figure 19:
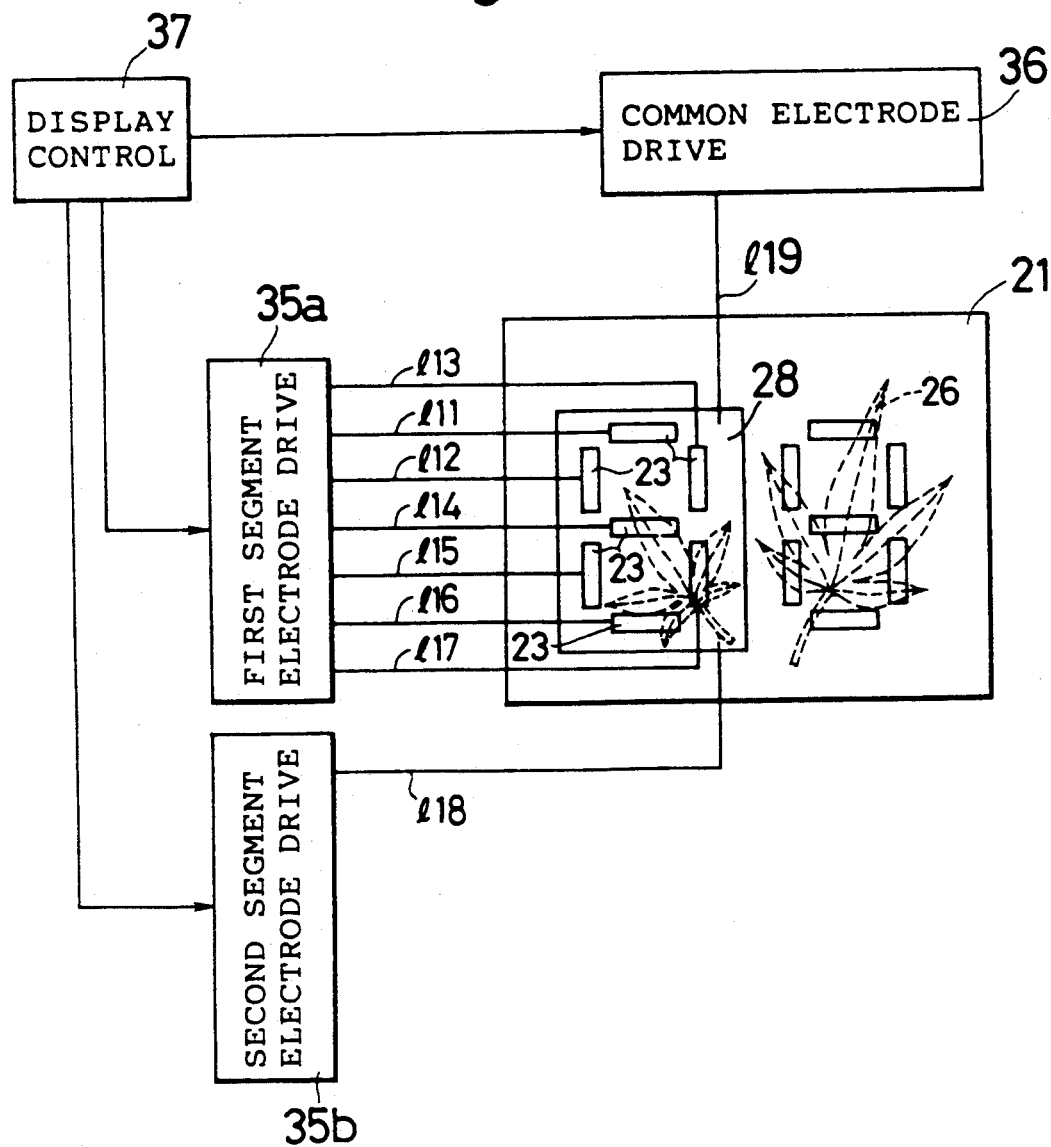
FIG. 19 is a block diagram showing the electrical construction of the color liquid crystal display device 21.

FIG. 19 is a block diagram showing the electrical construction of the color liquid crystal display device 21. Within the image plane of the color liquid crystal display device 21, a plurality of first segment electrodes 23 are arranged so that for example a figure eight is formed, and for example two second segment electrodes 26 are arranged which are formed in shapes representing the leaves of a plant. Here, the first segment electrodes 23 and the second segment electrodes 26 are each composed of electrodes Sr for red, electrodes Sg for green and electrodes Sb for blue, as shown in the above mentioned FIG. 10. Further the common electrodes 28 are arranged in the areas which include the display areas corresponding to the first segment electrodes 23 and the second segment electrodes 26.

The first segment electrodes 23 are each connected to the first segment electrode drive circuit 35a via the signal lines 111 through 117, the second segment electrodes 26 are connected to the second segment drive circuit 35b via the signal line 118, and furthermore the common electrodes 28 are connected to the common electrode drive circuit 36 via line 119. The signal lines 111 through 119 are provided so that they not affect the display, that is, so that the transference electrodes are not visible as signal lines when voltage is applied. The signal lines 111 through 118 are each composed of three transference electrodes, 12R, 12G and 12B respectively, as shown in the above mentioned FIG. 10 (2).

The first and second segment electrode drive circuits 35a and 35b and the common electrode drive circuit 36 are connected to the display control circuit 37, and voltage is applied to the first and second segment electrode drive circuits 35a and 35b and the common electrode drive circuit 36 based upon the display control signal supplied from the display control circuit 37.

The cases of performing so-called normally white display and normally black display in the above mentioned color liquid crystal display device 21 will now be explained. Here, as to the liquid crystal molecules of the liquid crystal layer 29, the molecules which are most nearly adjacent to the transparent substrate 22b are in an orientation state that is in a direction perpendicular to the surface of the paper in FIG. 16, as the transparent substrate 22a is approached they gradually twist in the direction to the right, and the liquid crystal molecules which are most nearly adjacent to the transparent substrate 22a are in an orientation state that is in a direction parallel to the surface of the paper in FIG. 16.

(1) Normally White Display

Normally white display is a display method which is made so that light is transmitted through the liquid crystal layer 29 when voltage is not applied and in which the background color is white for example. Light is then blocked by changing the orientation state of the liquid crystal molecules by applying voltage to the liquid crystal layer 29 corresponding to the shape which is to be displayed, thus displaying the desired shape. Therefore, the polarizer plates are arranged so that the direction of polarization for polarizer plate 32 is in a direction perpendicular to the surface of the paper in FIG. 16 and the direction of polarization for polarizer plate 31 is in a direction parallel to the surface of the paper in FIG. 16. By this means, the light transmitted through polarizer plate 32 is twisted 90° by the liquid crystal layer 29, and it can thus be transmitted through polarizer plate 31. Then, the color filter layer 3 is formed by the minute square shaped filters R, G and B as shown in the above mentioned FIG. 9, and the transmitted light turns to white light through the mixing of red light, green light and blue light. In other words, white is displayed as the background color in the color liquid crystal display device 21 when voltage is not applied.

The liquid crystal molecules of the liquid crystal layer 29 to which voltage is applied orient themselves in the direction of the electric field. Therefore, the linearly polarized light which is transmitted through the polarizer plate 31 and is in a direction perpendicular to the surface of the paper in FIG. 16, is transmitted through the liquid crystal layer 29 in almost the same state of polarization. Here, the light transmitted through the liquid crystal layer 29 cannot be transmitted through the polarizer plate 31, because the direction of polarization for the polarizer plate 31 is in a direction parallel to the surface of the paper in FIG. 16. Therefore, for example when voltage is applied to only the electrodes Sr for red which compose the first segment electrodes 23, the red light is blocked and cyan light is displayed due to the mixing of green light and blue light.

The liquid crystal layer 29 operates as a light shutter based upon the application (ON)/non-application (OFF) of voltage. The relationship of the ON/OFF state of the segment electrodes, the operation as a light shutter and the display color is shown in Table 4.

In Table 4, "○" indicates the open state of the light shutter, and " • " indicates the closed state of the light shutter.

TABLE 4

| Segment Electrode ON/OFF State | | | Light Shutter | | | Display |
|---|---|---|---|---|---|---|
| Sr | Sg | Sb | R | G | B | Color |
| OFF | OFF | OFF | ○ | ○ | ○ | White |
| ON | OFF | OFF | • | ○ | ○ | Cyan |
| OFF | ON | OFF | ○ | • | ○ | Magenta |
| OFF | OFF | ON | ○ | ○ | • | Yellow |
| ON | ON | OFF | • | • | ○ | Blue |
| ON | OFF | ON | • | ○ | • | Green |
| OFF | ON | ON | ○ | • | • | Red |
| ON | ON | ON | • | • | • | Black |

As shown in Table 4, when voltage is applied to the electrode Sg for green, the green light is blocked and Magenta can be displayed due to the mixing of red light and blue light. Further when voltage is applied to the electrode Sb for blue, the blue light is blocked and yellow can be displayed due to the mixing of red light and green light.

Further, when voltage is applied to the electrode Sr for red and the electrode Sg for green at the same time, the red light and green light are blocked and the display of blue can be performed. When voltage is applied to the electrode Sr for red and the electrode Sb for blue at the same time, the red light and the blue light are blocked and the display of green can be performed; and when voltage is applied to the electrodes Sg for green and the electrodes Sb for blue at the same time, red can be displayed due to the blocking of green light and blue light. Furthermore, when voltage is applied to the three electrodes Sr, Sg and Sb at the same time, all of the colors are blocked and the display of black can be performed.

The resistance values of the transparent electrodes 12r, 12g and 12b are changed by adjusting the electrode widths of the transparent electrodes 12r, 12g and 12b which connect the first segment electrodes 23, and neutral tints can also be displayed by changing the voltage applied to the liquid crystal layer 29. Only the first segment electrodes 23 have been explained here, however in the case of applying voltage to the second segment electrodes 26 also, color display of seven colors can be performed in display areas which correspond to the second segment electrodes 26 by adopting the same method as in the case of applying voltage to the first segment electrodes 23.

FIG. 20 is a graph showing the range of the visual angle when normally white display is performed in the color liquid crystal display device 21. FIG. 20 (1) is a diagram showing the range of the visual angle when display is performed by applying voltage to the first segment electrodes 23, and FIG. 20 (2) is a diagram showing the range of the visual angle when display is performed by applying voltage to the second segment electrodes 26. In FIG. 20, the solid lines 121 and 122 each indicate the equal contrast curves where the contrast Co is 10. Therefore, each of the areas which are enclosed by the equal contrast curves 121 and 122 indicate the ranges of the visual angles where the contrast Co is more than 10.

As shown in FIG. 20, in the case of using the segment electrodes of either the first or second segment electrodes 23 and 26, nearly identical visual angle ranges are obtained.

(2) Normally Black Display

Normally black display is a display method which is made so that light is not transmitted through the liquid crystal layer 29 when voltage is not applied and in which the background color is black. Light is transmitted by applying voltage to the liquid crystal layer 29 and thereby performing display of the desired shape. Therefore, the polarizer plates 31 and 32 are arranged so that their directions of polarization achieve parallel polarization. In other words, the polarization plates 31 and 32 may be arranged so that their directions of polarization are in a direction perpendicular to the surface of the paper in FIG. 16, or the polarization plates 31 and 32 may be arranged so that their directions of polarization are in a direction parallel to the surface of the paper in FIG. 16. Based upon this, light cannot be transmitted through the liquid crystal layer 29 when voltage is not applied. Therefore, black is displayed as the background color in the liquid crystal display device 21.

The liquid crystal layer 29 operates as a light shutter with the application/non-application of voltage in the same way as in the case of the above mentioned normally white display. The relationship of the ON/OFF state of the segment electrodes, the operation as a light shutter and the display color is shown in Table 5. In Table 5, "o" indicates the open state of the light shutter and " • " indicates the closed state of the light shutter.

TABLE 5

| Segment Electrode ON/OFF State | | | Light Shutter | | | Display |
| --- | --- | --- | --- | --- | --- | --- |
| Sr | Sg | Sb | R | G | B | Color |
| OFF | OFF | OFF | • | • | • | Black |
| ON | OFF | OFF | o | • | • | Red |
| OFF | ON | OFF | • | o | • | Green |
| OFF | OFF | ON | • | • | o | Blue |
| ON | ON | OFF | o | o | • | Yellow |
| ON | OFF | ON | o | • | o | Magenta |
| OFF | ON | ON | • | o | o | Cyan |
| ON | ON | ON | o | o | o | White |

As shown in Table 5, when voltage is applied to only the electrode Sr for red, then red is displayed in the display area. Further, when voltage is applied to the electrode Sg for green or the electrode Sb for blue respectively, it is possible to display green or blue respectively in the display area.

Further, when voltage is applied to the electrode Sr for red and the electrode Sg for green at the same time, it is possible to perform the display of yellow due to the mixing of red light and green light. In case voltage is applied to the electrode Sr for red and the electrode Sb for blue at the same time, it is possible to perform the display of Magenta due to the mixing of red light and blue light, and in case voltage is applied to the electrode Sg for green and the electrode Sb for blue at the same time, it is possible to perform the display of cyan due to the mixing of green light and blue light. Furthermore, in case voltage is applied to the three electrodes Sr, Sg and Sb at the same time, it is possible to perform the display of white due to the mixing of red light, green light and blue light.

In the case of normally black display also, the resistance values of the transparent electrodes 12r, 12g and 12b are changed by adjusting the electrode widths of the transparent electrodes 12r, 12g and 12b which connect the first and second segment electrodes 23 and 26 in the same way as in the case of normally white display, and it is also possible to display neutral tints by changing the voltage which is applied to the liquid crystal layer 29.

FIG. 21 is a diagram showing the range of the visual angle when normally black display is performed in the color liquid crystal display device 21. The range of the visual angle when display is performed using the first segment electrode 23 is shown in FIG. 21 (1), and the range of the visual angle when display is performed using the second segment electrode 26 is shown in FIG. 21 (2). Each of the solid lines 123 and 124 in FIG. 21 are the equal contrast curves where the contrast Co is 10. Therefore, each of the areas enclosed by the equal contrast curves 123 and 124 indicate the visual angle ranges where the contrast Co is more than 10.

As shown in FIG. 21, in the case of display using the segment electrodes of either the first or second segment electrodes 23 and 26, nearly identical visual angle ranges are obtained.

Based upon this embodiment as mentioned above, it becomes possible to display two different display image planes in different colors with only the single layer type color liquid crystal display device 21, and thus diversity of display is realized.

Since the color liquid crystal display device 21 is a single layer type, the same ideal visual angle direction is obtained when either display image plane is displayed, without the difference between the ideal visual angle direction of the upper side display element and the lower side display element due to nonconformity of the visual angle directions of the upper and lower liquid crystal display elements, which occurs when displaying on two kinds of display image planes with the stacking of two liquid crystal display elements.

Further, since it is a single layer type, it becomes possible to reduce the size and weight of the structure of the color liquid crystal display device 21.

Furthermore, as shown in the above mentioned FIG. 20 and FIG. 21, when using the display modes for either the normally white display or the normally black display, identical visual angle ranges are obtained which is advantageous when planning the direction of the visual angle for the color liquid crystal display device 21.

In this embodiment, the first segment electrodes 23 and the second segment electrodes 26 were formed on the transparent substrate 22a on which the color filter 3 is formed, with the color filter 3 between them. However, it is also possible to perform two kinds of display in the same way as in the above mentioned embodiment by making the common electrodes of the transparent substrate 22b into a two layered structure with for example an insulation film of nitriding silicon etc. between them.

Further, in this embodiment the common electrodes 28 are formed larger than the display shapes of the first and second segment electrodes 23 and 26 that are formed on the transparent substrate 22a, and the sections of the electrodes which are not related to the display do not light up. They are designed so that voltage is not applied outside of the required sections even when voltage is applied to the electrodes of either the first or second segment electrodes 23. However, the common electrodes 28 may also be made to perform display of two kinds of display image planes with a pair of electrodes facing each other in a two layer construction.

Embodiment 3

Figure 22:
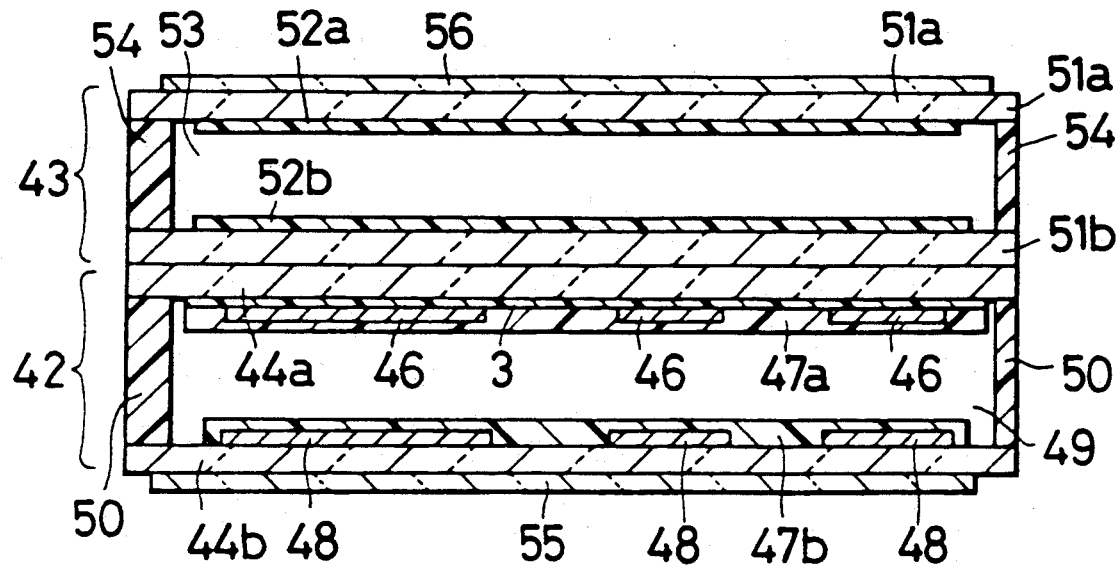
FIG. 22 is a cross section diagram of the color liquid crystal display device 41 which is a third embodiment of the invention.

FIG. 22 is a cross section diagram of the color liquid crystal display device 41 which is a third embodiment of the invention. The color liquid crystal display device 41 has two twisted nematic mode liquid crystal elements, namely the liquid crystal element 42 for display and the liquid crystal element 43 for compensation.

The liquid crystal element 42 for color display has a pair of transparent substrates 44a and 44b which are made of glass or acrylic etc., a color filter 3 is provided across nearly the entire surface of one side of the transparent substrate 44a, the transparent segment electrodes 46 are formed on top of the color filter 3, and furthermore the orientation film 47a is formed on top of the segment electrodes 46. The transparent common electrodes 48 are formed on the surface of one side of the transparent substrate 44b at least in the areas that include the segment electrodes 46, and furthermore the orientation film 47b is formed. The transparent substrates 44a and 44b are arranged so that the surfaces on which the orientation films 47a and 47b respectively are formed face one another. The twisted nematic liquid crystal layer 49 is interposed between the transparent substrates 44a and 44b, and sealed with the sealant 50.

A polyamide resin (product name PIQ, made by the Hitachi Chemical Co.) was used for the orientation films 47a and 47b. The orientation films 47a and 47b are formed to a thickness of 600 Å for example, and undergo a rubbing process with nylon cloth so that the orientation direction of the liquid crystal molecules between the transparent substrates 44a and 44b is twisted by 90°, forming a levorotatory liquid crystal layer.

Plastic spacers, not illustrated, are inserted between the transparent substrates 44a and 44b in order to maintain a uniform space between them. By means of these spacers, the space between the substrates is established at 5 micron for example. The sealant 50 for sealing the liquid crystal layer 49 is for example an epoxy resin (made by Mitsui Tooatsu). A phenyl cyclohexane compound liquid crystal for example is selected for the liquid crystal layer 49. Furthermore, cholesteric nonanoate is added to this liquid crystal, making it levorotatory. The anisotropy of the refractive index for the liquid crystal layer 49 is 0.09.

The liquid crystal element 43 for compensation has the transparent substrates 51a and 51b, which in turn have the orientation films 52a and 52b formed on the surface of one side of each, the transparent substrates 51a and 51b, which are made of glass or acrylic etc., are arranged so that the surfaces on which the orientation films 52a and 52b are formed face one another, and the twisted nematic liquid crystal 53 is interposed between the transparent substrates 51a and 51b and sealed by the sealant 54. Polyamide resin is used for the orientation films 52a and 52b, and they undergo a rubbing process so that the orientation direction of the liquid crystal molecules between the transparent substrates 52a and 52b are mutually twisted at 90°, forming a dextrorotatory liquid crystal layer.

A phenyl cyclohexane compound liquid crystal was used for the liquid crystal layer 53 in the same way as for the above mentioned liquid crystal element 42 for display. CB-15 (made by the Merck Co.) is added to this liquid crystal as a dextrorotatory chiral material. The transparent substrates 51a and 51b were laid together with plastic spacers inserted between them, in the same way as in the case of the above mentioned liquid crystal element 42 for display. 5 micron was selected for the space between the transparent substrates 51a and 51b.

The liquid crystal element 42 for color display and the liquid crystal element 43 for compensation are arranged so that the transparent substrate 44a and the transparent substrate 51b are laid one on top of the other. The twist angles for the liquid crystal molecules of the liquid crystal layer 49 of the liquid crystal element 42 for color display, and of the liquid crystal layer 53 of the liquid crystal cell 43, are both at 90°. Further, the liquid crystal molecules of the liquid crystal layer 49 are in a levorotatory orientation, and the liquid crystal molecules of the liquid crystal layer 53 are in a dextrorotatory orientation. In other words, the spiral directions of the liquid crystal molecules in the two liquid crystal elements 42 and 43 are established so as to be opposite to one another. Furthermore, the orientation direction of the liquid crystal molecules that are most nearly adjacent to the transparent substrate 44a of the liquid crystal layer 49, and the orientation direction of the liquid crystal molecules that are most nearly adjacent to the transparent substrate 51b of the liquid crystal layer 53, are arranged so as to be mutually crossed. The polarizer plate 55 is provided on the surface of the side of the transparent substrate 44b which is opposite to the liquid crystal layer 29, and further the polarizer plate 56 is provided on the surface of the side of the transparent substrate 51a which is opposite to the liquid crystal layer 53. These polarizer plates 55 and 56 are arranged so as to achieve cross polarization. The polarization directions of the polarizer plates 55 and 56 are parallel to the liquid crystal molecules which are most nearly adjacent to the transparent substrates 44b and 51a respectively.

Figure 23:
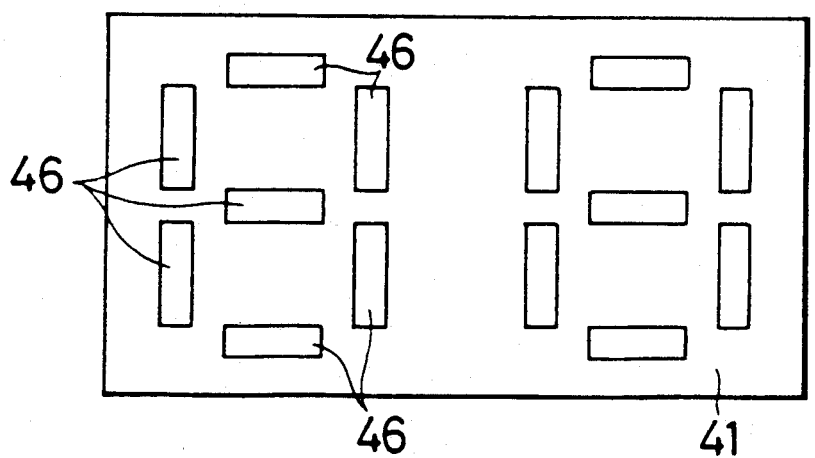
FIG. 23 is a plane view diagram of the color liquid crystal display device 41.

FIG. 23 is a plane view diagram of the color liquid crystal display device 41. In the liquid crystal display device 41 a plurality of segment electrodes 46, formed in rectangular shapes for example, are arranged so as to form figure eight and for example, two of these figure eight are put in a row.

Figure 24:
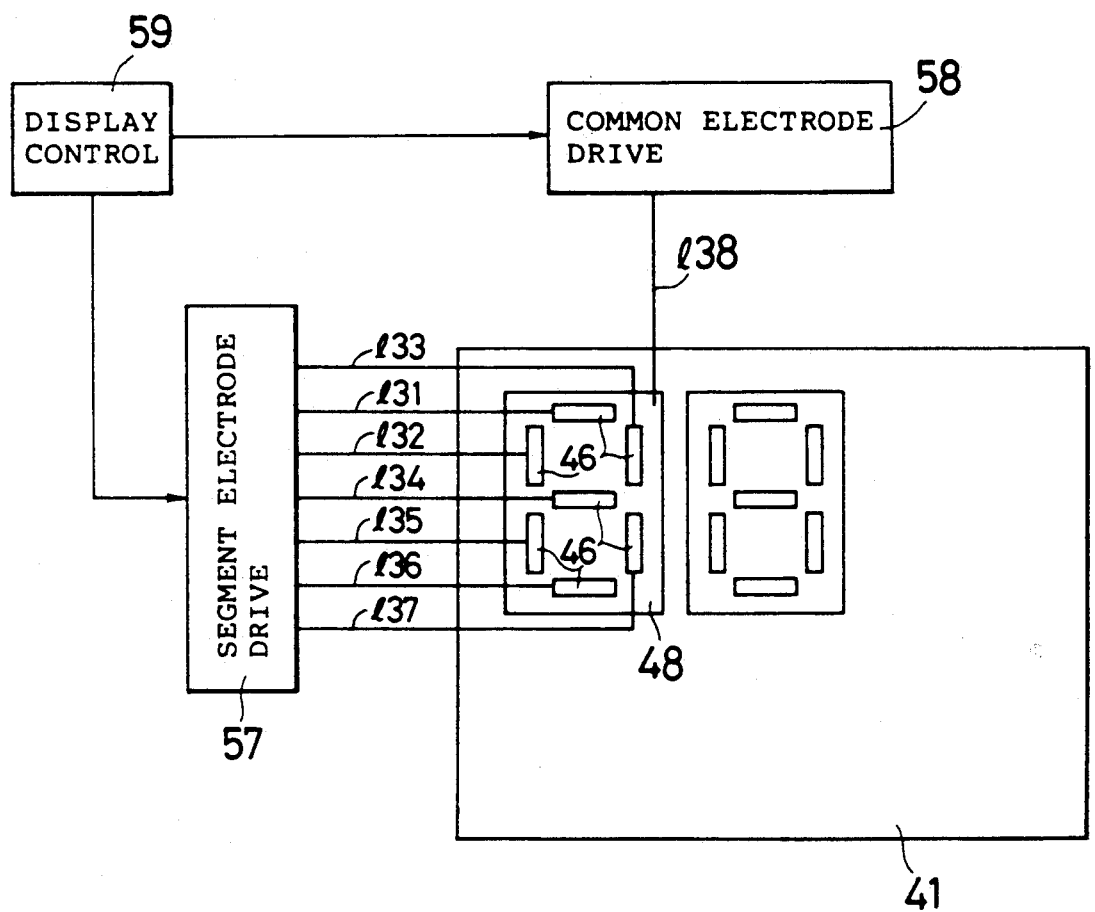
FIG. 24 is a block diagram showing the electrical construction of the color liquid crystal display device 41.

FIG. 24 is a block diagram showing the electrical construction of the color liquid crystal display device 41. A plurality of segment electrodes 46, which are display electrodes, are arranged so as to form figure eight for example, within the display image plane of the color liquid crystal display device 41. Here, the plurality of segment electrodes 46 are composed of electrodes Sr for red, electrodes Sg for green and electrodes Sb for blue, as shown in the above mentioned FIG. 10. Further the common electrodes 28 are arranged in areas that include the display areas corresponding to the segment electrodes 46. The segment electrodes 46 are each connected to the segment electrode drive circuit 57 via the signal lines 131 through 137, and the common electrode 48 is connected to the common electrode drive circuit 58 via the line 138. The signal lines 137 and 138 are provided so that they do not affect the display. The signal lines 131 through 137 are each composed of three transparent electrodes 12r, 12g and 12b, as shown in the above mentioned FIG. 10.

The segment electrode drive circuit 57 and the common electrode drive circuit 58 are connected to the display control circuit 59, and apply voltage to the segment electrodes 46 and the common electrodes 48 based upon the display control signals supplied from the display control circuit 59.

The transmitted light, that has been elliptically polarized by being transmitted through the liquid crystal layer 49 to which voltage is not applied, is subjected to a rotatory polarization effect in the opposite direction when it is transmitted through the liquid crystal layer 53, because the liquid crystal molecules are oriented in a direction opposite to the liquid crystal molecules of the liquid crystal layer 49. Furthermore, since the most nearly adjacent liquid crystal molecules are arranged so that they are crossed, the extraordinary light component and the ordinary light component of the incident polarized light from the liquid crystal layer 49 to the liquid crystal layer 53 replace one another canceling the elliptical polarization, and they return to linearly polarized light.

Therefore, the light transmitted through the areas where the segment electrodes 46 are not formed and the areas corresponding to the segment electrodes 46 to which voltage is not applied are completely blocked by the liquid crystal element 43 for compensation, and thus the leakage of light can be prevented. By this means, it is possible to display a more perfect black without any coloration as the background color.

The liquid crystal molecules of the liquid crystal layer 49, to which voltage is applied, orient themselves in the direction of the electric field. Therefore, the one predetermined direction which is transmitted through the polarizer plate 55, for example linearly polarized light in the direction perpendicular to the surface of the paper in FIG. 22, is transmitted through the liquid crystal layer 49 in nearly the same state of polarization. Here, the liquid crystal molecules which are most nearly adjacent to the transparent substrate 51b of the liquid crystal layer 53 are in an orientation state in the direction perpendicular to the surface of the paper in FIG. 22, they gradually twist as the transparent substrate 51a is approached, and the molecules which are most nearly adjacent to the transparent substrate 51a are in an orientation state in a direction parallel to the surface of the paper in FIG. 22. Therefore, light which is transmitted through the liquid crystal layer 49, to which voltage is applied, is transmitted through the liquid crystal layer 53, becomes linearly polarized light in a direction parallel to the surface of the paper in FIG. 22, and is transmitted through the polarizer plate 56.

Here, for example when voltage is applied to only the electrodes Sr for red, red is displayed in the display area. Further, when voltage is applied to the electrodes Sg for green or the electrodes Sb for blue, it is possible to display green or blue respectively in the display area.

Further, when voltage is applied to the electrodes Sr for red and the electrodes Sg for green at the same time, it is possible to perform the display of yellow due to the mixing of red light and green light. In the case of applying voltage to the electrodes Sr for red and the electrodes Sb for blue at the same time, it is possible to perform the display of magenta due to the mixing of red light and blue light; and in the case of applying voltage to the electrodes Sg for green and the electrodes Sb for blue at the same time, it is possible to perform the display of cyan due to the mixing of green light and blue light. Furthermore, in the case of applying voltage to the three electrodes Sr, Sg and Sb at the same time, it is possible to perform white display due to the mixing of red light, green light and blue light.

The resistance values of the transparent electrodes 12r, 12g and 12b are changed by adjusting the electrode width of the transparent electrodes 12r, 12g and 12b which connect the segment electrodes 46, and it is also possible to display neutral tints by changing the voltage which is applied to the liquid crystal layer 49.

Figure 25:
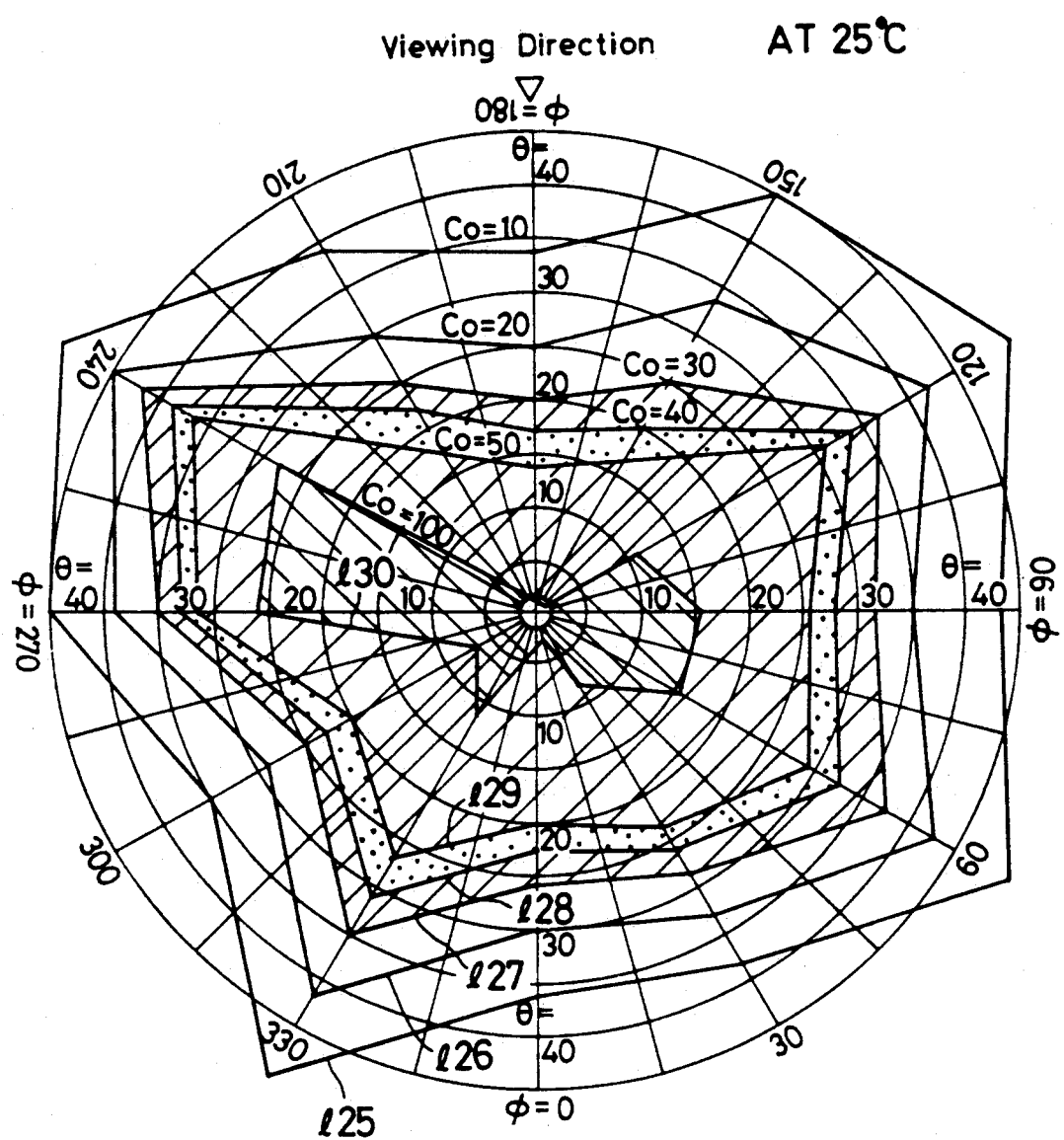
FIG. 25 is a diagram showing the visual angle characteristics in the color liquid crystal display device 41.
Figure 26:
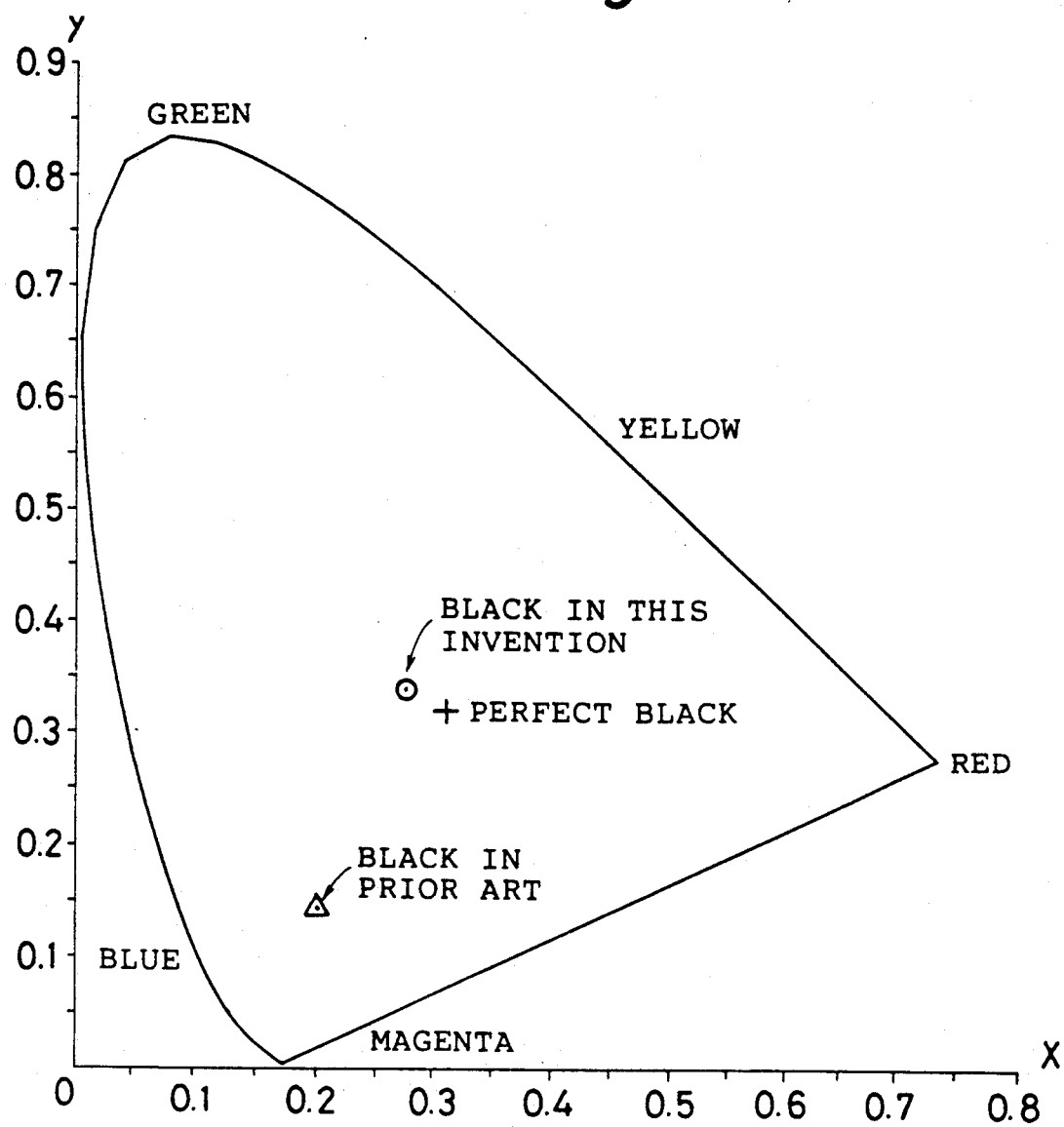
FIG. 26 is a graph showing the CIE chromaticity coordinates when black is displayed in the color liquid crystal display device 41.

FIG. 25 is a diagram showing the visual angle characteristics in the liquid crystal display device 41, and FIG. 26 is a graph showing the CIE chromaticity coordinates when black is displayed in the color liquid crystal display device 41. In FIG. 25, the solid lines 125 through 130 indicate the equal contrast curves when the contrast Co is 10, 20, 30, 40, 50 and 100 respectively. Therefore, the areas enclosed by the equal contrast curves 125 through 130 are the visual angle ranges when the contrast Co is 10, 20, 30, 40, 50 and 100 respectively.

Figure 5:
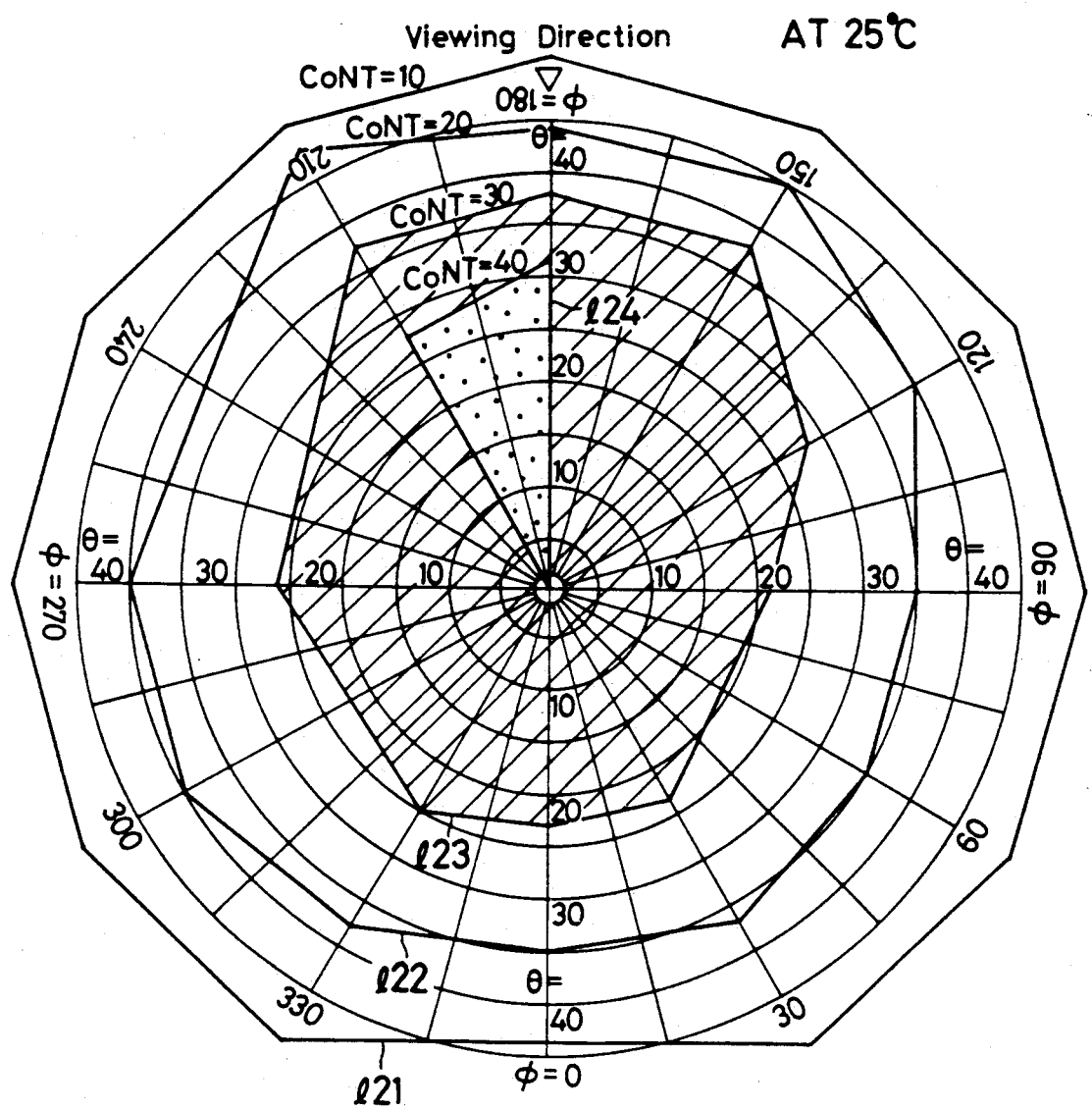
FIG. 5 is a diagram showing the visual angle characteristics in the liquid crystal display device 301 of the prior art.
Figure 6:
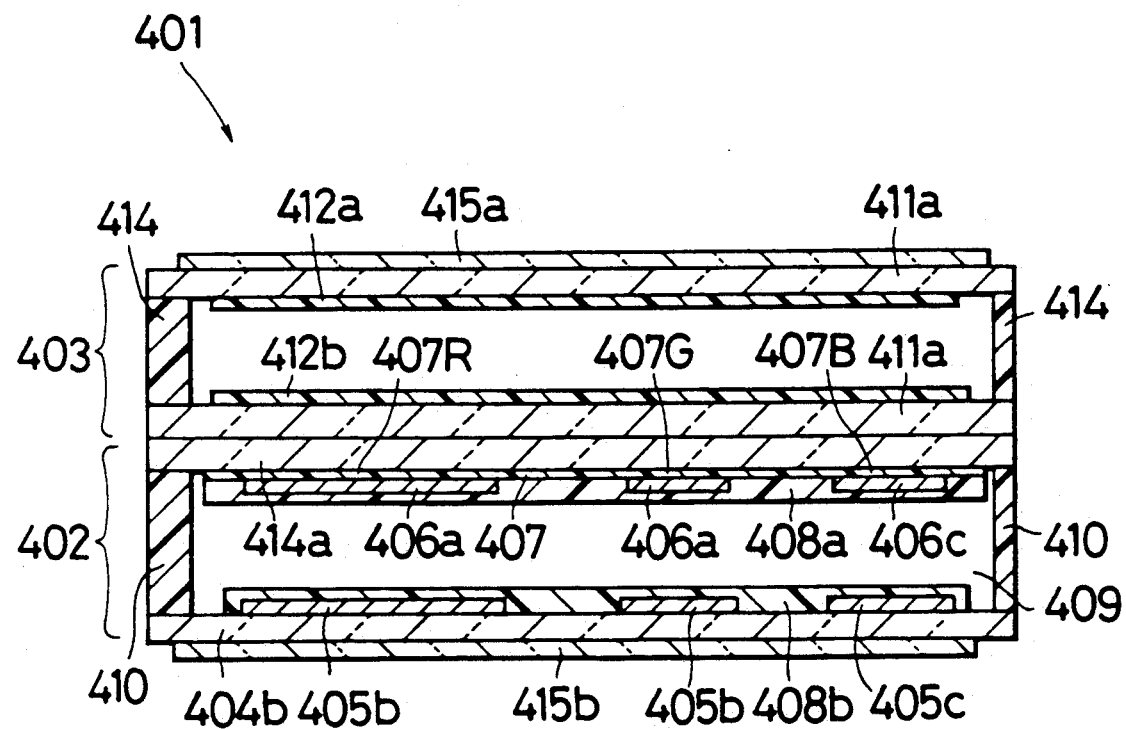
FIG. 6 is a cross section diagram showing the construction of the color liquid crystal display device 401 of the prior art.

Based upon FIG. 25, FIG. 26 and the above mentioned FIG. 5, the comparison results of the prior art liquid crystal display device 301 and the color liquid crystal display device 41, which is one embodiment of the invention, are shown in Table 6.

TABLE 6

|  |  | Normally Black of the Invention | Normally Black of the Example of the Prior Art |
|---|---|---|---|
| Contrast (Brightness/Darkness) |  | 102.5 | 38.8 |
| Brightness (Cd/m$^2$) |  | 106.6 | 92.1 |
| Darkness (Cd/m$^2$) |  | 1.04 | 2.4 |
| CIE Chromaticity | X Value | 0.274 | 0.201 |
| Coordinates | Y Value | 0.332 | 0.140 |

As shown in Table 6, the contrast of 102.5 in the color liquid crystal display 41, which is one embodiment of the invention, is markedly improved as opposed to 38.8 in the prior art liquid crystal display device 301. Further as shown in the CIE chromaticity coordinates of FIG. 26, the black in the color liquid crystal display device 41 is nearly achromatic as compared to the black in the prior art liquid crystal display device 301, and thus it is possible to display black with little coloring as compared to the prior art.

Based upon this embodiment as mentioned above, sufficient contrast can be obtained even in the color display of the so-called normally black mode by using the liquid crystal element 43 for compensation, and further it is possible to realize a perfect black, with little coloring as compared to the prior art, for the black which is the background color.

Embodiment 4

Figure 27:
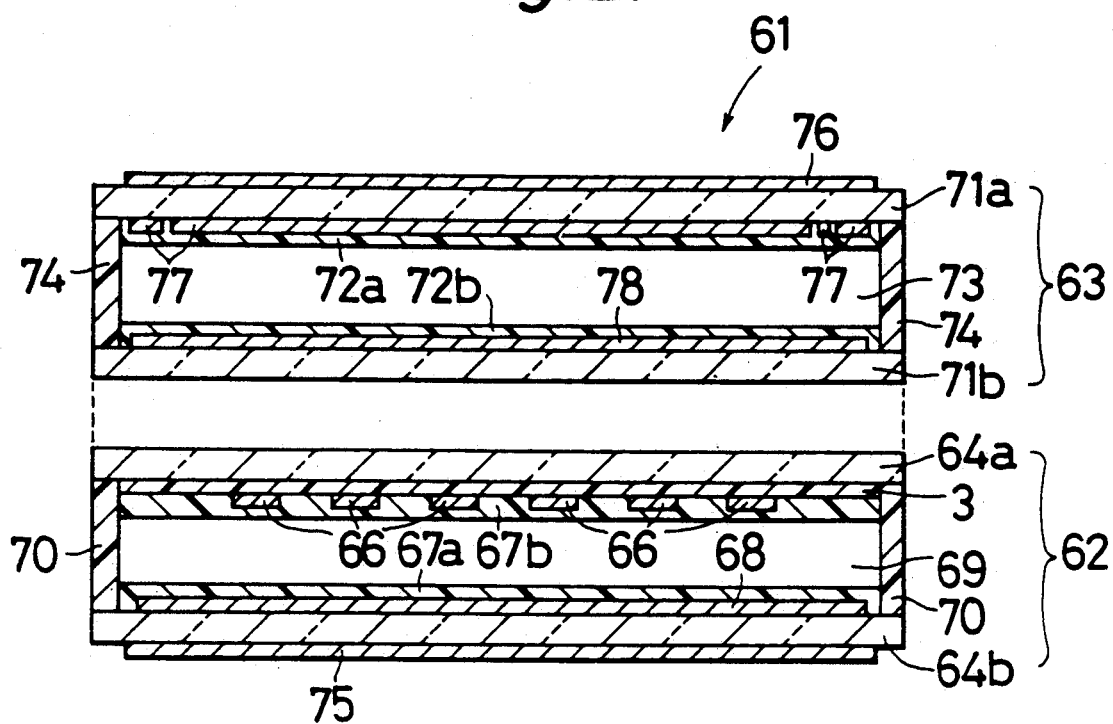
FIG. 27 is a cross section diagram of the color liquid crystal display device 61 which is a fourth embodiment of the invention.

FIG. 27 is a cross section diagram of the liquid crystal display device 61 which is a fourth embodiment of the invention. The liquid crystal display device 61 has two twisted nematic mode liquid crystal elements, namely the liquid crystal element 62 for color display and the liquid crystal element 63 for black and white display.

The liquid crystal element 62 for color display has a pair of transparent substrates 64a and 64b which are made of glass or acrylic etc., the color filter 3 is provided across nearly the entire surface of one side of the transparent substrate 64a, a plurality of translucent segment electrodes 66 are formed on top of the color filter 3, and furthermore the orientation film 67a is formed on top of the color filter 3 on which the segment electrodes 66 are formed. The transparent common electrode 68 is formed on the surface of one side of the transparent substrate 64b at least across the area which includes the segment electrodes 66, and furthermore the orientation film 67b is formed on top of that. The transparent substrates 64a and 64b are arranged so that the surfaces on which the respective orientation films 67a and 67b are formed face one another. The twisted nematic liquid crystal layer 69 is interposed between the transparent substrates 64a and 64b, and is sealed by the sealant 70.

Polyamide resin was used for the orientation films 67a and 67b. The orientation films 67a and 67b are formed to a thickness of 600 Å for example, and undergo a rubbing process with nylon cloth so that the direction of orientation of the liquid crystal molecules between the transparent substrates 64a and 64b is twisted by 90° forming a levorotatory liquid crystal layer.

In order to maintain a uniform space between the transparent substrates 64a and 64b, plastic spacers which are not illustrated are inserted between these substrates. By means of these spacers, the space between the substrates is established at 5 micron for example. The sealant 70 for sealing the liquid crystal layer 69 is epoxy resin. A phenyl cyclohexane liquid crystal compound, for example, is selected for the liquid crystal layer 69. Furthermore, cholesteric nonanoate is added to this liquid crystal to make it levorotatory.

The liquid crystal element 63 for black and white display has a pair of transparent substrates 71a and 71b which are made of glass or acrylic etc., a plurality of transparent segment electrodes 77 are formed on the surface of one side of the transparent substrate 71a across the range corresponding to the predetermined shape which is to be displayed in the display area, and furthermore the orientation film 72a is formed on top of the transparent substrate 71a on which the segment electrodes 77 are formed. The transparent common electrode 78 is formed on the surface of one side of the transparent substrate 71b at least across the area which includes the segment electrodes 77, and the orientation film 72b is formed on top of the transparent substrate 71b on which the common electrode 78 is formed. The transparent substrates 71a and 71b are arranged so that the surfaces on which the respective orientation films 72a and 72b are formed face one another. The twisted nematic liquid crystal layer 73 is interposed between the transparent substrates 71a and 71b, and is sealed by the sealant 74.

Polyamide resin is used for the orientation films 72a and 72b, and they undergo a rubbing process so that the direction of orientation of the liquid crystal molecules between the transparent substrates 71a and 71b is twisted by 90° forming a dextrorotatory liquid crystal layer.

A phenyl cyclohexane compound liquid crystal was used for the liquid crystal layer 73 in the same way as for the above mentioned liquid crystal element 62 for color display. CB-15 (made by the Merck Co.) for example is added to this liquid crystal layer as a dextrorotatory chiral material. In order to maintain a uniform space between the transparent substrates 71a and 71b, these substrates were laid together with plastic spacers between them in the same way as in the case of the above mentioned liquid crystal element 62 for color display. For example, 5 micron is selected for the space between the transparent substrates 71a and 71b.

The segment electrodes 66 and 77 and the common electrodes 68 and 78 are formed with ITO. As to the surface resistance value of the ITO, a material with a medium resistance value of 20 TO 50Ω/□ is generally used, but a material with a low resistance value may also be used.

Figure 28:
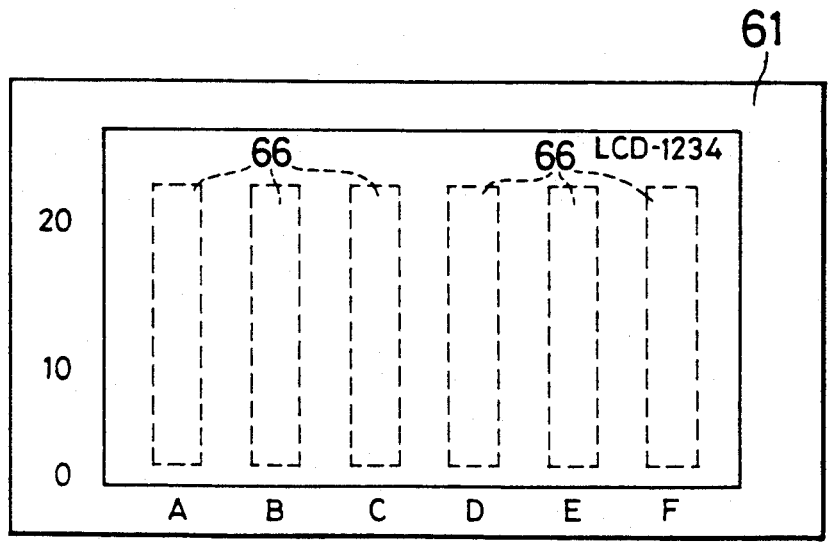
FIG. 28 is a plane view diagram of the color liquid crystal display device 61.

FIG. 28 is a plane view diagram showing the shapes of the segment electrodes 66 and 77 of the color liquid crystal display device 61. In this embodiment, the case of displaying a bar graph on the color liquid crystal display device 61 is explained. The segment electrodes 66 of the liquid crystal element 62 for color display are formed in rectangular shapes in order to display a bar graph, and for example six of these segment electrodes 66 are placed in a row. The segment electrodes 77 of the liquid crystal element 63 for black and white display are formed in shapes that correspond to the border of the graph, the characters "0," "10," "20," and "a" through "f" as the scales of the graph, and the text "LCD-12345" for explaining the graph.

FIG. 29 is a diagram for explaining the direction of polarization for the polarizer plates 75 and 76 in the color liquid crystal display device 61 and the direction of orientation for the liquid crystal molecules of the twisted nematic liquid crystal layers 69 and 73. FIG. 29 (1) shows the absorption axis R1 of the polarizer plate 76. FIG. 29 (2) shows the orientation direction and the twist direction for the liquid crystal molecules of the liquid crystal layer 73 in the liquid crystal element 63 for black and white display. The orientation direction of the liquid crystal molecules which are most nearly adjacent to the transparent substrate 71a is indicated by the arrow R2, and this orientation direction R2 is parallel to the absorption axis R1 of the polarizer plate 76. Further the orientation direction of the liquid crystal molecules which are most nearly adjacent to the transparent substrate 71b is indicated by the arrow. Therefore, the liquid crystal molecules of the liquid crystal layer 73 are twisted by 90° to the right.

FIG. 29 (3) shows the orientation direction and the twist direction for the liquid crystal molecules of the liquid crystal layer 69 in the liquid crystal display element 62 for color display. The orientation direction of the liquid crystal molecules which are most nearly adjacent to the transparent substrate 64a is indicated by the arrow R4, and the orientation direction of the liquid crystal molecules which are most nearly adjacent to the transparent substrate 64b is indicated by the arrow R5. FIG. 29 (4) shows the absorption axis R6 of the polarizer plate 75, and this absorption axis R6 is parallel to the orientation direction R5 of the liquid crystal molecules which are most nearly adjacent to the transparent substrate 64b.

As shown in FIG. 29, the twist angle of the liquid crystal molecules of the liquid crystal layer 69 in the liquid crystal element 62 for color display and the liquid crystal layer 73 in the liquid crystal element 63 for black and white display are both at 90°. Further, the liquid crystal molecules of the liquid crystal layer 69 are in a levorotatory orientation, and the liquid crystal molecules of the liquid crystal layer 73 are in a dextrorotatory orientation. In other words, they are set so that the twist directions of the liquid crystal molecules in the two liquid crystal elements 62 and 63 are in mutually opposite directions. Furthermore, the orientation direction of the liquid crystal molecules which are most nearly adjacent to the transparent substrate 64a of the liquid crystal layer 69, and the orientation direction of the liquid crystal molecules which are most nearly adjacent to the transparent substrate 71b of the liquid crystal layer 73 are arranged so that they cross one another. Furthermore the polarizer plates 75 and 76 are arranged so as to achieve cross polarization.

In two layered liquid crystal display devices, it is possible to perform optical compensation with the direction of the liquid crystal molecules in each liquid crystal layer and the locational relationship of the orientation directions of the liquid crystal molecules which are most nearly adjacent to one another. The twist direction, the locational relationship of the orientation directions and the accompanying effects are shown in Table 7 below.

TABLE 7

| Twist Direction | Orientation Direction | Best Visual Angle Area | Refractive Index Difference for Ordinary Light and Extraordinary Light | Rotatory Dispersion |
|---|---|---|---|---|
| Same Direction | Cross | Coincident | Compensation | x |
| Opposite Directions | Parallel | Coincident | x | Compensation |
| Opposite Directions | Cross | Non-coincident | Compensation | Compensation |

In this embodiment, in order to give priority to optical compensation, the twist directions of the liquid crystal molecules are in opposite directions, and a condition is used wherein the orientation directions of the most nearly adjacent liquid crystal molecules are crossed.

FIG. 30 is a block diagram showing the construction of the color liquid crystal display device 61. The back light 79 is arranged on the side of the polarization plate 75 which is opposite to the liquid crystal element 62 for color display, and by transmitting/blocking the light from the back light 79 with the liquid crystal element 62 for color display and the liquid crystal element 63 for black and white display, the kind of display image planes mentioned later are displayed on the color liquid crystal display device 61. The liquid crystal element 62 for color display is controlled by the liquid crystal element drive circuit 81 for color display. The liquid crystal element drive circuit 81 for color display applies voltage to the common electrode 68 via the signal line 147 and applies voltage to the selected segment electrodes 66 via the signal line group 148 based upon the display control signals from the display control circuit 83. By this means it is possible to perform color display in the liquid crystal element 62 for color display. The liquid crystal element 63 for black and white display is driven by the liquid crystal element drive circuit 82 for black and white display. The liquid crystal element drive circuit 82 for black and white display applies voltage to the common electrode 78 via the signal line 149 and applies voltage to the selected segment electrodes 77 via the signal line group 150 based upon the control signals from the display control circuit 83. By this means it is possible to perform black and white display in the liquid crystal element 63 for black and white display.

TABLE 8

| Composition | Combination A | Combination B | Combination C |
|---|---|---|---|
| Upper Cell | Black/White Display | Black/White Display | Color Display |
| Lower Cell | RGB Color Display | Black/White Display | RGB Color Display |
| Display Condition | Color and White Display on Black Background Normally Black | Display possible but not normally used | Moire generated, not suitable for practical use |

Examples of liquid crystal display element combinations, in which display is performed using two liquid crystal display elements, and their display conditions are shown in Table 8. In the case of combination C, the use of two liquid crystal elements for color display is effective from the aspect of diversity of display, but due to the stacking of two color filters, moire is generated and thus it is not suitable for practical use. Moire is a coarse pattern which occurs due to the overlapping of two regular patterns. In the case of combination B, the use of only two liquid crystal elements for black and white display is not very effective from the aspect of diversity of display, and thus although display is possible it is not normally used.

In the case of combination A, color display and white display can be performed with black as the background color.

Among display systems based upon the twisted nematic mode, there is a positive display system (a display system in which the ON areas to which voltage is applied result in light-blocking display, and the areas to which voltage is not applied, that is the OFF areas result in transmitted light display), that is normally white display, and there is a negative display system (a display system in which the ON areas to which voltage is applied result in transmitted light display, and the areas to which voltage is not applied, that is the OFF areas result in light-blocking display), that is normally black display.

As opposed to the case of normally black display wherein black display can be made blacker with a two layered type liquid crystal display device, black display cannot be made black in normally white display. That is because complete optical compensation for the twist of the light in the lower element cannot be achieved by the upper element. Therefore normally black display is used in the invention.

Generally in the case of twisted nematic liquid crystal display devices, the drive conditions are such that the frequency is from 30 Hz to 200 Hz and the threshold value voltage is from 5 V to 7 V. In normally black display, the areas which receive an applied voltage exceeding the threshold value voltage, that is the OFF areas, result in light-blocking display.

FIG. 31 is a timing chart for explaining the drive method for the color liquid crystal display device 61, and FIG. 32 is a plane view diagram showing a display example for the liquid crystal display device 61. FIG. 31 (1) shows the drive state of the liquid crystal element 62 for color display, where the application of voltage is represented by the high level and the non-application of voltage is represented by the low level. FIG. 31 (2) shows the drive state of the liquid crystal element 63 for black and white display, where the application of voltage is represented by the high level and the non-application of voltage is represented by the low level.

During the time interval T1, the border of the bar graph and the various characters are displayed as shown in FIG. 32 (1), because display is being performed only by the liquid crystal element 63 for black and white display. During the time interval T2, only the bar graph is displayed as shown in FIG. 32 (2), because display is being performed only in the liquid crystal element 62 for color display.

During the time interval T3, the border of the bar graph, the various characters and the bar graph are displayed as shown in FIG. 32 (3), because display is being performed by both the liquid crystal element 62 for color display and the liquid crystal element 63 for black and white display.

TABLE 9

| Lighting State of Lower Cell | | | Color Displayed by Lower Cell | Display of Upper Cell | Display State of Two-layered Cell |
| --- | --- | --- | --- | --- | --- |
| R | G | B | | | |
| • | • | • | Black | ○ = Display of white characters when ON | Black/White Characters |
| ○ | • | • | Red | | Red/White Characters |
| • | ○ | • | Green | | Green/White Characters |
| • | • | ○ | Blue | | Blue/White Characters |
| ○ | ○ | • | Yellow | | Yellow/White Characters |
| • | ○ | ○ | Cyan | • = Display not performed when OFF, same as black background | Cyan/White Characters |
| ○ | • | ○ | Magenta | | Magenta/White Characters |
| ○ | ○ | ○ | White | | White/White Characters (Not Visible) |

The correspondence between the drive state and the display state of the display image plane of the liquid crystal element 62 for color display (lower cell) and the liquid crystal element 63 for black and white display (upper cell) is shown in Table 9. As shown in the above mentioned FIG. 10 the segment electrodes 66 are composed of the electrodes Sr for red, the electrodes Sg for green and the electrodes Sb for blue which correspond respectively to the three color filters R, G and B. Therefore, a color display of seven colors can be performed by applying voltage to the desired electrodes Sr, Sg and Sb.

Red is displayed in FIG. 32 at the segment electrode 66a, because voltage is applied to only the electrode Sr for red. Green is displayed at the segment electrode 66b, because voltage is applied to only the electrode Sg for green.

At the segment electrode 66c, is is possible to display three different colors. That is to say, red is displayed in area C1 because voltage is applied to only the electrode Sr for red, blue is displayed in area C2 because voltage is applied to only the electrode Sb for blue, and yellow is displayed in area C3 because voltage is applied to the electrode Sr for red and the electrode Sg for green at the same time. Cyan is displayed at the segment electrode 66d because voltage is applied to the electrode Sg for green and the electrode Sb for blue at the same time. Magenta is displayed at the segment electrode 66e because voltage is applied to the electrode Sr for red and the electrode Sb for blue at the same time. White is displayed at the segment electrode 66f because voltage is applied to the three electrodes Sr, Sg and Sb at the same time.

Figure 34:
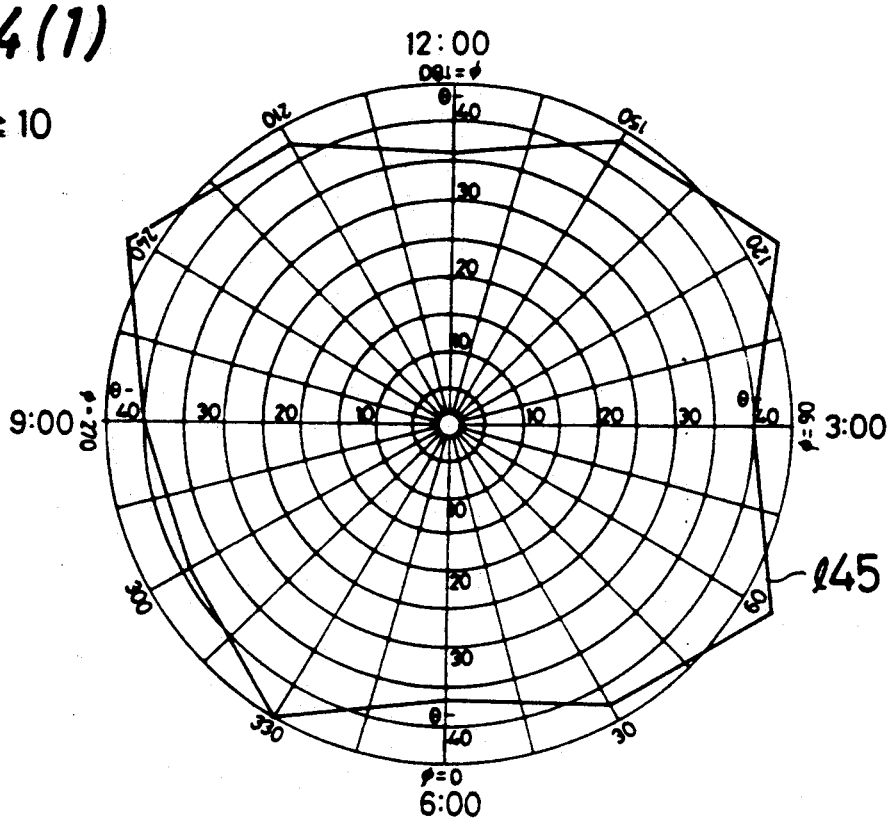
Figure 34:
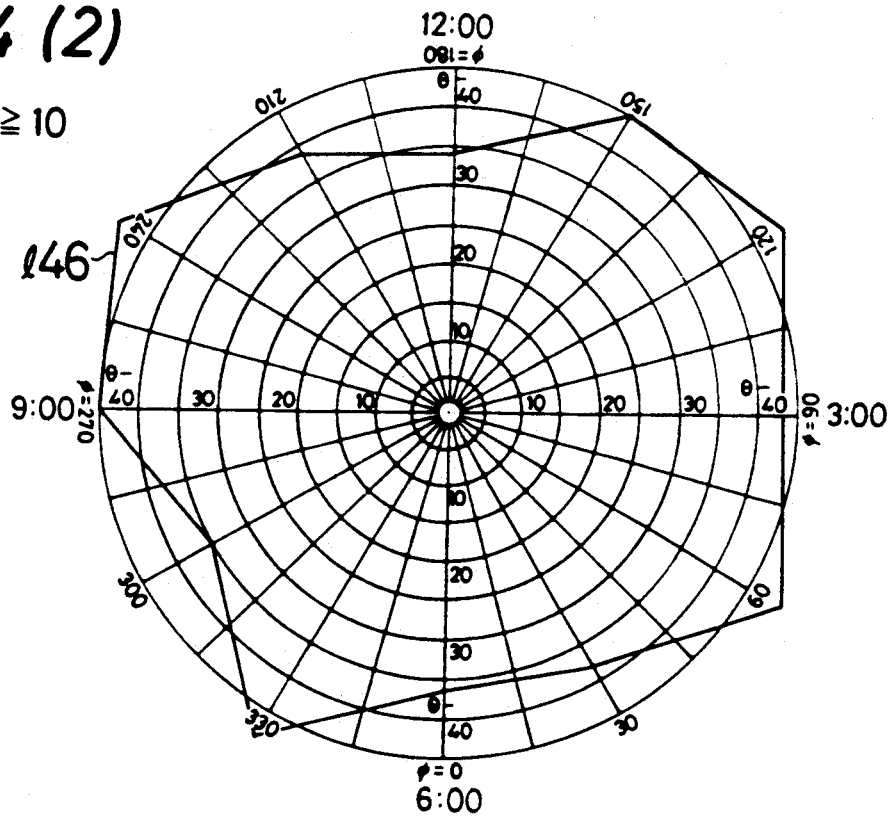

FIG. 33 and FIG. 34 are graphs showing the visual angle characteristics of the color liquid crystal display device 61. FIG. 33 (1) shows the visual angle characteristics in normally black display when the liquid crystal element 63 for black and white display is in an OFF state. The area enclosed by the line 140 in FIG. 33 (1) is the area where the contrast ratio Co is 10 or more, the area enclosed by the line 141 is the area where the contrast ratio Co is more than 40, and the area enclosed by the line 142 is the area where the contrast ratio Co is 10 or more. The contrast ratio near the center indicated 162.

FIG. 33 (2) shows the visual angle characteristics in normally white display when the liquid crystal element 63 for black and white display is in an ON state. The area enclosed by the line 143 in FIG. 33 (2) is the area where the contrast ratio Co is 10 or more, and the area enclosed by the line 144 is the area where the contrast ratio Co is more than 40. The contrast ratio near the center indicated 50. Therefore, this indicates that normally black display is superior to normally white display in the color liquid crystal display device 61.

FIG. 34 (1) is a diagram showing the visual angle range when displaying with only the liquid crystal element 63 for black and white display in normally black display, and FIG. 34 (2) shows the visual angle characteristics when display is performed using only the liquid crystal element 62 for color display in normally black display. The areas enclosed by each of the lines 145 and 146 in FIG. 34 (1) and FIG. 34 (2) indicate the areas where the contrast ratio Co is 10 or more. As shown in FIG. 34, the visual angle characteristics are nearly identical when using the display elements of either the liquid crystal element 62 for color display or the liquid crystal element 63 for black and white display.

TABLE 10

| Display State | Contrast Just Overhead |
| --- | --- |
| Color Display | 40 |
| Black and White Display | 40 |
| Simultaneous Color, Black and White Display | 24 |

The contrast for each display state is shown in Table 10. Sufficient contrast is obtained for the color display, the black and white display, and the simultaneous color and black and white display.

Based upon this embodiment as mentioned above, it is possible to display two kinds of display image planes, namely a color display image plane and a black and white display image plane, and thus diversity of display is obtained.

In this embodiment, the liquid crystal element 63 for black and white display was stacked on top of the liquid crystal element 62 for color display, however the liquid crystal element 62 for color display may also be stacked on top of the liquid crystal element 63 for black and white display. Further, it is not limited to a segment type liquid crystal element device, but may also be implemented in connection with a simple matrix type or an active matrix type liquid crystal display device.

Figure 35:
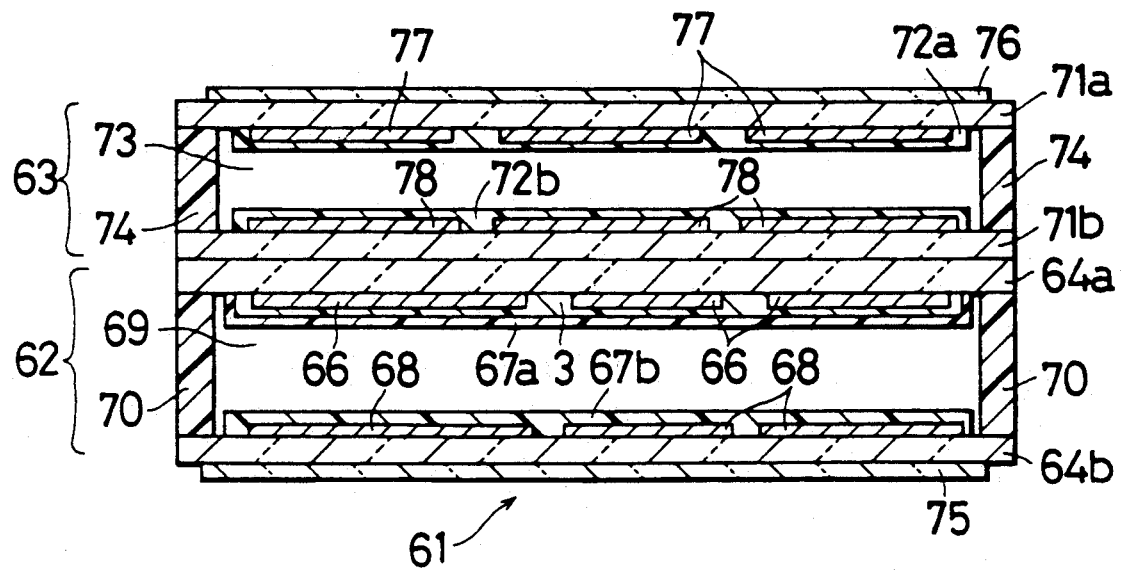
FIG. 35 and FIG. 36 are cross section diagrams for explaining embodiments other than the fourth embodiment.
Figure 36:
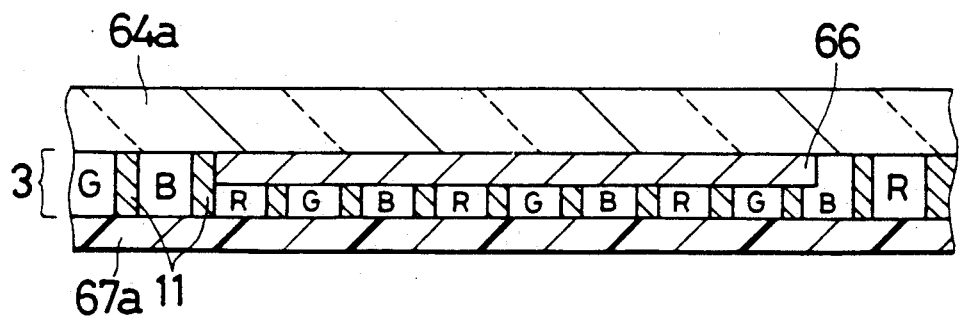

FIG. 35 and FIG. 36 are cross section diagrams for explaining another embodiment of the invention. This embodiment is similar to the above mentioned embodiment, and the same reference symbols are used for corresponding structures. A special characteristic of this embodiment is the fact that the color filter layer 3 is formed on top of the transference electrode 64a on which the segment electrodes 66 are formed. In this embodiment also, the same effect is obtained as mentioned above.

Embodiment 5

Figure 37:
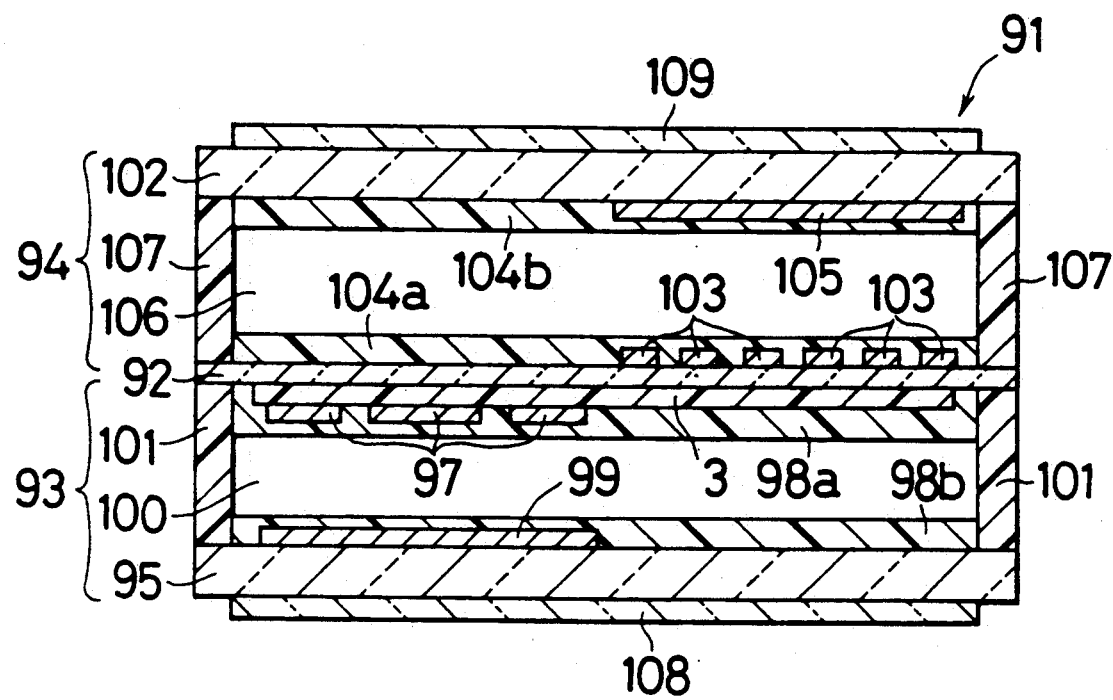
FIG. 37 is a cross section diagram showing the construction of the color liquid crystal display device 91 which is a fifth embodiment of the invention.
Figure 38:
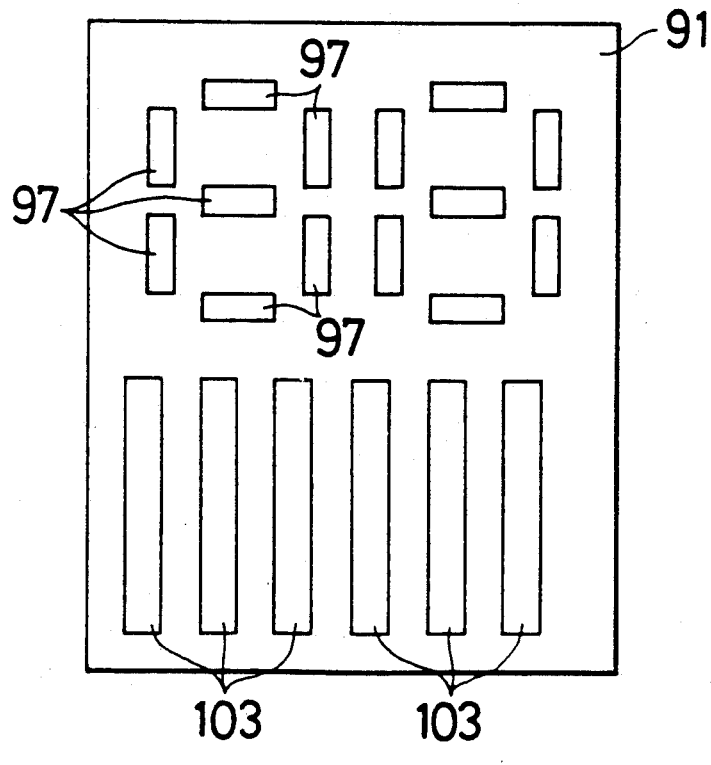
FIG. 38 is a plane view diagram of the color liquid crystal display device 91.

FIG. 37 is a cross section diagram of the color liquid crystal display device 91 which is a fifth embodiment of the invention. The color liquid crystal display device 91 has two twisted nematic mode liquid crystal display element sections, namely the first color display element section 93 and the second color display element section 94, each of which are composed including the transparent substrate 92. The transparent substrate 92 is for example composed of ES (ether sulfone), PET (polyether telephthalate), polyalitate, or polycarbonate etc., and for example a thickness of 0.1 mm is selected.

The first color display element section 93 has the transparent substrate 92 and the transparent substrate 95 which is made of glass or acrylic etc., the color filter 3 is provided across nearly the entire surface of one side of the transparent substrate 92, a plurality of transparent electrodes 97 are formed on the color filter 3. Furthermore the orientation film 98a is formed on the color filter 3 on which the segment electrodes 97 were formed. The transparent common electrode 99 is formed on the surface of one side of the transparent substrate 95 at least across the area that includes the segment electrodes 97, and furthermore the orientation film 98b is formed on top of that. The transparent substrates 92 and 95 are arranged so that the surfaces on which the respective orientation films 98a and 98b are formed face one another. The twisted nematic layer 100 is interposed between the transparent substrates 92 and 95, and is sealed with the sealant 101.

The orientation films 98a and 98b are for example formed of a polyamide resin. The orientation films 98a and 98b are for example formed to a thickness of 600 Å, and undergo a rubbing process with nylon cloth so as to twist the orientation direction of the liquid crystal molecules between the transparent substrates 92 and 95 by 90°, thereby forming a levorotatory liquid crystal layer.

In order to maintain a uniform space between the transparent substrates 92 and 95, plastic spacers which are not illustrated are inserted between these substrates. By means of these spacers, the space between the substrates is established at 5 micron for example. The sealant 101 for sealing the liquid crystal layer 100 is an epoxy resin for example. A phenyl cyclohexane compound liquid crystal for example is selected for the liquid crystal layer 100. Cholesteric nonanoate is added to this liquid crystal making it levorotatory.

The second color display element section 94 has the transparent substrate 92 and the transparent substrate 102 which is made of glass or acrylic etc. A plurality of transparent segment electrodes 103 are formed on the surface of the other side of the transparent substrate 92 across the range corresponding to the predetermined shapes which are to be displayed in the display area. Furthermore, the orientation film 104a is formed on the surface of the other side of the transparent substrate 92 on which the segment electrodes 103 were formed. The transparent common electrode 105 is formed on the surface of one side of the transparent substrate 102 at least across the area which includes the segment electrodes 103, and the orientation film 104b is formed on the transparent substrate 102 on which the common electrode 105 was formed. The transparent substrates 92 and 102 are arranged so that the surfaces on which the respective orientation films 104a and 104b are formed face one another. The twisted nematic liquid crystal layer 106 is interposed between the transparent substrates 92 and 102, and is sealed by the sealant 107.

A polyamide resin etc. is used for the orientation films 104a and 104b, and they undergo a rubbing process so that the orientation direction of the liquid crystal molecules between the transparent substrates 92 and 102 is twisted by 90°, thereby forming a dextrorotatory liquid crystal layer.

A phenyl cyclohexane compound liquid crystal was used for the liquid crystal layer 106 in the same way as for the above mentioned first color display element section 93. CB-15 (made by the Merck Co.) for example is added to this liquid crystal layer as a dextrorotatory chiral material. In order to maintain a uniform space between the transparent substrates 92 and 102, these substrates are laid together with plastic spacers inserted between them, in the same way as in the case of the above mentioned first color display element section 93. 5 micron for example is selected for the space between the transparent substrates 92 and 102.

The segment electrodes 97 and 103, and the common electrodes 99 and 105 are formed of ITO. As to the surface resistance value of the ITO, a material with a medium resistance value of 20 to 50Ω/□ is generally used, but a material with a low resistance value may also be used.

FIG. 39 is a diagram for explaining the direction of polarization for the polarizer plates 108 and 109 in the color liquid crystal display device 71 and the direction of orientation for the liquid crystal molecules of the twisted nematic liquid crystal layers 100 and 106. FIG. 39 (1) shows the absorption axis R1 of the polarizer plate 109. FIG. 39 (2) shows the orientation direction and the twist direction for the liquid crystal molecules of the liquid crystal layer 106 in the second color display element section 94. The orientation direction of the liquid crystal molecules which are most nearly adjacent to the transparent substrate 102 is indicated by the arrow R2, and this orientation direction R2 is parallel to the absorption axis of the polarizer plate 109. Further the orientation direction of the liquid crystal molecules which are most nearly adjacent to the transparent substrate 102 is indicated by the arrow R3. Therefore, the liquid crystal molecules of the liquid crystal layer 106 are twisted by 90° to the right.

FIG. 39 (3) shows the orientation direction and the twist direction for the liquid crystal molecules of the liquid crystal layer 100 in the second color display element section 93. The orientation direction of the liquid crystal molecules which are most nearly adjacent to the transparent substrate 92 is indicated by the arrow R4, and the orientation direction of the liquid crystal molecules which are most nearly adjacent to the transparent substrate 95 are indicated by the arrow R5. Therefore the liquid crystal molecules of the liquid crystal layer 109 are twisted by 90° to the left. FIG. 39 (4) shows the absorption axis R6 of the polarizer plate 108, and this absorption axis R6 is parallel to the orientation direction R5 of the liquid crystal molecules which are most nearly adjacent to the transparent substrate 95.

As shown in FIG. 39, the twist angles of the liquid crystal molecules of the liquid crystal layer 100 in the first color display element section 93 and the liquid crystal layer 106 in the second color display element 94 are both at 90°. Further, the liquid crystal molecules of the liquid crystal layer 100 are in a levorotatory orientation, and the liquid crystal molecules of the liquid crystal layer 106 are in a dextrorotatory orientation. In other words, they are set so that the twist directions of the liquid crystal molecules in the two liquid crystal elements 93 and 94 are in mutually opposite directions. Furthermore, the orientation direction of the liquid crystal molecules which are most nearly adjacent to the transparent substrate 92 of the liquid crystal layer 100, and the orientation direction of the liquid crystal molecules which are most nearly adjacent to the transparent substrate 92 of the liquid crystal layer 106 are arranged so that they cross one another. Furthermore the polarizer plates 108 and 109 are arranged so that they achieve cross polarization.

In two layered liquid crystal display devices, it is possible to perform optical compensation by means of the twist direction of the liquid crystal molecules in each liquid crystal layer and the locational relationship of the orientation directions of the liquid crystal molecules which are most nearly adjacent to one another. The twist direction, the locational relationship of the orientation directions and the accompanying effects are shown in the above Table 7.

In this embodiment, in order to give priority to optical compensation, the twist directions of the liquid crystal molecules are in opposite directions, and a condition is used wherein the orientation directions of the most nearly adjacent liquid crystal molecules are crossed.

FIG. 40 is a block diagram showing the electrical construction of the color liquid crystal display device 91. The back light 113 is arranged on the side of the polarization plate 105 which is opposite to the first color display element section 93, and by transmitting/blocking the light from the back light 113 with the first and second color display element sections 93 and 94, the kind of display image planes mentioned later are displayed on the color liquid crystal display device 91. The first color display element section 93 is controlled by the first color display element drive circuit 110. The first color display element drive circuit 110 applies voltage to the common electrode 99 via the signal line 153 and applies voltage to the selected segment electrodes 97 via the signal line group 154 based upon the display control signals from the display control circuit 112. The second color display element section 94 is driven by the second color display element drive circuit 111. The second color display element drive circuit 111 applies voltage to the common electrode 105 via the signal line 155 and applies voltage to the selected segment electrodes 103 via the signal line group 156 based upon the control signals from the display control circuit 112.

FIG. 41 is a timing chart for explaining the drive state of the color liquid crystal display device 91, and FIG. 42 is a diagram showing a display example for the color liquid crystal display device 91. FIG. 41 (1) shows the drive state of the first color display element section 93, where the high level represents the application of voltage and the low level represents the non-application of voltage. FIG. 41 (2) shows the drive state of the second color display element section 94, where the high level represents the application of voltage and the low level represents the non-application of voltage.

During the time interval T4, figure eights are displayed as shown in FIG. 42 (1), because display is being performed only by the first color display element section 93. During the time interval T5, only the level meter is displayed as shown in FIG. 42 (2), because display is being performed only in the second color display element section 94.

During the time interval T6, the two figure eights and the level meter are displayed as shown in FIG. 42 (3), because display is being performed by both the first and second color display element sections 93 and 94.

TABLE 11

| Light Shutter | | | Normally Black Display | Normally White Display |
|---|---|---|---|---|
| R | G | B | Display Color | Display Color |
| ○ | ● | ● | Red | Cyan |
| ● | ○ | ● | Green | Magenta |
| ● | ● | ○ | Blue | Yellow |
| ○ | ○ | ● | Yellow | Blue |
| ○ | ● | ○ | Magenta | Green |
| ● | ○ | ○ | Cyan | Red |
| ○ | ○ | ○ | White | Black |
| ● | ● | ● | Black | White |

The correspondence of the drive states for the first and second color display element sections 93 and 94, and the display color are shown in Table 11. The segment electrodes 97 and 103 are composed of the electrodes Sr for red, the electrodes Sg for green and the electrodes Sb for blue, which correspond to the three color filters R, G and B respectively as shown in the above mentioned FIG. 10. Therefore, color display of seven colors can be performed by applying voltage to the desired electrodes Sr, Sg and Sb. In this case, the display colors are different in normally black display and normally white display even when the drive states are the same. In other words, the display colors are mutually related as complementary colors in normally black display and normally white display even when the drive states are the same.

FIG. 43 is a diagram showing the visual angle characteristics of the color liquid crystal display device 91. The visual angle characteristics when normally black display is performed in the color liquid crystal display device 91 are shown in FIG. 43. The area enclosed by the solid line 151 in FIG. 43 (1) is the area where the contrast ratio Co is 10 or more, and the visual angle characteristics when display is performed by the second color display element section 94 are shown in FIG. 43 (1).

FIG. 43 (2) shows the visual angle characteristics when display is performed by the first color display element section 93, and the area enclosed by the solid line 152 is the area where the contrast ratio Co is 10 or more.

Based upon this embodiment as mentioned above, two kinds of color display image planes can be displayed because the color liquid crystal display device 91 was made in a two layered construction, and thus diversity of display is realized.

The transparent substrate 92 used in the color liquid crystal display device 91 has a thickness of 0.1 mm, and because the thickness is thin, there is no discrepancy due to parallax between the filter layer 3 and the electrodes in the first and second color display element sections 93 and 94, and further because the color filter layer is a single layer, moire stripes are not generated and thus clear color display can be performed.

Embodiment 6

Figure 44:
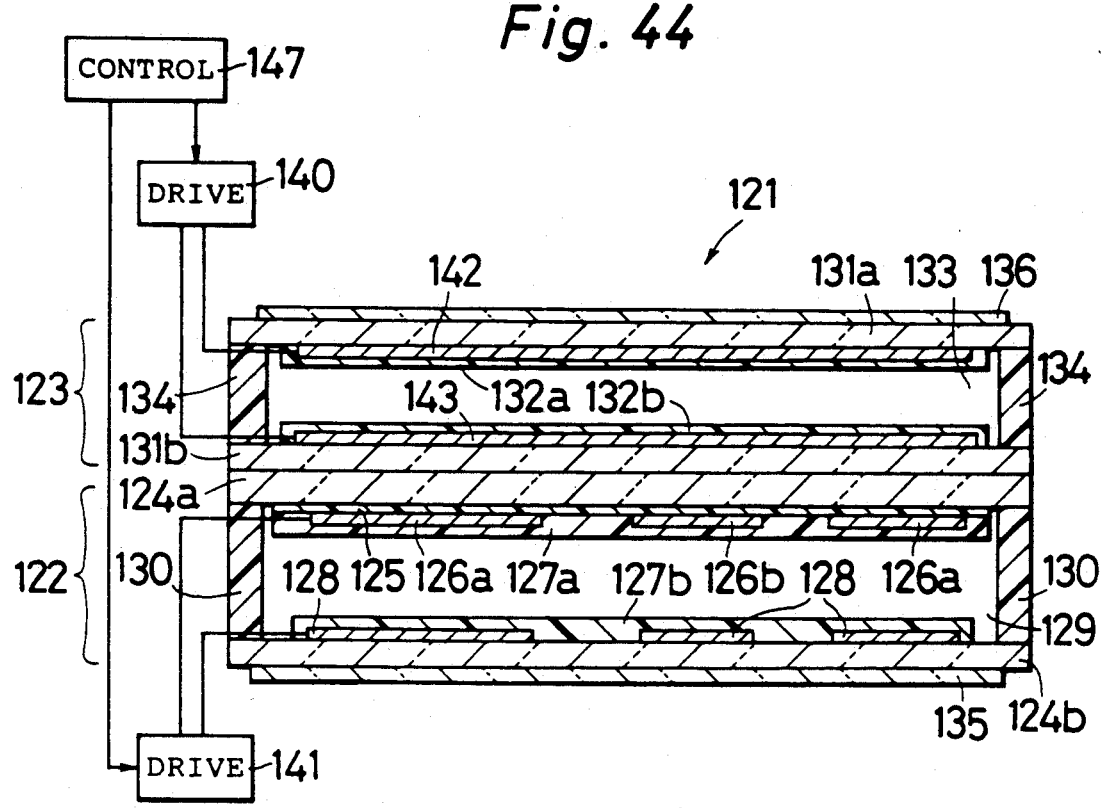
FIG. 44 is a cross section diagram of the liquid crystal display device 121 which is a sixth embodiment of the invention.

FIG. 44 is a cross section diagram of the color liquid crystal display device 121 which is a sixth embodiment of the invention. The liquid crystal display device 121 has two twisted nematic mode liquid crystal elements, namely the liquid crystal element 122 for color display and the liquid crystal element 123 for compensation.

The liquid crystal element 122 for color display has a pair of transparent substrates 124a and 124b which are made of glass or acrylic resin etc., and the color filter 125 is provided across nearly the entire surface of one side of the transparent substrate 124a. A plurality of transparent segment electrodes 126 are formed on the color filter 125, and furthermore the orientation film 127a is formed on the color filter 125 on which the segment electrodes 126 were formed. A plurality of transparent common electrodes 128 are formed on the surface of one side of the transparent substrate 124b at least across the area which includes the segment electrodes 126. Furthermore the orientation film 127b is formed on the transparent substrate 124b on which the common electrodes 128 were formed. The transparent substrates 124a and 124b are arranged so that the surfaces on which the respective orientation films 127a and 127b are formed face one another. The twisted nematic liquid crystal layer 129 is injected between the transparent substrates 124a and 124b, and sealed by the sealant resin 130.

Polyamide resin is used for the orientation films 127a and 127b. The orientation films 127a and 127b are formed to a thickness of 600 Å for example, and as an example undergo a rubbing process with nylon cloth in order to twist the orientation direction of the liquid crystal molecules between the transparent substrates 124a and 124b by 90°, thereby forming a levorotatory liquid crystal layer.

In order to maintain a uniform space between the transparent substrates 124a and 124b, plastic spacers which are not illustrated are inserted between the substrates 124a and 124b. By means of these spacers, the space between the substrates 124a and 124b is established at 5 micron for example. The sealant resin 130 for sealing the liquid crystal layer 129 is epoxy resin for example. A phenyl cyclohexane compound liquid crystal for example is selected for the liquid crystal layer 129. Furthermore, cholesteric nonanoate is added to this liquid crystal making it levorotatory.

The liquid crystal element 123 for compensation has the transparent substrates 131a and 131b which are made of glass or acrylic resin etc., and the transparent electrodes 142 and 143 are formed across nearly the entire surface of one side of each of the transparent substrates 131a and 131b. Furthermore, the orientation films 132a and 132b are formed on the transparent electrodes 142 and 143 respectively. The transparent substrates 131a and 131b are arranged so that the surfaces on which the respective orientation films 132a and 132b are formed face one another. The twisted nematic liquid crystal layer 133 is interposed between the transparent substrates 131a and 131b, and sealed by the sealant resin 134. A polyamide resin is used for the orientation films 132a and 132b, and they undergo a rubbing process so that the orientation directions of the liquid crystal molecules between the transparent substrates 131a and 131b are mutually twisted by 90°, thereby forming a dextrorotatory liquid crystal layer.

A phenyl cyclohexane compound liquid crystal was used for the liquid crystal layer 133 in the same way as for the above mentioned liquid crystal element 122 for display. CB-15 (made by the Merck Co.) is added to this liquid crystal as a dextrorotatory chiral material. The transparent substrates 131a and 131b are laid together with plastic spacers inserted between them in the same way as in the case of the above mentioned liquid crystal element 122 for display. 5 micron for example is selected for the space between the transparent substrates 131a and 131b.

The polarizer plate 135 is provided on the surface of the transparent substrate 124b which is opposite from the liquid crystal layer 129, and further the polarization plate 136 is provided on the surface of the transparent substrate 131a which is opposite from the liquid crystal layer 133. These polarizer plates 135 and 136 are arranged so that they achieve cross polarization. Further the drive circuit 140 is provided, which is a one-way drive means that outputs a display signal to the transparent electrodes 142 and 143 of the liquid crystal element 123, as mentioned below, and the drive circuit 141 is provided, which is a drive means for the other direction that outputs a display signal to the electrodes 126 and 128 of the liquid crystal element 122, as mentioned below. The drive circuits 140 and 141 are driven by the signal outputted from the control circuit 147, as mentioned below.

Figure 45:
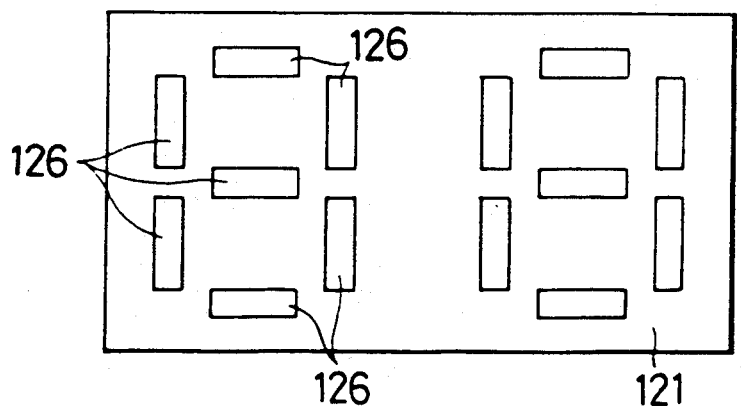
FIG. 45 is a plane view diagram of FIG. 44.

FIG. 45 is a plane view diagram of the liquid crystal display device 121. For example, the segment electrodes 126 which are formed in rectangular shapes are arranged so as to form figure eight in the liquid crystal display device 121, and for example two of this kind of figure eight are placed in a row.

Figure 46:
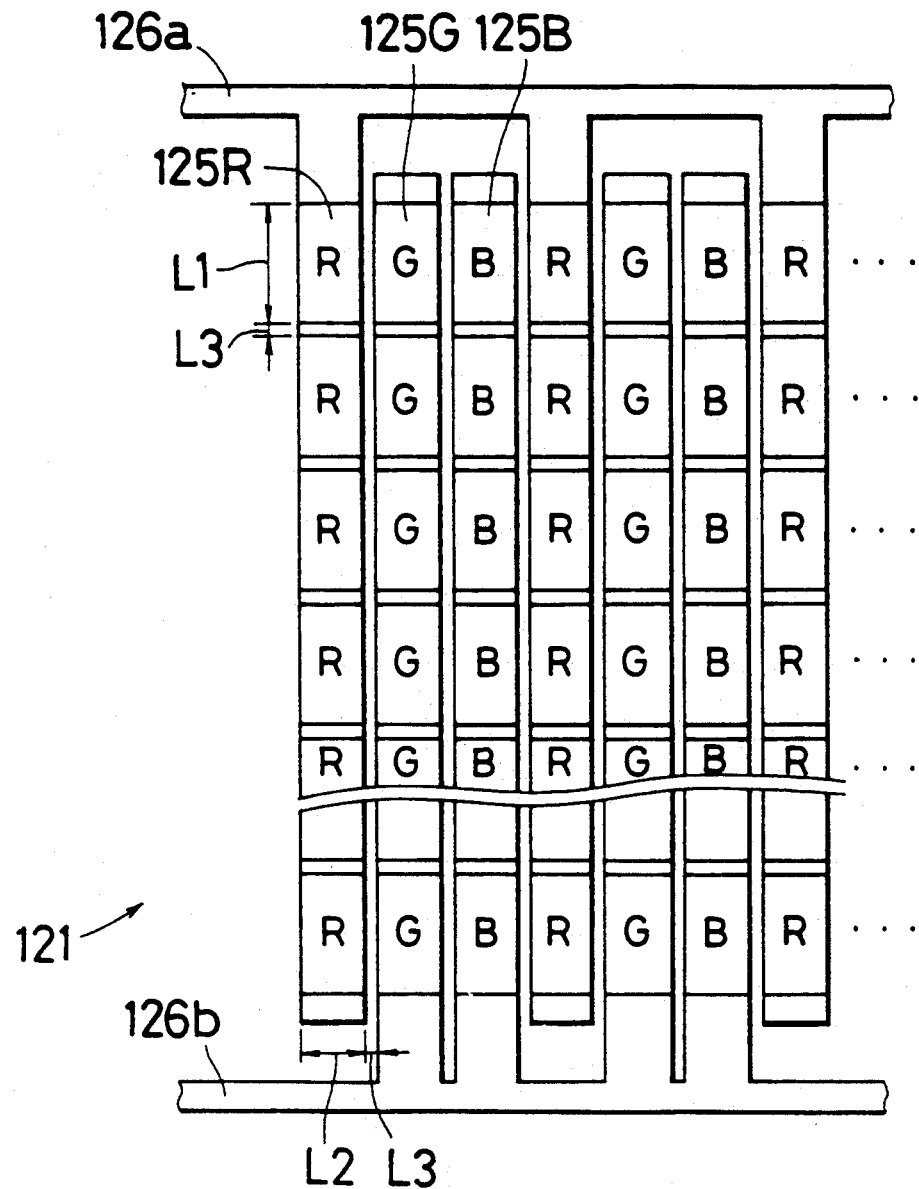
FIG. 46 is an enlarged plane view diagram of the liquid crystal display device 121.
Figure 47:
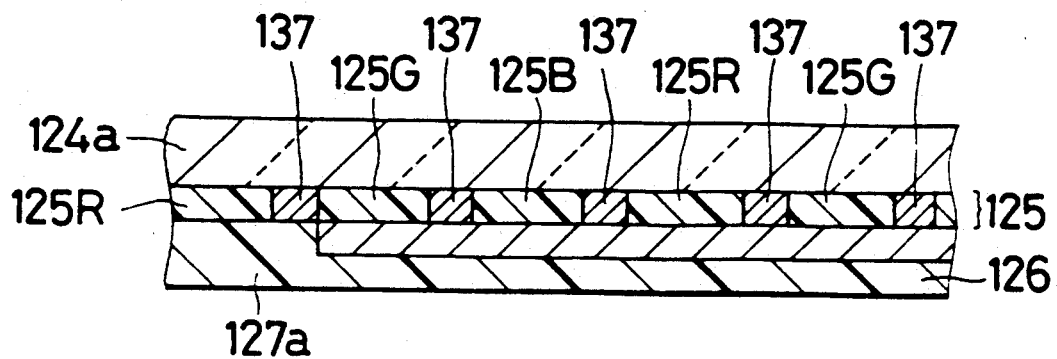
FIG. 47 is an enlarged cross section diagram of the area around the color filter 125.

FIG. 46 is a plane view diagram of the transparent substrate 124a, and FIG. 47 is an enlarged cross section diagram of the area around the color filter 125 in FIG. 44. In this embodiment for example a plurality of the red color filters 125R having the length L1 and the width L2 are arranged with the space L3 between them, and as a whole are formed in a long belt shape. The remainder of the green and blue color filters 125G and 125B also have the same dimensions and arrangement pitch as the color filters 125R, and as a whole are formed in long belt shapes. In this embodiment the segment electrodes 126a are formed in belt shapes on the color filters 125R, and the segment electrodes 126b are formed on the color filters 127R and 127B. The light-blocking layers 137, which for example are made of a metal such as chrome Cr or a composition resin material etc., are formed between each of these color filters 125R, 125G and 125B. The color filter layer 125 and the segment electrodes 126 may have the same composition as the color filter layer 3 and the segment electrodes Sr, Sg and Sb in the above mentioned first embodiment.

Figure 48:
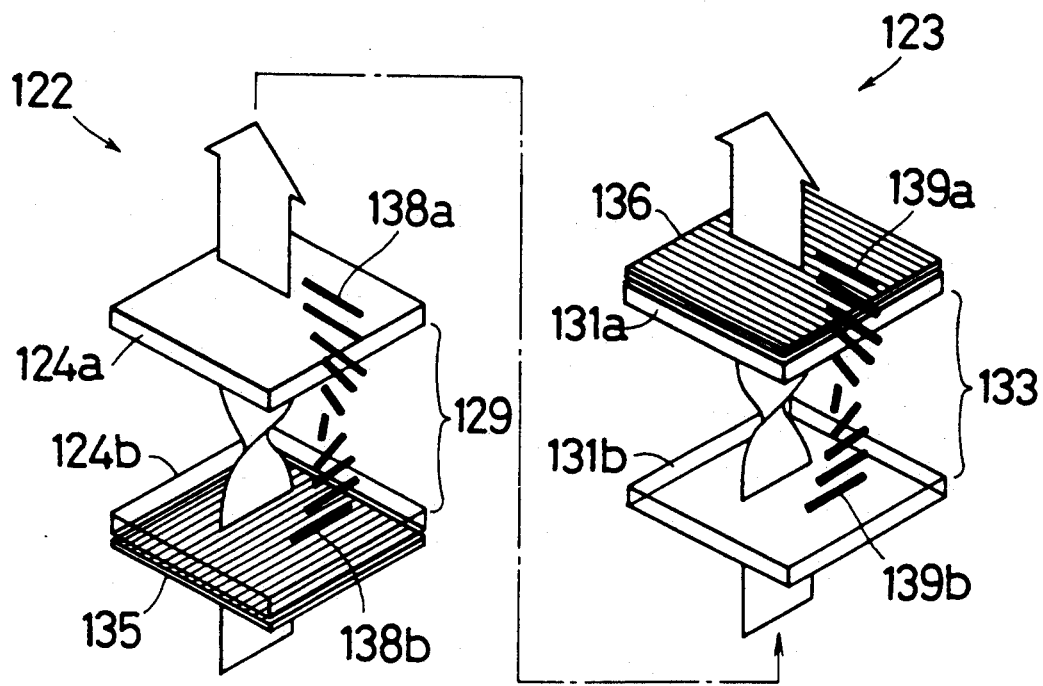
FIG. 48 is an oblique view diagram explaining the orientation state of the liquid crystal molecules.

FIG. 48 is an oblique view diagram explaining the orientation direction of the liquid crystal molecules of the liquid crystal layers 129 and 133 in the color liquid crystal display device 121, and FIG. 49 is a diagram explaining the orientation direction of the liquid crystal molecules. In this embodiment the orientation direction of the liquid crystal molecules 138b which are most nearly adjacent to the transparent substrate 124b of the liquid crystal layer 129, and the orientation direction of the liquid crystal molecules 138a which are most nearly adjacent to the transparent substrate 124a are composed in a state wherein for example they are twisted by 90° in a levorotatory direction, as shown in FIG. 49 (1). Further the liquid crystal molecules 139b which are most nearly adjacent to the transparent substrate 131b in the liquid crystal element 133 and the liquid crystal molecules 139a which are most nearly adjacent to the transparent substrate 131a also have a composition wherein they are twisted for example by 90° in a levorotatory direction, as shown in FIG. 49 (1). Furthermore the liquid crystal molecules 138a and 139b are composed so that they are mutually crossed.

The kind of effects and results in this embodiment which are mentioned below can be achieved in the same way even in a case where the liquid crystal molecules 138a and 138b in the liquid crystal element 122 are twisted in a levorotatory direction as show in FIG. 49 (2), and the liquid crystal molecules 139b and 139a in the liquid crystal element 123 are twisted in a dextrorotatory direction as shown in FIG. 49 (2), and the liquid crystal molecules 138a and 139b are in a mutually parallel orientation state. Further this can be achieved in the same way even in a case wherein the liquid crystal molecules 138b and 138a are twisted in a levorotatory direction as shown in FIG. 49 (3), and the liquid crystal molecules 139b and 139a are twisted in a dextrorotatory direction as shown in FIG. 49 (3), and the liquid crystal molecules 138a and 139b are in a mutually crossed orientation direction.

FIG. 50 is a timing chart for explaining the drive state of the color liquid crystal display device 121, and FIG. 51 is a diagram showing a display example for the color liquid crystal display device 121. FIG. 50 (1) shows the drive state of the liquid crystal element 122 for color display, where the high level represents the application of voltage and the low level represents the non-application of voltage. FIG. 50 (2) shows the drive state of the liquid crystal element 123 for compensation, where the high level represents the application of voltage and the low level represents the non-application of voltage. During the time interval T7 in FIG. 50, black is displayed as the background color in the color liquid crystal display device 121, because voltage is not being applied to either the liquid crystal element 122 for color display or the liquid crystal element 123 for compensation. During the time interval T8 in FIG. 50, only the liquid crystal element 122 for color display is driven, and voltage is not applied to the liquid crystal element 123 for compensation. In this state, so-called normally black display is performed. In other words, only the areas that correspond to the segment electrodes 126 to which voltage is applied transmit light, as shown in FIG. 51 (1), and for example "12" is displayed. Here, in case for example voltage is applied to only the electrodes Sr for red which correspond to the red color filters R, "12" will be displayed in red. Moreover, it is assumed here that the color filter layer 3 and the segment electrodes Sr, Sg and Sb are used (Refer to FIG. 8 and FIG. 10).

The transmitted light, which has been elliptically polarized by transmission through the liquid crystal layer 129 to which voltage is not applied, is subjected to a rotatory polarization effect in the opposite direction when it is transmitted through the liquid crystal layer 133, because the liquid crystal molecules are oriented in the opposite direction of the liquid crystal molecules in the liquid crystal layer 129. Furthermore, since the most nearly adjacent liquid crystal molecules are arranged so that they are crossed, the extraordinary light component and the ordinary light component of the incident polarized light from the liquid crystal layer 129 to the liquid crystal layer 133 replace one another, canceling the elliptical polarization, and they return to linearly polarized light.

Therefore, the light transmitted through the areas where the segment electrodes 126 are not formed and the areas corresponding to the segment electrodes 126 to which voltage is not applied is completely blocked by the liquid crystal element 123 for compensation, and thus the leakage of light can be prevented. By this means, it is possible to display a more perfect black without any coloration as the background color.

During the time interval T9 in FIG. 50, voltage is applied to both the liquid crystal element 122 for color display and the liquid crystal element 123 for compensation, and in this state the color liquid crystal display device 121 performs normally white display. In other words as shown in FIG. 51 (2), the background color becomes white because light is transmitted through the liquid crystal layer when voltage is not applied to the liquid crystal element 122 for color display, and the areas corresponding to the segment electrodes 126 to which voltage is applied are displayed in a different color. For example, in case voltage is applied to only the electrodes Sr for red which correspond to the red filters R, then only the areas corresponding to the red filters R block the light, and therefore, cyan is displayed due to the mixing of green light and blue light. By this means, "12" is displayed in cyan.

TABLE 12

| Liquid Crystal Element for Color Display Light State | | | Liquid Crystall Element for Compensation | |
|---|---|---|---|---|
| | | | Normally Black Display | Normally White Display |
| R | G | B | Display Color | Display Color |
| ○ | • | • | Red | Cyan |
| • | ○ | • | Green | Magenta |
| • | • | ○ | Blue | Yellow |
| ○ | ○ | • | Yellow | Blue |
| ○ | • | ○ | Magenta | Green |
| • | ○ | ○ | Cyan | Red |
| ○ | ○ | ○ | White | Black |
| • | • | • | Black | White |

The correspondence of the lighting state of the liquid crystal element 122 for color display and the display color in normally black display and normally white display is shown in Table 12. In Table 12, "○" represents the state wherein voltage is applied, and " • " represents the state wherein voltage is not applied. There is a complementary color relationship between the display color of normally black display and the display color of normally white display within the same lighting state of the liquid crystal element 122 for color display.

FIG. 52 is a diagram showing the visual angle characteristics of the color liquid crystal display device 121. FIG. 52 (1) shows the visual angle range for normally black display, and the area enclosed by the solid line (61 is the area where the contrast Co is 10 or more. FIG. 52 (2) is a diagram showing the visual angle range when normally white display is performed, and the area enclosed by the solid line 162 is the area where the contrast ratio Co is 10 or more. As shown in FIG. 52, normally black display is superior to normally white display in its visual angle characteristics.

TABLE 13

| Display State | Contrast Just Overhead |
|---|---|
| Normally Black Display (Liquid Crystal Element for Compensation OFF) | 40 |
| Normally White Display (Liquid Crystal Element for Compensation ON) | 24 |

The contrast values of each display state are shown in Table 13. As shown in Table 13, sufficient contrast is obtained in the case of the display modes of either normally black display or normally white display.

Based upon this embodiment as mentioned above, the transference electrodes 137 and 138 are formed across nearly the entire surfaces of the transparent substrates 131a and 131b of the liquid crystal element 123 for compensation, so-called normally black display and normally white display can be switched in the liquid crystal display device by the application/non-application of voltage to these transference electrodes 137 and 138, and thus diversity of display can be realized. Further the black for the background color in normally black display can be made a more perfect black with little coloration by using the liquid crystal element 123 for compensation, and thus sufficient contrast can be obtained.

Further, it is not limited to a segment type liquid crystal element device, but may also be implemented in connection with a simple matrix type or an active matrix type liquid crystal display device.

As another embodiment, the color filter 125 may be formed on the segment electrodes 126. Further the transparent electrodes 137 and 138 may be formed only in predetermined areas of the transparent substrates 131a and 131b so that partial switching of display modes can be performed.

In the explanation below, it is assumed that the color filter 12 and the segment electrodes 126 shown in FIG. 46 are used.

Figure 53:
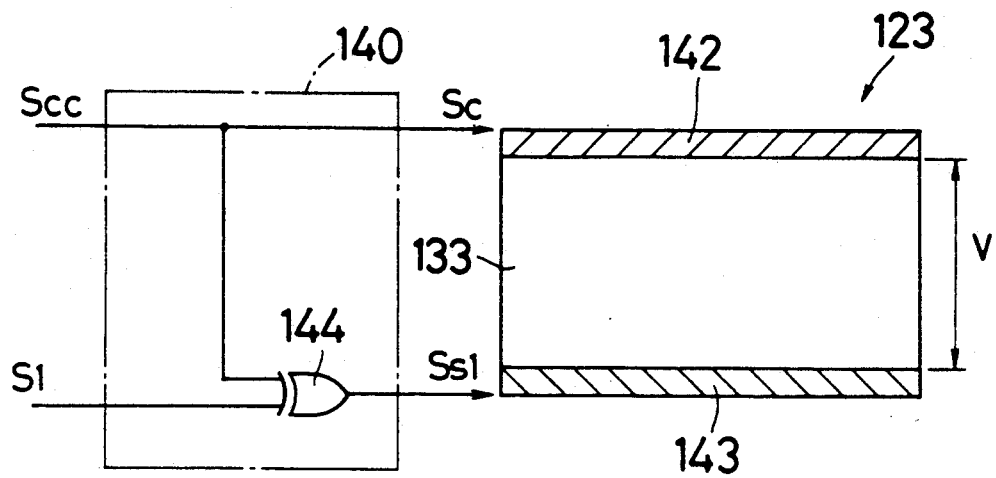
FIGS. 53(1) and (2) are block diagrams explaining the construction of the drive circuits 140 and 141.
Figure 53:
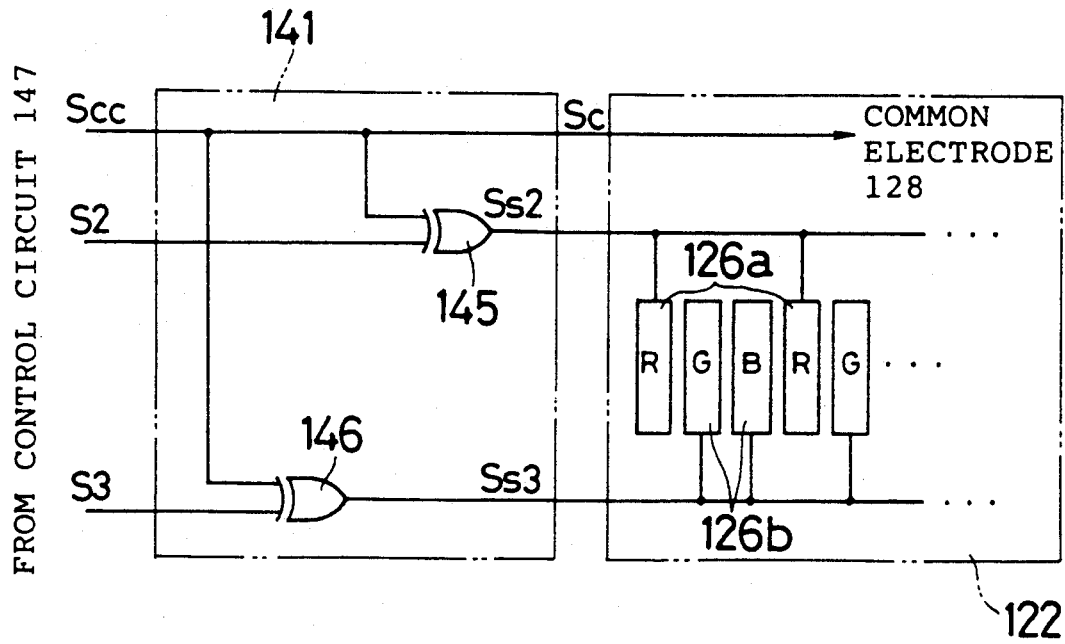

FIG. 53 is a block diagram showing construction examples for the drive circuits 140 and 141, and FIG. 54 is a timing chart explaining the operation of this embodiment. The common signal Scc, illustrated in FIG. 54 (2), from the control circuit 147 and the selection signal S1, which performs the selection of whether to apply or to stop the operating voltage to the liquid crystal element 123, are inputted to the drive circuit 140. Further, the common signal Scc is supplied to the transference electrode 142 and selection signal S1 is inputted to the exclusive "or" circuit (hereafter abbreviated as EX circuit) 144 together with the common signal Scc. Finally, the output from there is supplied to the transference electrode 143 as the segment signal Ss1.

On the other hand, the common signal Scc and the selection signals S2 and S3 for selecting each of the segment electrodes 126a and 126b, are each inputted to the drive circuit 141 as shown in FIG. 53 (2). The common signal Sc is supplied to the common electrode 128, and the selection signal S2 is inputted to the EX circuit 145 together with the common signal Scc. Finally, the output from there is outputted as the segment signal Ss2 to the segment electrodes 126a. Further the selection signal S3 is inputted to the EX circuit 146 together with the common signal Sc, and the output from there is supplied to the segment electrodes 126b as the segment signal Ss3. Here the truth tables for the EX circuits 144, 145 and 146 are shown in Table 14 through Table 16 below.

TABLE 14

|     | Sc | S1 | Ss1 |
|-----|----|----|-----|
| (1) | L  | L  | L   |
| (2) | L  | H  | H   |
| (3) | H  | L  | H   |
| (4) | H  | H  | L   |

TABLE 15

|     | Sc | S2 | Ss2 |
|-----|----|----|-----|
| (1) | L  | L  | L   |
| (2) | L  | H  | H   |
| (3) | H  | L  | H   |
| (4) | H  | H  | L   |

TABLE 16

|     | Sc | S3 | Ss3 |
|-----|----|----|-----|
| (1) | L  | L  | L   |
| (2) | L  | H  | H   |
| (3) | H  | L  | H   |
| (4) | H  | H  | L   |

The symbols (1) through (4) in the above Tables 14 through 16 correspond to the symbols (1) through (4) in FIG. 54 (3). Then the voltage V applied in the liquid crystal element 123 becomes drive voltage in the case of symbols (3) and (4), and the case of symbols (1) and (2) is the state in which operation is stopped. In other words in the case of symbols (1) and (2) the liquid crystal element 123 is in a state in which operation is stopped, and this corresponds to normally black. The states of the signals in the liquid crystal element 122 in this case are shown in Table 17.

TABLE 17

| | Normally Black Display Ss1 = OFF | |
|---|---|---|
| | Scc-Ss2 (Electrodes 126a) | Scc-Ss3 (Electrodes 126b) |
| State 1 | OFF | OFF |
| 2 | ON | OFF |
| 3 | OFF | ON |
| 4 | ON | ON |

On the other hand, the states of the signals for the liquid crystal element 122 from the drive circuit 141, when the liquid crystal element 123 goes to an ON state and normally white display is performed, is shown in Table 18 below.

TABLE 18

| | Normally White Display Ss1 = ON | |
|---|---|---|
| | Scc-Ss2 (Electrodes 126a) | Scc-Ss3 (Electrodes 126b) |
| State 1 | ON | ON |
| 2 | OFF | ON |
| 3 | ON | OFF |
| 4 | OFF | OFF |

The states of color display in the configuration of the color liquid crystal display device 121 of this embodiment correspond to the Example 1 section of the Table 1. Here all of the segment electrodes 126a and 126b in state 1 of the Table 17 are in an OFF state, and black is displayed as in state 1 in the Example 1 section of the Table 1. In state 2 the electrodes 126a are in an ON state and the electrodes 126b are in an OFF state, and red is displayed as shown in Table 1. In state 3 of Table 17 the electrodes 126a are OFF and the electrodes 126b are in an ON state, and cyan is displayed through the color mixture of green and blue. In state 4 of Table 17 all of the electrodes 126a and 126b are in an ON state, and white is displayed as shown in Table 1.

In order to switch the liquid crystal element 123 from the normally black display state to the normally white display state, the selection signal S1 is switched to the timing indicated by the symbols (2) and (3) of Table 14. Here when red is displayed in the normally black state in state 2 of Table 17, then state 3 of Table 18 is realized in normally white display in this embodiment. In other words the selection signal S2 is inputted with the timing of symbols (2) and (4) in Table 15, and the selection signal S3 is inputted with the timing of symbols (1) and (3) in Table 16. By this means state 3 of Table 17 is realized. Then liquid crystal element 123 performs normally white display, and red is displayed in the same way as in state 2 of Table 16.

In this example as mentioned above, when the liquid crystal element 123 is switched from the normally black display state to the normally white display state, the background color is switched from black to white, and red is maintained for the display color. As regards the remaining colors of Example 1 in the Table 1, the timing of the selection signals S2 and S3 is selected in the same way, and the same effect can be realized. Further this kind of effect can be realized similarly in the cases of Example 2 and Example 3 in Table 1 also.

In this embodiment as mentioned above, when the display state is switched between normally black and normally white in the two layered type color liquid crystal display device 121, the background color changes and it is possible to maintain the same display color, and thus diversity in the display can be markedly expanded.

Figure 56:
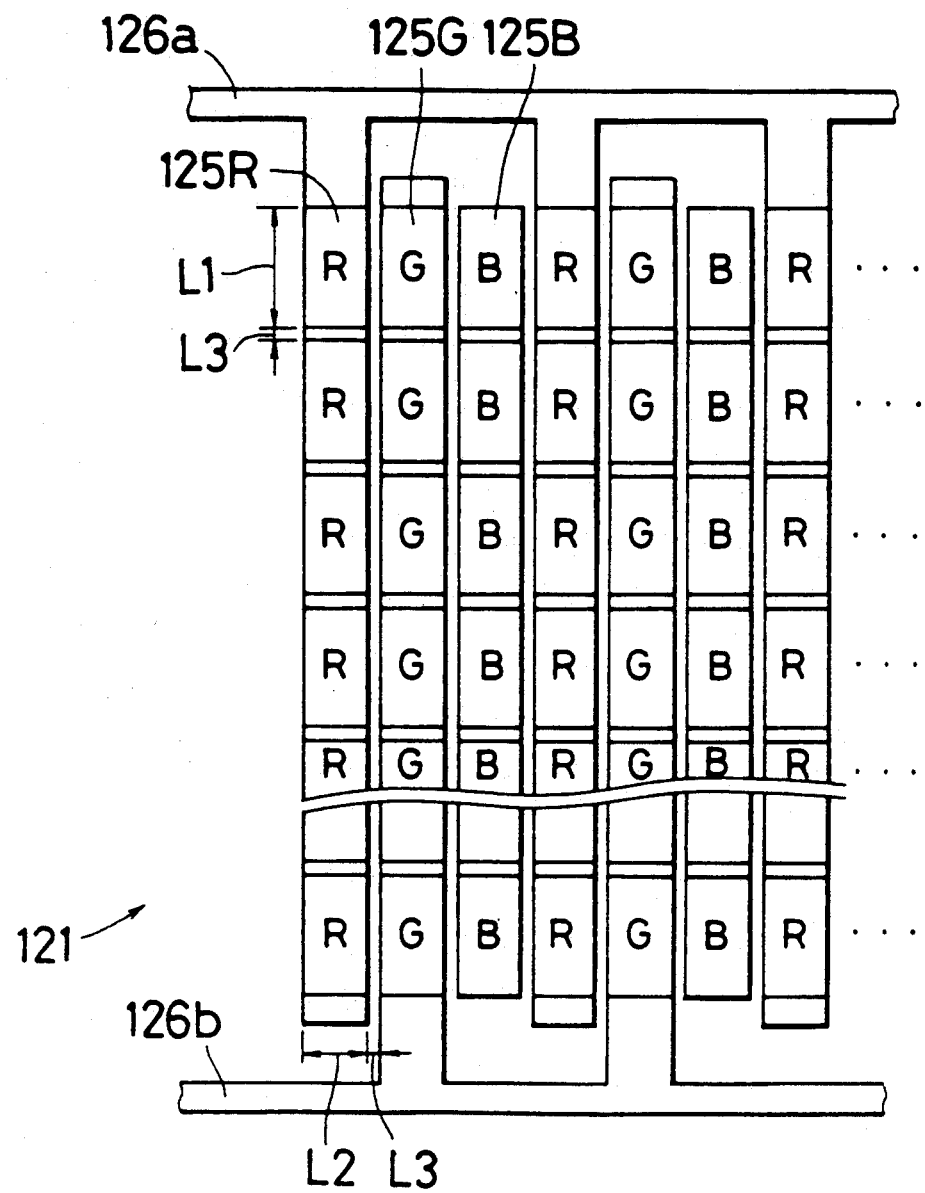

FIG. 55 is a timing chart explaining another operation of the sixth embodiment, and FIG. 56 is a plane view diagram of the transparent substrate 124a.

In this embodiment for example, a plurality of the color filters 125R, of length L1 and width L2, are arranged with the space L3 between them, and as a whole are formed in long belt shapes. The remaining green and blue color filters 125G and 125B also have the same dimensions and arrangement pitch as the color filters 125R, and as a whole are formed in long belt shapes. In this embodiment the segment electrodes 126a are formed in belt shapes on the color filters 125R, and the segment electrodes 126b are formed on the color filters 125G. The common signal Scc, illustrated in FIG. 55 (2), from the control circuit 147 and the selection signal S1, which performs the selection of whether to apply or to stop the operating voltage to the liquid crystal element 123, are inputted to the drive circuit 140 shown in FIG. 53 (1). The common signal Scc is supplied to the transparent electrode 142, and the selection signal S1 is inputted to the exclusive "or" circuit (hereafter abbreviated as EX circuit) 144 together with the common signal Scc. Finally, the output from there is supplied to the transparent electrode 143 as the segment signal Ss1.

The symbols (1) through (4) in the above Table 14 correspond to the symbols (1) through (4) in FIG. 55 (3). Then the voltage V applied in the liquid crystal element 123 becomes drive voltage in the case of symbols (3) and (4), and the case of symbols (1) and (2) is the state in which operation is stopped. In other words in the case of symbols (1) and (2) the liquid crystal element 123 is in a state in which operation is stopped, and this corresponds to normally black.

The states of color display in the configuration of the color liquid crystal display device 121 of this embodiment correspond to the Example 1 section of the Table 1. Then the display of four colors, corresponding to the application/non-application state of display voltage to the segment electrodes 126a, 126b and 126c, becomes possible as shown in state 1, state 2, state 3 and state 4 respectively of the Example 1 section of the above Table 1. Here the examples 1, 2 and 3 respectively indicate each of the cases where the segment electrodes 126b and 126c are connected in common, or the segment electrodes 126a and 126c are connected in common, or the segment electrodes 126a and 126b are connected in common, and the display of four colors is possible in each example.

Here in state 1 of the Example 1 section in the Table 1 all of the segment electrodes 126a and 126b are in an OFF state, and black is displayed as in state 1 of the Example 1 section of the Table 1. In state 2 of the Example 1 section the electrodes 126a are in an ON state, the electrodes 126b are in an OFF state, and red is displayed as shown in Table 1. In state 3 of the Example 1 section of Table 1 the electrodes 126a are OFF, the electrodes 126b are in an ON state, and green is displayed as shown in Table 1. In state 4 of the Example 1 section of Table 1 all of the electrodes 126a and 126b are in an ON state, and yellow is displayed through the color mixture of red and green as shown in Table 1.

In changing the liquid crystal element 123 from the normally black display state to the normally white display state, the selection signal S1 is changed to the timing indicated by the symbols (2) and (3) in Table 3. Here when red is displayed in the normally black state in state 2 of the Example 1 section of Table 1, state 2 of the Example 1 section of Table 3 is realized in the normally white display in this embodiment. In other words the complimentary color of red, cyan is displayed.

In this example as mentioned above, when the liquid crystal element 123 is changed from the normally black display state to the normally white display state, the four colors white, cyan, magenta and blue can be displayed instead of the four colors black, red, green and yellow which can be displayed in the normally black display state. In other words eight colors can be displayed by controlling the display states of the liquid crystal elements 122 and 123. Further this kind of effect can be similarly realized in the cases of the configuration examples of Example 2 and Example 3 in Table 1 also.

In this embodiment as mentioned above the displayed colors can be doubled in the two layered type color liquid crystal display device 121 as compared to the example of the prior art, and thus the diversity of display can be markedly expanded.

In the embodiment as shown in FIG. 46, segment electrodes are not formed on one of the kinds of color filters 125R, 125G or 125B, but as another embodiment of the invention, for example, the color filters 125B of FIG. 46 may also be connected to one or the other of the segment electrodes 126a or 126b, thereby making a structure which forms corresponding common electrodes.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and the range of equivalency of the claims are therefore intended to be embraced therein.

What is claimed is:

1. A color liquid crystal display device for displaying patterns including a stacked first and second liquid crystal element each of which has a liquid crystal layer provided between a pair of transparent substrates comprising:

a first liquid crystal element including, a plurality of color selection members, each color selection member being either a first, second or third color, said color selection members being provided across an entire surface of an upper one of the transparent substrates and displaying a plurality of predetermined colors by transmitting light therethrough, each color selection member being small enough so as to be indistinguishable from each other by the human eye, and a plurality of transparent first display electrodes provided within a display area of the liquid crystal layer and between the liquid crystal layer and an upper one of the transparent substrates, each transparent first display electrode being formed in an area between the liquid crystal layer and a plurality of color selection members, thereby transmitting light to the plurality of color selection members according to the predetermined color that is to be displayed in the display area; and a second liquid crystal element including, a plurality of transparent second display electrodes provided within the display area and being provided across an entire surface of an upper one of the transparent substrates, said transparent second display electrodes providing background areas when in a predetermined state, the plurality of first and second display electrodes being independently operable for simultaneous or independent variation in the formation of displayed patterns and background areas, respectively, in the display area.

2. The color liquid crystal display device of claim 1, wherein the color selection members are disposed in a repeating sequence involving alternating first color, second color and third color members in both a first direction and a second direction, perpendicular to the first direction.

3. The color liquid crystal display device of claim 2, wherein each first display electrode is disposed in a direction diagonal to both the first and second direction.

4. The color liquid crystal display device of claim 1, wherein each color selection member is at most 330 microns in length and 80 microns in width.

5. The color liquid crystal display device of claim 4, wherein an area formed by a group of first, second and third color section member and spacers, the spacers being formed between individual color section members, is at most 330 microns in length and 330 microns in width.

6. The color liquid crystal display device of claim 4, wherein a spacing of between 15–40 microns exists between color selection members.

7. The color liquid crystal display device of claim 6, wherein a black light mask is formed in each spacing.

8. The color liquid crystal display device of claim 1, wherein each transparent first display electrode is formed in an area corresponding to a plurality of color selection members of only a same color of the first, second and third colors and wherein each first display electrode, when selected, thereby transmits light to only color selection members of a same color.

9. The color liquid crystal display device of claim 1, wherein the transparent second display electrodes produce either a black background or a white background for the liquid crystal display device.

10. A color liquid crystal display device comprising:

a first liquid crystal display element including, a liquid crystal element interposed between a plurality of transparent substrates, a plurality of color selection members, each color selection member being either a first, second, or third color and formed on an upper one of the plurality of transparent substrates in predetermined display areas, said color selection members displaying a plurality of predetermined colors by transmitting light therethrough, each color section member being small enough so as to be indistinguishable by the human eye, and transparent first display electrodes, each transparent first display electrode being formed to correspond to a plurality of color selection members;

a second liquid crystal display element including, a liquid crystal element interposed between a plurality of transparent substrates, and a transparent electrode spanning an area corresponding to the display areas;

first drive means for applying a display signal to said second liquid crystal display element, said second liquid crystal display element displaying a first background color in the display area upon application of the display signal and a second background color, different from the first background color, in the display area upon non-application of the display signal; and second drive means for driving at least one transparent first display electrode to transmit light to corresponding color selection members, each driven transparent first display electrode transmitting light to only color selection members of a same color, the application and non-application of the display signal to control the background color being independent of the driving of the plurality of transparent first display electrodes to transmit light to corresponding color selection members.

11. A color liquid crystal display device comprising:

a first liquid crystal display element including, a liquid crystal element interposed between a plurality of transparent substrates, a plurality of color selection members, each color selection member being either a first, second or third color and formed on an upper one of the plurality of transparent substrates in predetermined display areas, said color section members displaying a plurality of a predetermined colors by transmitting light therethrough, each color selection member being small enough so as to be indistinguishable by the human eye, and a plurality of transparent first display electrodes formed corresponding to each color selection member;

a second liquid crystal display element including, a liquid crystal element interposed between a plurality of transparent substrates, and a plurality of transparent electrodes spanning an area corresponding to the display areas;

first drive means for selecting one of a plurality of predetermined colors by selectively applying a first display signal to some of the first display electrodes of the first liquid crystal display element to transmit light to corresponding color selection members; and second drive means for selecting one of the plurality of colors, or a complementary color of the colored transmitted light from the first liquid crystal display element, by selectively applying a second display signal to some of the transparent electrodes of the second liquid crystal display element to transmit light received from corresponding color selection members, operation of said first and second drive means being independent, said second display signal causing said second liquid crystal display element to be either in a normally black mode or a normally white mode.

12. A color liquid crystal display device as claimed in anyone of claims 1, 10 and 11, wherein a shape of each color selection member is quadrilateral;

the color selection members being arranged in a mosaic pattern;

said first display electrodes being connected in sequence so as to display transmitted light through each first display electrode to only color selection members of a same color.

* * * * *